United States Patent [19]

Bilbrey et al.

[11] Patent Number: 5,227,863

[45] Date of Patent: Jul. 13, 1993

[54] PROGRAMMABLE DIGITAL VIDEO PROCESSING SYSTEM

[75] Inventors: Brett C. Bilbrey, Hoffman Estates; John M. Brooks, Itasca; Craig Fields, Wheeling; Jeffrey E. Frederiksen, Arlington Heights, all of Ill.; Thomas Jakobs, Alma, Ark.

[73] Assignee: Intelligent Resources Integrated Systems, Inc., Arlington Heights, Ill.

[21] Appl. No.: 564,148

[22] Filed: Aug. 7, 1990

Related U.S. Application Data

[63] Continuation-in-part of Ser. No. 436,325, Nov. 14, 1989, abandoned.

[51] Int. Cl.$^5$ .................... H04N 9/74; H04N 5/14
[52] U.S. Cl. .................... 358/22; 358/160; 358/182; 395/153
[58] Field of Search .............. 358/22, 180, 181, 182, 358/183, 185, 903, 160, 148; 364/521; 395/118, 133, 153

[56] References Cited

U.S. PATENT DOCUMENTS

| | | | |
|---|---|---|---|
| Re. 32,632 | 3/1988 | Atkinson | 340/709 |
| D. 288,434 | 2/1987 | Gemmell | D13/11 |
| 4,041,527 | 8/1977 | Rayner et al. | 358/22 |
| 4,217,604 | 8/1980 | Wozniak | 358/16 |
| 4,240,112 | 12/1980 | Inaba et al. | 358/160 |
| 4,292,648 | 9/1981 | Kowal | 358/8 |
| 4,392,156 | 7/1983 | Duca et al. | 358/183 |
| 4,392,159 | 7/1983 | Lemoine et al. | 358/319 |
| 4,409,611 | 10/1983 | Vlahos | 358/22 |
| 4,472,732 | 9/1984 | Bennett et al. | 358/22 |
| 4,564,915 | 1/1986 | Evans et al | 364/521 |
| 4,578,673 | 3/1986 | Yianilos et al. | 340/703 |
| 4,589,013 | 5/1986 | Vlahos | 358/22 |
| 4,602,285 | 7/1986 | Beaulier et al. | 358/160 |
| 4,622,545 | 11/1986 | Atkihson | 340/747 |
| 4,625,231 | 11/1986 | Vlahos | 358/22 |
| 4,631,750 | 12/1986 | Gabriel et al. | 382/41 |
| 4,652,906 | 3/1987 | Baugh | 358/22 |
| 4,668,989 | 5/1987 | Mackereth | 358/182 |
| 4,684,938 | 8/1987 | Chauvel | 340/747 |
| 4,684,990 | 8/1987 | Oxley | 358/183 |
| 4,694,343 | 9/1987 | Flora | 358/183 |
| 4,694,344 | 9/1987 | Flora | 358/183 |
| 4,737,772 | 4/1988 | Nishi et al. | 340/703 |
| 4,758,892 | 7/1988 | Bloomfield | 358/183 |
| 4,764,809 | 8/1988 | Haycock et al. | 358/183 |
| 4,774,572 | 9/1988 | Kellar et al. | 358/109 |
| 4,779,135 | 10/1988 | Judd | 358/109 |
| 4,780,763 | 10/1988 | McFetridge et al. | 358/183 |
| 4,782,388 | 11/1988 | Lake | 358/160 |
| 4,786,893 | 11/1988 | Moore | 340/703 |
| 4,786,895 | 11/1988 | Williams | 360/33.1 |
| 4,791,489 | 12/1988 | Polatnick | 358/160 |
| 4,797,836 | 1/1989 | Witek et al. | 364/518 |
| 4,800,432 | 1/1989 | Barnett et al. | 358/160 |
| 4,804,948 | 2/1989 | Nishi et al. | 340/703 |
| 4,809,070 | 2/1989 | Lake, Jr. | 358/166 |
| 4,823,120 | 4/1989 | Thompson et al. | 340/703 |
| 4,831,447 | 5/1989 | Lake, Jr. | 358/183 |
| 4,835,530 | 5/1989 | Morita et al. | 340/732 |
| 4,835,613 | 5/1989 | Johnson | 358/181 |
| 4,851,912 | 7/1989 | Jackson et al. | 358/183 |
| 4,853,784 | 8/1989 | Abt et al. | 358/181 |
| 4,855,834 | 8/1989 | Cawley et al. | 358/183 |
| 4,858,011 | 8/1989 | Jackson et al. | 358/181 |
| 4,951,142 | 8/1990 | Glaab et al. | 358/148 |
| 4,985,756 | 1/1991 | Kawabe et al. | 358/22 |
| 5,027,212 | 6/1991 | Marlton et al. | 358/183 |

*Primary Examiner*—James J. Groody
*Assistant Examiner*—Safet Metjahic
*Attorney, Agent, or Firm*—Sitrick & Sitrick

[57] ABSTRACT

Programmable apparatus for digital processing of video signals from multiple sources converted to digital format to provide real-time multiple simultaneous special video effects and suitable for direct interface to a conventional microcomputer bus such as an Apple Macintosh II NuBus. The apparatus includes a matrix of multipliers to do real-time video processing permitting special effects such as fading between at least two video image sources, as well as a priority resolver to control display on a pixel by pixel basis of more than ten sources based upon dynamically programmable priority. In addition, a programmable multiple range thresholder, a hardware window generator capable of generating multiple simultaneous windows, a color look up table and optional image capture capabilities are provided. The apparatus also provides for a light pen input, genlocking and a range of special video effects including zooming, mosaicing, panning and blending.

124 Claims, 20 Drawing Sheets

PROGRAMMABLE DIGITAL VIDEO PROCESSING SYSTEM

CONTINUING DATA

This application is a continuation-in-part of U.S. Ser. No. 07/436,325, filed Nov. 14, 1989, now abandoned.

BACKGROUND OF THE INVENTION

This invention relates generally to the field of video data processing and more particularly to methods and apparatus for real time digital video image processing of video image data suitable for use with a microprocessor or microcomputer and capable of providing multiple simultaneous special video effects.

In the prior art, various video special effects generating systems are known for use, for example, in broadcast television, computer graphics generation, etc. Video signal manipulation in various video environments is increasingly being carried out on video signals which have been converted to digital form. Available digital systems can individually produce a variety of known special effects. For example, it is often desirable to combine multiple independent sources of video by such known temporal video techniques as fades, wipes, or other key insertions. Other digital video systems are known for producing spatial video effects such as mosaic effects, blurring effects, scaling, or zooming. Still other digital systems generate windows, use color look up tables to provide a large palette of colors, or use specialized graphic circuits to provide computer graphics capabilities.

However, known systems are expensive and since they typically generate only a small set of effects, they do not permit close integration of multiple functions. These systems require multiple units to be combined to get multiple effects which is expensive and often presents incompatibility problems. Because the prior art systems even when coupled together do not permit close coupling of a variety of functions, they cannot generate many combinations of special effects and cannot generate many unique effects that require close integration of multiple functions. Thus, prior art systems cannot produce a wide variety of complex composite special effects where close integration of multiple functions is required.

Typically, prior art special video effects systems are self-contained systems which are designed to operate independently thereby making it difficult to interface them to a conventional microcomputer or to other special effects systems. In addition, video broadcast systems are uniquely designed to optimize video specifications such as sync, chroma burst, etc., while computer graphics systems optimize such computer specific characteristics as bandwidth, pixel definition, etc. Thus, no prior art system simultaneously optimizes both video and computer related features to permit computer control of such features as fading, blending, range thresholding, etc. This also creates incompatibilities when attempting to interface computer and video systems in a microcomputer environment. The ability to interface directly to a microcomputer bus allows video functions to be integrally combined with computer functions. This permits flexible control of video manipulation functions providing increased flexibility and extending computer control capabilities to complex video effects.

In addition, prior art video systems typically can operate in only one or a few specific targeted video environments such as a specific broadcast television market or a computer video graphics environment for a specific computer system. Thus, these prior art systems can only operate within a limited number of video standards (e.g., NTSC, PAL, etc.).

SUMMARY OF THE INVENTION

It is accordingly an object of this invention to provide a novel digital image processing system which economically provides multiple integrated special effects functions in real time.

It is another object of the invention to provide a novel digital processing system controlled by a conventional microcomputer and suitable for direct interface into a conventional microcomputer bus slot while maintaining both video and computer specification compatibility, thereby extending computer control capabilities to complex video effects.

It is another object of the invention to provide a novel digital image processing system having a programmable timing specification enabling conformance with any existing video standard.

It is another object of the invention to provide a novel programmable digital image processing system having a programmable pixel multiplier matrix capable of programmable blending of at least two independent video sources together with a matrix transformation of the video data in real time.

It is another object of the invention to provide a novel programmable digital image processing system having the capability of programmably assigning a priority to each of a plurality of video sources and for resolving the priority to determine the display source on a pixel by pixel basis.

It is another object of the invention to provide a novel programmable digital image processing system providing programmable multiple axis range thresholding of video data and hardware generation of multiple independent windows.

Briefly, according to one embodiment of the invention, a digital video processing system is provided comprising an input means for providing a plurality of multiple component digital video data sources, a multiple element digital multiplier means for real time multiplication of at least two of the digital video data sources and programmable constants to produce a multiplied digital video source. In addition, a threshold circuit is provided for comparing each of multiple components of a selected one of the digital video sources to a respective programmable range and a priority resolving circuit is provided for programmably assigning a priority to each of the video sources and for resolving the priority to select one of the digital video sources for display.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1:
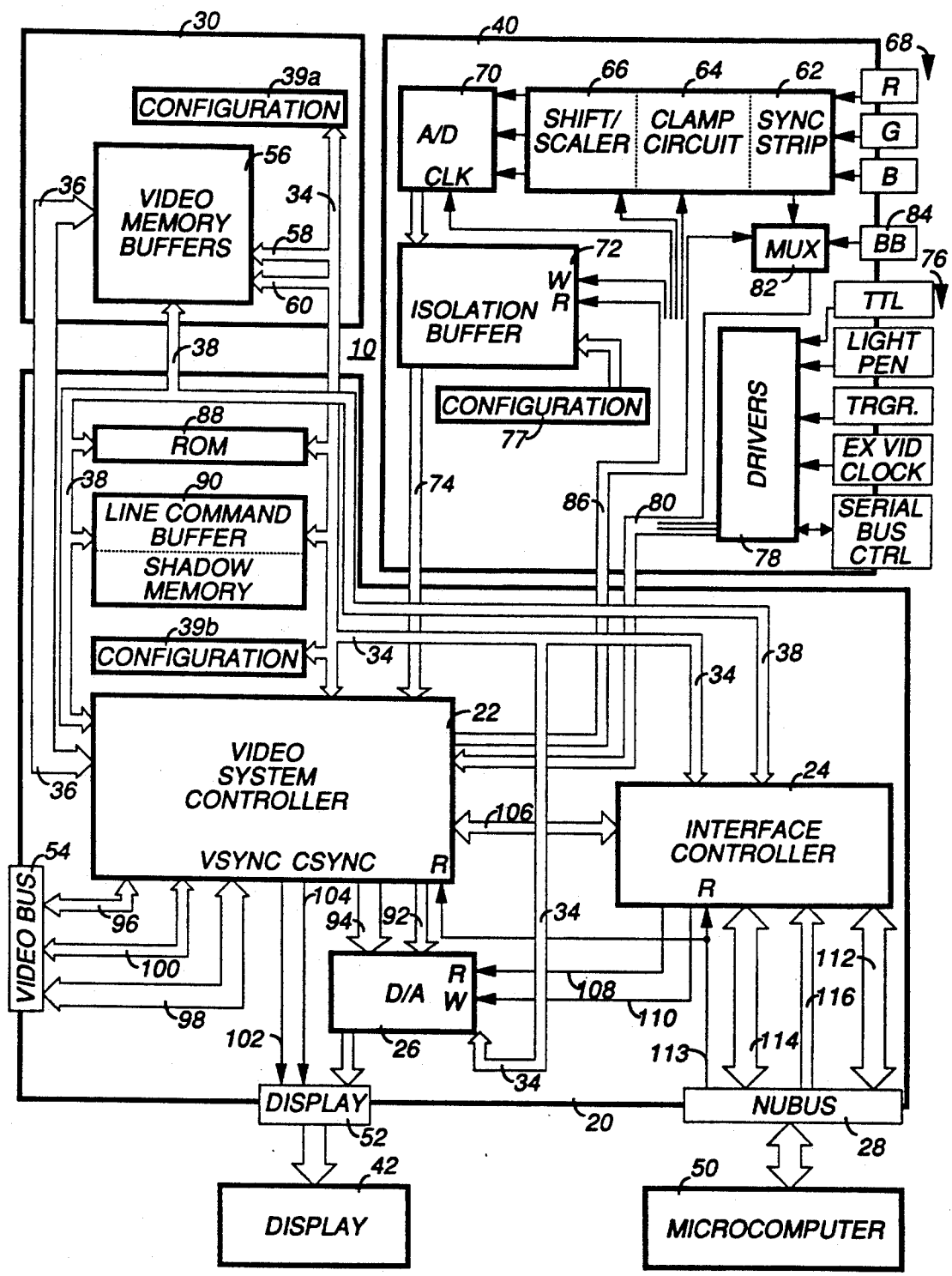
FIG. 1 is a generalized block diagram illustrating a specific embodiment of a digital video image processor system according to the invention.

FIG. 1 is a generalized block diagram illustrating a specific embodiment of a digital video image processing system 10 according to the invention. The system 10 comprises a video system module 20 coupled as shown to a memory module 30 and an input module 40 as well as to a display device 42 and a host control device 50 such as a processor, controller, or microcomputer. In the illustrated embodiment, the video system module 20 comprises a central motherboard on which the optional daughter board memory module 30 may be mounted and in which an optional daughter board input module 40 may be mounted. Alternatively, other configurations may be used, for example, the video processor 20, memory module 30, and input module 40 may comprise a single circuit board.

In the illustrated embodiment, the video system module 20 is configured to fit into a conventional NuBus slot of a host microcomputer via a NuBus connector 28. The host microcomputer 50 may, for example, be a Macintosh II computer marketed by Apple Computer Company as in the illustrated embodiment. Other computers and bus configurations may also be utilized. In addition, other controller circuits, such as a microprocessor or microcontroller, may be used as the host control device 50. The video processor 20 of the illustrated embodiment is also coupled to a display device 42 via a display connector 52 wherein the display device 42 may be any video display device using any video standard including, for example a monochrome or color CRT monitor, an LCD display, an electroluminescent display, etc. The video system module 20 may also be coupled to external video devices or systems including another video system module 20 via a video bus connector 54.

The memory module 30 which provides digital video data memory for the system comprises primarily video memory banks 56 made up of dual port video dynamic random access memory (VDRAM) with 0 to 8 megabytes of VDRAM (e.g., using TC524256 VDRAM chips marketed by Toshiba). The video memory 56 is normally divided into four eight-bit deep video banks ABCD (alpha, red, green and blue (ARGB)) and is used to hold digital video image data. The video memory banks 56 are coupled to an address/data bus 34 via a multiplexed address bus 58 (10 bits in the illustrated embodiment) and a data bus 60 (32 bits in the illustrated embodiment) as shown. The address bus 58 permits addressing the video data and the data bus 60 permits passing data to and from the computer 50 via the video system module 20.

A serial video data bus 36 is coupled from the video memory banks 56 to a programmable video system controller 22 of the video system module 20, as shown. The video system controller 22, currently consisting of two closely coupled custom chips but could be contained in a single custom chip, controls most of the video special effects processing capability of the system 10 and controls the read/write video memory banks 56 on the video data bus 36. In the illustrated embodiment, the serial video data bus 36 is a bi-directional 64 bit bus (two-to-one interleaved 32 bit bus) which provides video data both to and from the video banks 56 which are organized with a two pixel interleaved configuration. A control bus 38 (48 lines in the illustrated embodiment) provides control signals to the video banks 56 from the video system module 20 including row address select, column address select, write enable, read enable, serial clock, and serial enable. A configuration register 39a is coupled to the address/data bus 34 to provide memory configuration information (i.e., amount of memory installed) to the system module 20.

The input module 40 provides for optional input signals including analog to digital capture of analog video at a programmable sampling rate. The input module 40 may accept multiple (three in the illustrated embodiment) analog video inputs (68) which are coupled to an analog input circuit composed of a sync strip circuit 62, a clamp circuit 64 and a shift/scaler circuit 66, as shown. The three inputs, for example, may be three color components Red (R), Green (G), or Blue (B); a luminance component and two chrominance components; or, any other three components of a conventional video format. Four inputs may be used to provide, for example, for input of four components A R G B. The three analog signals are coupled from the shift/scaler circuit 66 to an analog to digital (A/D) converter 70 (e.g., made up of three model CXA1096 converters marketed by Sony) which sample the three analog signals and converts each to digital form (e.g., 8 bits each).

The resulting 24-bit digital data is then coupled from the converter 70 through an isolation buffer 72 to the video system controller 22 of the video system module 20 via a 24 bit data bus 74, as shown. A configuration register 77 is coupled to the bus 74 via the buffer 72 to provide identification configuration information (e.g., sample rate, analog video format) to the video system module 20 during power up. The configuration register 77 in the illustrated embodiment comprises a set of resistors which are read during power up by disabling the isolation buffer output and reading the bus lines coupled to the register 77.

The input module 40 also provides for a set of external inputs 76 including a light pen input, an external trigger input (e.g., light pen trigger), a TTL video sync input, an external video clock input (e.g., for genlock) and a bi-directional serial control/data bus (e.g., to interface to conventional video integrated circuits), as shown. These signals are coupled through driver buffer circuitry 78 to the video system controller 22 via a control signal bus 80. A multiplexer 82 couples a sync signal stripped from the incoming video signal by the sync strip circuit 62 or a black burst sync signal from an input 84 through the control bus 80 to the video system controller 22 under control of a select signal coupled from the video system controller 22 via a control signal bus 86, as shown. The bus 86 also couples control signals from the video system controller 22 to the shift/scaler circuit 66 (i.e., a reference level signal) and clamp circuit 64 (i.e., a clamp window signal) as well as sample clock and reset signals to the converter 70 and isolation buffer 72.

In operation, the sync strip circuit 62 strips off the synchronization signals from the input analog video signals and couples a stripped sync signal to the multiplexer 82. The stripped analog signals are coupled to the clamp circuit 64 which detects the DC level of the video during a time window supplied by the video system controller 22 via the control bus 86. The shift/scaler circuit 66 then level shifts or scales the input analog signals to put the analog signals into the proper range for the A/D converter 70. The analog signals are coupled to the A/D converter 70 and the sample clock signal from the video system controller 22 controls sampling of the analog signal by the A/D converter 70. The resulting digital output from the A/D converter 70 is coupled to the video system controller 22 through the isolation buffer 72 to the video system controller via the data bus 74. The multiplexer 82 couples either the black burst sync signal or the stripped sync signal to the video system controller 22 under control of the controller 22. The controller 22 may then use the selected sync signal or the TTL sync signal in conjunction with the digitized video data.

In addition to the video system controller 22, the video system module 20 includes an interface controller 24, a triple D/A converter 26, a declaration read only memory (ROM) 88, and a line command and shadow memory buffer 90. The ROM 88 and buffer 90 are coupled via the control bus 38 and the data/address bus 34 to the video system controller 22, the interface controller 24 and the D/A converter 26, as shown. In the illustrated embodiment, the declaration ROM 88 is a 256 Kbit, electrically erasable programmable ROM (e.g., X28C256 EEPROM marketed by XICOR) to which are coupled chip select, read enable and write enable control signals from the control bus 38 as well as twenty six address and data lines from the address/data bus 34. The line command buffer and shadow memory buffer (shadow random access memory or SRAM) 90 comprises 128 Kbytes of random access memory (e.g., TC524 256 marketed by Toshiba) to which are coupled clock row and column address select, read enable and write enable control signals from the control bus 38, as well as twelve address and data lines from the address/data bus 34.

The declaration ROM 88 in the illustrated embodiment contains conventional data that is needed on any circuit board which is to be installed in a Macintosh NuBus bus based on the published NuBus protocol. This data contains information setting video modes, colors and a number of other parameters. The declaration ROM 88 is configured to allow the host Macintosh II computer to read the data at system power up via the interface controller 24. In addition, the EEPROM of the illustrated embodiment permits the data to be erased and reprogrammed under software control. The video system controller 22 in the illustrated embodiment also includes a configuration register 39 which is coupled to the address/data bus 34 to provide system configuration information to the system module 20. In the illustrated embodiment the configuration registers 39a and 39b comprise resistors connected at one end to ground or to the supply voltage and coupled to lines of the bus 34 which are read by the video system controller 20 during power up.

The line command and shadow memory buffers 90 may be loaded with information from the host microcomputer 50. The line command buffer stores commands for line by line control of video. Thus, line commands are used to override various of the current settings affecting operation of the video display on a line of video, after which the settings revert back to the original values. The line command buffer comprises 126 Kbytes in the illustrated embodiment and is organized such that the first 16 commands correspond to the first display line, the next 16 commands correspond to the second display line, etc. The shadow memory comprises 2 Kbytes of random access memory which is used to store the status of system internal latches and registers which are not readable to provide back-up which permits the system to read the last setting of the register.

The video system controller 22 is coupled to the video memory buffers 56 via the video data bus 36, the control bus 38 and the address/data bus 34, as shown. The controller 22 is also coupled to the input module 40 via the control buses 80, 86 and the data bus 74, and to the D/A converter 26 via a control bus 92 and a video data bus 94, as shown. A bi-directional video bus port 54 permits additional digital video sources to be coupled to the controller 22 including another video system module 20. The bi-directional video bus port 54 couples digital video data to and from the video system controller 22 via two bi-directional digital video data buses 96, 98 (e.g, 32 bit buses allowing four 8-bit video components in the illustrated embodiment) and a bi-directional control bus 100 providing clock, horizontal sync, and vertical sync signals. The video system controller 22 also couples a vertical sync signal line 102 and a composite sync signal line 104 to a display output port 52, as shown. The video system controller 22 performs programmable real-time video processing of the various video sources from the memory module 30, input module 40, the interface controller 24 and a video bus port 54 under control of the host computer 50 via the interface controller 24 to produce a wide variety of video effects.

The interface controller 24 which primarily controls the interface between the module 20 and the host computer 50 is coupled to the video system controller 22 via a control bus 106. In addition, the interface controller is coupled to the controller 22, the video memory buffers 56, the ROM 88, and the line command and shadow RAM buffers 90 via the address/data bus 34. The D/A converter 26 is coupled to the interface controller 24 via the address/data bus 34 as well as the read line 108 and write line 110. The interface controller 24 interfaces to the host computer 50 through a bus connector port 28, which is a NuBus connector in the illustrated embodiment. The NuBus connector permits the video system module 20 to fit directly into a NuBus slot of a host Apple Corp. Macintosh computer and thereby permits transfer of data to and from the host computer 50. The NuBus connector 28 is coupled to the interface controller in accordance with the NuBus standard via a multiplexed bi-directional address/data bus 112 (e.g., 32 bits in the illustrated embodiment), a bi-directional control bus 114 (e.g., 12 bits in the illustrated embodiment) and an ID bus 116 (e.g, four bits in the illustrated embodiment). A reset line 113 is also coupled from the NuBus connector to the interface controller 24 and the video system controller 22, as shown.

The D/A converter 26 (e.g., a Bt473 RAMDAC marketed by Brooktree Corp.) converts digital video signals coupled from the video system controller 22 via the video data bus 94. The resulting analog signals are coupled to the display connector 52 and through to the display device 42. The D/A converter 26 in the illustrated embodiment is a 24-bit triple D/A converter which converts three digital video components to three output analog video components (e.g., R,G,B,). Control signals, including sync, blank and clock signals are coupled to the converter 26 via a control bus 92, as shown. Synchronization signals for the video display are also provided by the sync signal lines 102, 104. The Brooktree RAMDAC converter 26 also permits gamma correction to permit compensating for the non-linear signal response of many display devices using look-up tables in the converter 26. Three tables (i.e., registers) are loaded and controlled by the host computer 50 through the interface controller 24 via the address/data bus 34 (e.g., the eleven least significant bits of the bus providing 8 bits of data and 3 bits of address) and read/write lines 108, 110.

Figure 2:
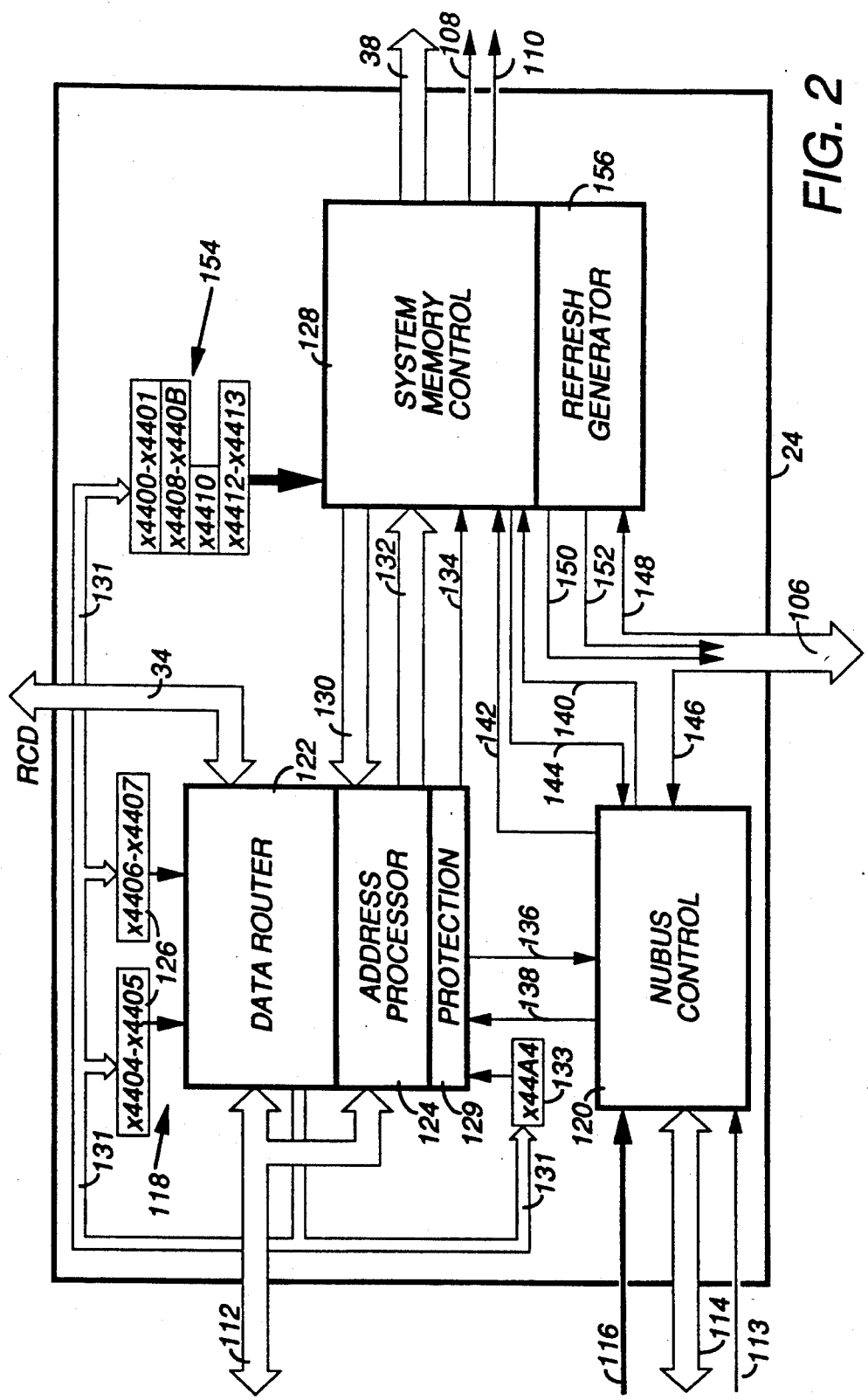
FIG. 2 is a detailed block diagram illustrating a specific embodiment of the interface controller shown in FIG. 1 in accordance with the invention.

Referring now to FIG. 2, there is shown a detailed block diagram of a specific embodiment of the interface controller 24 which receives addresses, data and control signals from the host computer 50 on the address/data bus 112, control bus 114 and ID bus 116. This information is used to generate and pass addresses, data and control signals to load the video memory banks 56, and the various buffers and registers of the programmable video system controller 24 and D/A converter 26 via the address/data bus 34, control bus 38 and control bus 106. In addition, the interface controller provides address, data and control signals to the host computer 50 via the buses 112, 114. Thus, the interface controller primarily controls communications between the host computer 50 (e.g., through the NuBus in the illustrated embodiment) and the video system module 20. The interface controller also implements the loading and reading of the shadow RAM 90 to permit reading of register status, implements an address offset capability, performs a timing register protection function, and generates a programmable refresh signal for refreshing the dynamic RAM of the video memory banks 56.

Address and data information is coupled between the host computers 50 and an address/data processing circuit 118 on the bi-directional address/data bus 112 through the NuBus connector 28. In addition, control signals on the bus 114 and ID signals on the bus 116 are coupled between the host computer 50 and a NuBus control circuit 120 along with a reset signal on the reset line 113, as shown. The processing circuit 118 comprises a data router 122, an address processor 124, and a timing register protection circuit 129. In addition, a set of X and Y address offset registers 126 is coupled to the address processing circuit 118. The register addresses are shown in abbreviated form with x signifying an offset from a base register address (which is $FsF00000 in the illustrated embodiment). This convention will be used hereinafter. All registers within the interface controller 24 are loaded by the address/data processor circuit 118 via a bus 131, as shown. Addresses and data are coupled to and from the data router 122 of the processing circuit 118 to and from the other buffers and registers of the video system module 20 and memory module 30 via the address/data bus 34. In addition, the addresses and data are coupled between the processing circuit 118 and a system memory controller 128 via an address/data bus 130. Decoded operation signals are coupled from the processing circuit 118 to the system memory controller 128 via a bus 132 and a security inhibit signal is coupled to the system memory controller 128 on a control line 134, as shown.

A valid address signal is coupled to the NuBus control circuit 120 on a control line 136 and a store enable signal is coupled from the NuBus control circuit 120 to the processing circuit 118 on an enable line 138, as shown. The NuBus controller 120 also generates a read/write enable signal which is coupled to the system memory controller 128 by an enable line 140 and generates a data available signal to enable a data read or write cycle which is coupled to the controller 128 by a control line 142. In addition, the system memory controller 128 generates an acknowledge signal in response to completion of a data read or write cycle which is coupled to the NuBus controller 120 on a control line 144. The control bus 106 which connects to the video system controller 22 couples an interrupt signal to the NuBus controller 120 on an interrupt line 146 and couples a video RAM transfer request signal to the refresh generator 156 on a control line 148, as shown. In addition, the system memory controller generates a video memory data transfer enable signal and register data enable signal which are coupled to the control bus 106 on enable lines 150 and 152, as shown.

The interface controller 24 primarily synchronizes address and data exchange with the NuBus and controls transfer to and from the video memory 56 and various system registers. Thus, the host computer transfers data by generating an identification code (ID) on the ID bus 116 which identifies to the board its slot in the bus. At the same time, an address is applied by the host computer on the address/data bus 112 followed by data (i.e., bus 112 is time multiplexed between address and data) which is processed by the address processor 124 to determine if it is a valid board address. If it is a valid address, a signal is sent to the NuBus controller 120 on the control line 136 which is used by the NuBus controller in conjunction with the proper ID and the NuBus control signals from the control bus 114 to generate and send a store enable signal to the address/data processor 118 on the enable line 138. In response to the enable signal, the processor 118 stores the incoming address and on the next clock cycle stores the associated data in internal registers with the proper timing as dictated by the NuBus protocol. Thus, the address/data bus 112 is de-multiplexed by the address/data processing circuit 118. The data router 122, comprising primarily a set of gates and multiplexer/demultiplexers, rearranges the address and data and couples them to the proper bus 34, 130 to transfer the data to the addressed video memory bank or system register. The address may also be offset by a predetermined number in either the x or y axis by the data router 122 based upon values stored in the x and y offset registers 126.

Thus, the data router 122 arranges addresses and data to be put on the bus 34 to be stored in the video memory banks 56, or for loading internal registers in the video system module 20. Conversely, the processing circuit 118 may couple data back to the host microcomputer 50 with the data router 122 arranging the data in proper format and multiplexing it on to the bus 112 with the NuBus controller generating the proper control signals in accordance with the NuBus protocol.

To accept data from the host microcomputer NuBus interface, the processing circuit 118 can utilize a pipelining technique in which the data and address are stored after which another cycle of reading and saving data and address information is initiated by an enable signal on enable line 138 at the same time that the previously stored data is transferred to system memory.

To control the transfer of data to system memory, the address processor 124 decodes the address and provides a control signal on the control bus 132 to the system memory controller 128 to identify the addressed segment of system memory (i.e., video memory, EEPROM, system registers, etc.). The NuBus controller 120 generates a data available signal which is coupled on line 140 to the system memory controller 128 to indicate that data and address information is stored and ready to be transferred. In response, the system memory controller 128 generates control signals to control transfer to or from the appropriate system memory location. After the transfer, the system memory controller 128 sends an acknowledge signal to the NuBus controller 120 on control line 144. The system memory controller 128 also generates control signals on the bus 130 to control the multiplexing of the data/address information by the data router 122. Thus, the system memory controller generates the control signals which control the transfer of data to and from the system memory. This process is controlled by data stored in system memory controller register 154 which are loaded with data via the bus 130. The system memory controller 128 also comprises a programmable refresh generator which generates a signal to activate a refresh cycle of the dynamic RAM installed in the system at an interval which is programmable by loading the desired value in the associated one of registers 154.

The transfer of data to registers which control timing of horizontal and vertical control signals is protected by a key code security system 129 incorporated in the address processor 124. If a protected timing register is addressed, the protection circuit 129 inhibits the system memory controller 128 unless a key register 133 coupled to the protection circuit 129 has been loaded with the proper key code on the previous data load cycle. The protection circuit 129 generates an inhibit signal which is coupled to the system memory controller 128 on the control line 134 and which inhibits the controller 128. If the key register 133 is first addressed and loaded with the proper code, the inhibit signal is not generated and the system memory controller 128 can generate the necessary control signals and transfer the data. This protection circuit 129 thus protects against accidental overdriving of the horizontal or vertical circuits of the display device 42.

Figure 3:
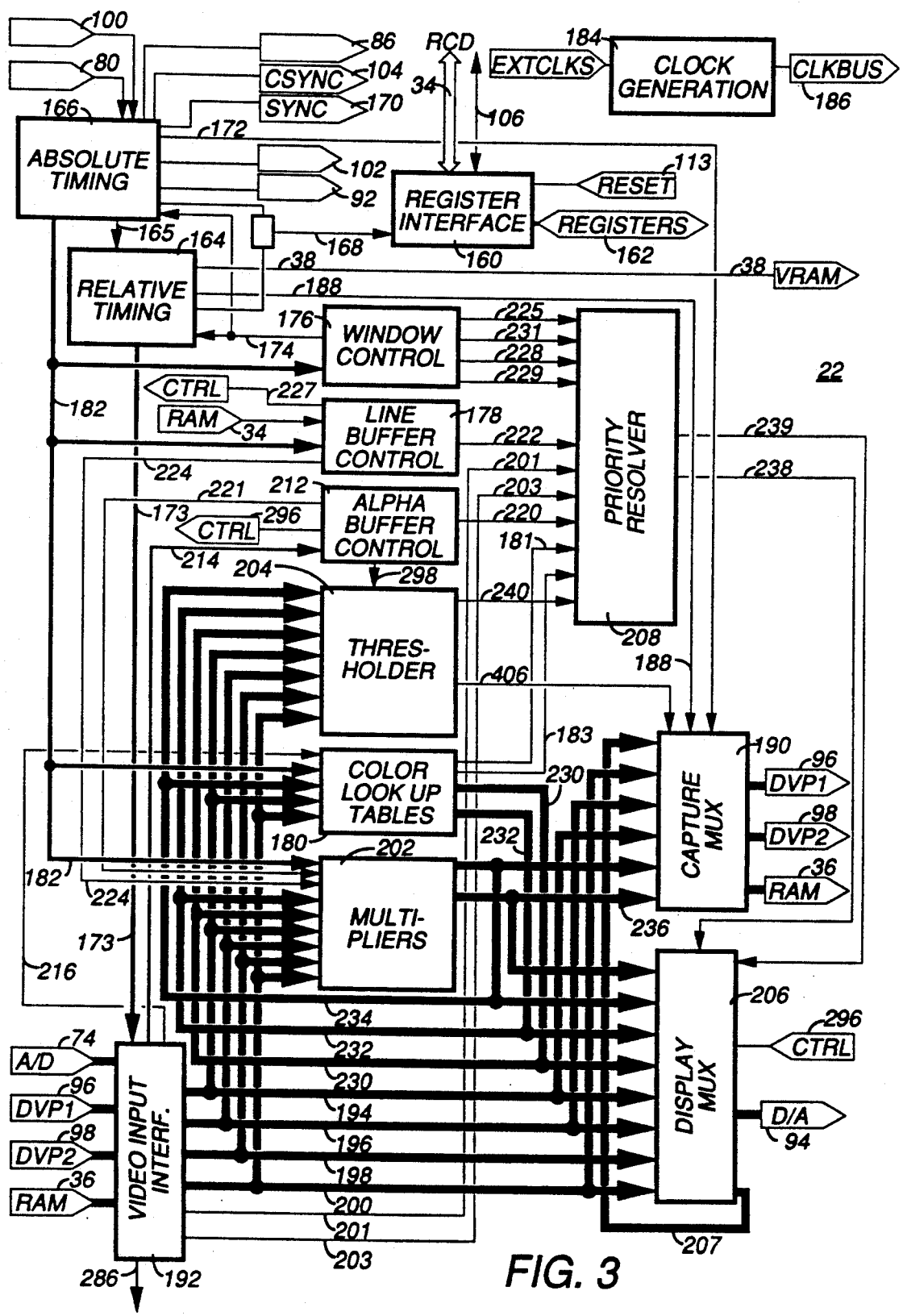
FIG. 3 is a block diagram illustrating a specific embodiment of the video system controller shown in FIG. 1 in accordance with the invention.

FIG. 3 is a detailed block diagram of a specific embodiment of the programmable video system controller 22. The video system controller 22 provides the primary capability for video data manipulation and processing of video data from multiple input sources of video data for the system 10. The controller 22 is programmed by the host computer 50 by loading internal registers of the controller 22 through the interface controller 24 via the address/data bus 34. Thus, the address of the register to be loaded and the data to be loaded into the addressed register are coupled on the address-/data bus 34 to a register interface 160 of the controller 22. The register interface 160 couples the incoming address and data information and control signals to a bus 162 which couples address data and control signals to all the internal registers associated with the functional blocks of the video system controller 22. The interface register 160 thus controls the loading of the registers internal to the controller 22. The control signals for loading the register are generated utilizing timing signals coupled to the register interface 160 from a relative timing circuit 164 and an absolute timing circuit 166 via timing signal bus 168, as shown. Control signals are also coupled between the register interface 160 and the interface controller 24 via the control bus 106. A reset signal is coupled to the register interface 160 on the reset line 113. The register interface 160 also controls coupling of signals and data back to the host computer 50 through the interface controller 24 via the bus 34.

The absolute timing circuit 166 generates programmable synchronization signals optionally locked to an external synchronization or video source, including horizontal and vertical blanking, and front and back porches. Thus, the absolute timing block can provide a wide variety of programmed or genlocked synchronization and timing signals to generate or synchronize with almost any video standard. These synchronization signals are coupled to the various function circuits of the controller 22 via a sync bus 170, the csync line 104, the vsync line 102 and the control bus 92. In addition, the absolute timing circuit 166 generates timing signals to control capture of video data to the video memory 56 which are coupled to a video capture multiplexer 190 via a control bus 172 and to the input module 40 via the control bus 86, as shown. Programmable line, field, and frame interrupts, as well as light pen interrupts, are also generated by the absolute timing circuit 166. The absolute timing circuit utilizes system and pixel clock signals coupled from a master clock generator 184 on a clock bus 186, external signals coupled on the buses 80, 100, and capture window enable signals coupled on an enable bus 174 to generate synchronization, capture enable and interrupt signals. The absolute timing circuit 166 also generates timing signals which are coupled to the relative timing circuit 164 via a bus 165, and absolute x and y pixel coordinate signals which are coupled to a window control circuit 176, a line control buffer 178 a multiplier 202 and a color look-up table 180 via a bus 182, as shown.

The relative timing circuit 164 is a programmable circuit which controls relative video memory bank configuration to control concatenation of the video memory bank via a control bus 38 to permit the video memory banks to be configured in many arrangements. It also generates control signals to coordinate use of the video bank for capture of video data and couples control signals to the video capture multiplexer 190 via a control bus 188, as shown. The relative timing circuit 164 also processes absolute timing signals coupled from the absolute timing circuit 166 on a line 165 and generates video memory bank addressing to allow for special effects such as panning, zooming, mosaicing, etc. An address translator within the relative timing circuit 164 permits remapping of the addresses provided by the absolute timing section to new addresses. Control signals are also generated to control a video input circuit 192 to control video input from several sources. The relative timing circuit 164 utilizes timing signals coupled from the absolute timing circuit 166, and enable signals from the window control circuit 176, as shown, as well as clock signals coupled from the clock generator 184 via the clock bus 186.

The video input circuit 192 comprises memory decoder and de-multiplexer circuits which process video data coupled from the video memory banks 56 via the video data bus 36, and from the A/D converter 70 of the input module 30 coupled via the data bus 74. Video data may also be coupled to the video input circuit 192 via the digital video data buses 96, 98 from the video port 54. The data from these sources is coupled by the video input circuit 192 to one of several internal video buses including live A/D bus (LADC) 194 (e.g., 24 bits) a live digital video port (LDIG) bus 196 (e.g. 32 bits), a video bus one (DV1) 198 (e.g., 24 bits) and a video bus two (DV2) 200 (e.g., 32 bits), which are coupled to a multiplier circuit 202, a video range thresholding circuit 204, the color look up tables 180, a display multiplexer 206 and the video capture multiplexer 190, as shown. The video input circuit 192 also performs parallel to serial conversions of video data for display of single, double and quad bit data, as well as parallel expansion of word data. A decoding function provides the capability for interpreting and decoding compressed image formats. Control signals for controlling the video data input and output are coupled from the relative timing circuit 164 via a control bus 173, as shown. In addition, the video input circuit 192 couples alpha buffer data to an alpha buffer control circuit 212 via a data bus 214 and control signals to the color look up table 180 via a control line 216.

The alpha buffer control circuit 212 interprets pixel values from the alpha buffer of the video memory 56 (i.e., the first of the four video banks) as commands in several different programmable modes. The alpha pixel commands enable or disable other operations or modes on a pixel by pixel basis enabling pixel by pixel control of the video display. The alpha buffer control circuit 212 utilizes alpha buffer data coupled from the video input circuit 192 via the data bus 214 to generate alpha buffer control data coupled on a control bus 221 to the multiplier 202 and a control bus 296 to other functional circuits of the controller 22 to control functions on a pixel by pixel basis. The alpha buffer control circuit 212 also generates alpha buffer priority data coupled to the video priority resolver 208 via a control bus 220 and control signals which are coupled to a thresholder via a control bus 298.

The line buffer control circuit 178 interprets commands stored in the line command buffer 90 which are coupled to the line buffer control circuit 178 via the address/data line 34. Absolute x pixel coordinates are also coupled to the line buffer control circuit 178 from the absolute timing circuit 166 by bus 182, as shown. The line buffer control circuit reads commands from the line command buffer to enable or disable other modes or operations before scan lines are read from video memory and at programmable absolute x coordinates along a line. Thus line basis which are coupled to the video priority resolver 208 via a control bus 222, and generate control signals on a line basis which are coupled to the multiplier 202 via a bus 224. In addition, control signals are generated which are coupled via a control bus 227 to various functional circuits of the video system controller 22 to enable or disable functions on a line by line basis.

The window control circuit 176 generates control signals to maintain four rectangular window regions in absolute x and y pixel coordinate space utilizing values loaded into internal registers. The x and y pixel coordinates are coupled from the absolute timing circuit 166 via the bus 182. The window control circuit generates window capture signals which are coupled to the timing circuits 164, 166 on the enable bus 174, and generates priority signals based on internal register values for each of the four windows to define window boundaries which are coupled to the video priority resolver 208 on four window priority buses 225, 231, 228, 229. The window priority is arbitrated within the window control circuit; only the highest window priority signal is passed to the priority resolver.

The multiplier circuit 202 comprises primarily a matrix of nine dedicated signed 10×9 bit high speed multipliers which can perform a multiplication in less time than required to display one pixel. The multiplier 202 can select from six input video sources which include the live A/D video bus 194, the live digital video port bus 196, the video bus one 198 and the video bus two 200, a color look-up table one (CLUT1) video bus 230 and a color look-up table two (CLUT2) video bus 232. The multipliers typically multiply a video source by a blending or mixing constant. The multiplier circuit can perform a matrix transformation on data from one of the video sources, perform a programmable blend of up to three of the video sources, perform frame averaging of an incoming static video signal and execute spatial filtering on one of the video data sources. The multiplier utilizes control and data signals from the alpha and line buffer control circuits 220, 178, as well as the video sources. The resultant multiplied signal is coupled to a multiplier video bus 234 which couples the resultant signal to the video range thresholding circuit 204, the color look-up table 180, the display multiplexer 206 and the video capture multiplexer 190. In addition, a partial sum is also generated and coupled to a partial sum bus 236 which is coupled to the display multiplexer 206 and the video capture multiplexer 190, as shown. More than nine multipliers may optionally be used, for example, a four by four array of multipliers would be used to permit four sources with four components each to be multiplied by up to sixteen constant values.

The range thresholding circuit 204 compares three sets of upper and lower programmable reference values loaded into internal registers on a pixel by pixel basis to incoming video source data on the buses 194, 196, 198, 200, 230, 232, 234. More than three sets of reference values and comparisons may optionally be provided. Based upon the comparison, priority and source signals are generated and coupled to the video priority resolver 208 on a priority bus 240. The range thresholder may also output a priority and source for those pixels that define a transition or change in the input video source, such that comparisons that result in a change of the thresholder output also result in the generation of a programmable plurality of transition pixel priorities and sources.

The priority resolver 208 examines six priority input signals coupled from the alpha buffer control 212, the line buffer control 178, the range thresholder 204, the video input circuit 192, the window control 176, and the color look-up table 180 of the video system controller 22, each of which has an associated dynamically programmable priority level and video data source designation, and determines for each pixel which video source has the highest priority. The priority resolver outputs an index signal referencing the highest priority video source on a bus 238 which is used by the display multiplexer 206 to output the highest priority video source.

Since the display priority level is programmable, it is possible that two or more video sources could have the same priority level for the same pixel. If this priority level is the highest level at the pixel, then an implicit priority order is used wherein the video data source with the highest implicit priority is selected (e.g., in the illustrated embodiment the implicit order is the order of the inputs to the resolver 208 as follows: buses 220, 222, 225, 231, 228, 229, 201, 203, 181, 183, 240). It is also possible that there may be no contenders of any priority level at a given pixel. In this case, a programmable default video data source is selected to be displayed in the absence of any other. The thresholder circuit 204 also generates control signals which are coupled to the capture multiplexer via a bus 406, as shown.

The display multiplexer 206 selects for display a video source from one of the video buses 194, 196, 198, 200, 230, 232, 234, 236 coupled to it under the control of the select signals from the priority resolver 208 on the select bus 238 and on a default line 239. The selected video source is coupled to the D/A converter 26 via the video data bus 94 for display and to the video capture multiplexer 190 on the data bus 207, as shown.

The video capture multiplexer 190 is a multiplexer and encoder circuit which controls storing of video data arriving at its inputs into the video memory buffers 56 or coupling the data to the digital video port 54, and which encodes the video data into formats suitable for writing to the video memory 56 or the digital video port 54. The input video sources are the video buses 194, 196, 200, 234, 236 and the output data bus 207 of the display multiplexer 206, as shown. Control and timing signals are provided from the absolute timing circuit 166 and the relative timing circuit 164 via control buses 172, 188. The video capture multiplexer 190 also provides serial to parallel conversion of the video data for storage of single, or double byte pixel data. In addition, the video capture multiplexer 190 provides the capability to encode video data in one of two compressed forms: YCc and RGB555 and to store a single component of the video data in any one or all four of the video memory banks 56. The data is output onto the video data bus 36 to the video memory banks 56 or on one of the digital video data buses 96, 98, to the digital video port 54.

The color look-up table (CLUT) 180 is provided to permit remapping of color pixel values, CCC decoding, gamma correction and to provide a hardware cursor mode. The absolute x,y pixel coordinates on the bus 182, CCC bit map signals on the bus 216 and video bus sources 194, 200, 234 are utilized by the CLUT 180. Based on three inputs the CLUT 180 provides output video data to a color look-up table one (CLUT1) video bus 230, a color look up table two (CLUT2) video bus 232, and two color look-up table display priority signals coupled to the video priority resolver 208 on the priority buses 181, 183, as shown.

A color look-up mode permits selection of an output pixel color based on an index value using three color look up tables (one for each of three components). An input value from one of the input video sources is used as an index into all three tables simultaneously. The three values referenced by the index are then used as color components of a pixel which are output on one of the video buses 230, 232. The color look-up table is divided into two somewhat similar halves, but both halves can be joined to provide a color look-up table which is larger. A gamma correction mode permits compensation for non-linear characteristics of video sources at different signal levels. In the gamma correction mode, one half of the table is used as three independent color tables and each of the three color components of the input video source are used as an index into its own color table. The values referenced by the indices are then used as the new color components for the output of the color look-up table 180. Thus, a video source can have its color components individually corrected or remapped. In the hardware cursor mode, the color look-up tables are used to control a small rectangular region of pixels at a programmable continually variable location.

The system module 20 is a programmable and highly flexible digital processing device capable of a wide variety of digital special video effects and video manipulation. The system module 20, in the preferred embodiment, plugs directly into a NuBus slot in, for example, an Apple Macintosh II series computer. The system module 20 supports all standard video display modes permitting it to be configured with virtually any video monitor. The input module 40 supports capture of an image from an external source which may be such sources as an RGB video camera, a time-base corrected video tape or disc player, or virtually any device that can generate a component RGB video signal. The input module 40 also supports a light pen and the system module 20 can retain the last absolute x,y position of the light pen on the displayed image. Most of the operations of the system 10 are accomplished in the digital domain, and therefore, there is no loss of detail as commonly experienced with analog effects. In addition, the effects are accomplished in real time in most cases and utilize static images, animated computer graphics, or real-time video sources.

Due to the programmable timing circuitry 184, 164, 166 of the video system controller 22, the system module 20 provides highly flexible timing which can be configured to match the timing specifications of virtually any video standard such as NTSC, PAL, etc. Timing options include interlace, repeat field, and noninterlace video generation. When generating an interlace video signal, the system module 20 can provide equalization and serration pulses. Data encoded in the vertical blanking intervals such as SMPTE, VIR, or closed caption may normally be blocked but may be optionally passed through. Timing circuity may also be configured to synchronize to an external video source(genlock) or an external synchronization source. The signal generated is in synchronization with the incoming video signal or synch. If the incoming video signal or synch timing is of broadcast standard, the system will produce an output broadcast standard.

Video data can also be output in analog form using a conventional D/A converter 26 to encode the signal into composite analog form. A digital video bus port 54 is provided which permits the exchange of digital video information with other digital video devices coupled to the system. For example, the digital video bus allows direct interconnection of multiple system module 20 circuits or other input or output devices. A wide variety of digital special effects are made possible by the programmable multiplier array 202 and other circuits including mosaicing, pixelization, posterization, solarization, blending, filtering and anti-aliasing. These visual effects are generated in the digital domain and thus many are virtually impossible to do in analog circuitry.

The mosaic effect replaces an image with fewer, but larger "pseudo pixels". This effect may be accomplished in the horizontal or vertical direction. The ratio of the size of the original pixel to the pseudo pixels is highly controllable and programmable. Pixelization is accomplished by mosaicing in both the horizontal and vertical directions. The horizontal and vertical mosaic factors do not need to be identical. This pixelization effect can be used in conjunction with live video mixing to produce the effect commonly used to obscure witness identities or to censor images for television display. Posterization is an effect which restricts the image to a subset of the colors actually present, and sets areas closely related in color or value to the same pixel color and value. This effect is similar to the photographic posterization effect except that the video effect is continuously variable and reversible. This effect may be accomplished by mathematically clipping off less significant bits of the pixels (i.e., truncation). Solarization is an effect that creates a false color or pseudo color effect which is also highly programmable and reversible.

The system module 20 also provides noise generation which produces linear and Gaussian white noise to create a display effect which is similar to that created by a television set which is not tuned to a station. Noise generation is particularly useful for filtering and can be used to control other effects. Since the digital system module 20 provides sharp transitions in an image, some aliasing or image artifacts may appear as a result of the sharp transitions in the image in video formats such as NTSC. This aliasing can be corrected by the real-time anti-aliasing capability of the system module 20 which is capable of performing such functions as fades and mixes while also simultaneously performing anti-aliasing.

Other special effects include traditional video switcher effects and image manipulations including vertical and horizontal scaling, zero order effects and vertical interval manipulations. The system module 20 can independently scale or zoom an image by integer multiplication factors in both horizontal and vertical directions. The appropriate part of the image is replicated along a line in the horizontal direction and the appropriate video lines are repeated as needed. A vertical mirroring effect can be produced by the system module 20 by displaying the top half of the display in reverse vertical order from the bottom half. Any kind of repeating or mirroring in the vertical direction is possible, including vertical reversals or flips and venetian blind effects. Rolling or panning can be performed by displaying different parts of the same image over time. Horizontal and vertical rolling can be performed independent of each other. If an image is being displayed which is much larger than the display area, the image can be "paged through" one display screen at a time.

Conventional video effects such as pulls and pushes can be performed by capturing the video signal and using the appropriate rolling effect. A drop shadow effect can be produced which edges a video image or portion of an image with a selected color or effect. The system can also capture such signals as automated color signals, SMPTE, time code signals and other codes that are inserted into the vertical interval in a video signal and can pass them through or remove them. Some subsets of these codes such as the SMPTE code can be generated or modified as well. The system module 20 is also capable of character generation and can operate in an anti-aliasing character generation mode in which high quality character generation is produced with the number of fonts, faces styles and sizes limited only by the host computer software. The system sill retains the capability to perform such functions as fades and mixes while in this anti-aliasing graphics mode.

Other special video effects such as wipes, fades, video mixing and thresholding are other video effects and functions which may be performed in real time with the system 10. A wipe can be performed from one image source to another with virtually any direction and speed. A fade can be accomplished by mixing a percentage of one image with a percentage of another image. Video mixing allows the video to appear to overlay or go behind other video sources. Multiple windows can also be controlled in real time. Operations such as geometric dissolves, fades, and mixes between two image sources are supported and include square, circular, triangular or other shaped transitions from one image to the next. Any arbitrary shape or shapes can be programmed in switching from one video source to another, and the switch can be hard or soft edged. These effects can be controlled on a frame by frame, line by line, or pixel by pixel basis.

The system module 20 also provides for blending or mixing operations by taking a selected percentage of one image and adding it to a selected percentage of another image. A selected percentage of a third image may be blended in as well. This third image could be used, for example, to add a texture to the blend of the first two. This video mixing is accomplished under the control of a digital fader or level control and noise generation can be used to control blending or mixing of the two images. Thresholding allows a range comparison to be made on a component of color. The result of this comparison can be used, for example, to determine a "key" to control which video source to display at any point on the screen. Multiple thresholders 204 in the system module 20 can be logically combined to create key methods that are currently unavailable, as well as standard types, like "chroma key" and "luma key". Shadowed areas in a chroma key area can be used to alter the luminance of the background graphics, creating a live "pseudo shadow" on top of the graphic image.

Image capture capability is also provided by the input module 20 which involves a digitization of live video signals from an external analog source and recording the data into digital video memory 56. System module 20 in conjunction with the input module 40 is capable of continuously capturing a complete color video frame in real time and processing the digitized data in real-time. For example, a standard NTSC mode frame can be captured 30 times a second with the capture rate flexible enough to be compatible with the characteristics of virtually any incoming video signal. Strobing may be accomplished by repeatedly capturing a video image and holding for short duration before capturing the next image. Selective capture is provided by restricting the capture of live video on a line by line or pixel by pixel basis. The system provides direct support of RGB color space and can be configured to work in YUV, YIQ, and other common color spaces.

The system module 20 supports many computer display modes, including the standard display modes of the Apple Macintosh II series computer. Color look-up table operation modes including the Apple Standards are also supported wherein the display shows a number of user selected colors from a palette of over 16 million colors. In these modes, a reasonable selection of colors is attainable using a smaller amount of memory for the image itself. These modes are commonly called one, two, four and eight bit color look-up table modes. Additionally, the system module 20 supports a nine bit color look-up table format. In the one bit color look-up table mode, a single bit in the image memory determines which of two colors, each specified with 24 bits RGB precision, is to be displayed at that pixel. A 2 bit mode utilizes two bits in the image memory which determine which of four colors, each specified with 24 bit RGB precision, is to be displayed at each pixel. In a 4 bit mode, a group of 4 bits in the image memory determines which of 16 colors, each specified with 24 RGB precision, is to be displayed at each pixel. An 8 bit mode provides a group of 8 bits in the image memory which determine which of 256 colors, each specified with 24 bit RGB precision, is to be displayed at each pixel. The 9 bit mode provides a group of 9 bits in the image memory, which can be used in two different ways: it can determine which of 384 colors each specified with 24 bit precision is to be displayed at each pixel, or it can determine which of 512 colors, the first 256 of which are specified with 24 bit precision and the second 256 of which are specified with 16 bit precision, is to be displayed at each pixel.

In addition, a direct pixel display mode is provided in which millions of colors may be displayed simultaneously with the only limit being the number of pixels on the screen. The direct pixel display is provided in a 16 bit mode in which a group of 16 bits are treated in four parts, 5 bits each for red, green and blue components, and 1 bit which is designated as an alpha bit whose significance varies. This mode is also known as the RGB 555 mode. An RGB 565 mode in which the green component uses six bits (the original five plus the alpha bit) is also provided. A 32 bit mode is also provided in which a group of 32 bits are treated as four parts: 8 bits each for the red, green, and blue components, and the 8 bits left over are designated as an alpha byte, whose meaning is variable. This mode is also designated as the RGB 888 mode. The system 10 can use the eight bit alpha byte for a wide variety of enhanced effects which can be performed on a pixel by pixel basis. Since only 3 sets of 8 bits are being used for color information, this mode is also sometimes referred to as a 24 bit mode. TP Filtering operations are also provided which allow the color at any location on the screen to be affected by the colors around it. Filtering operations can be affected by selected color space components at each location.

Using the memory module 30, the system 10 in the illustrated embodiment can contain up to 8 MegaBytes of video memory in the form of conventional video DRAM. This memory is contiguous in the system address space and is organized such that consecutive raster lines are an equal distance apart in memory. This distance between lines is called rowbytes, and is even. Also video memory can be used for capturing images using the A/D converter 70 of the input module 40.

Video memory is divided into four banks—A, B, C, and D. These banks normally hold images that can be displayed. When displaying from video memory, many different modes are possible. The most straight forward mode contributes the red, green, and blue components from the B, C, and D banks. Other modes may display from just a single bank, or a concatenation or combination of multiple banks. For example, the A and B banks can be treated as independent 8-bit/pixel banks (e.g. eight bit color look up table), or can be combined to act as a single 16-bit/pixel bank (e.g. RGB555). Alternatively, the banks can be concatenated horizontally or vertically. For example, two 1K×1K 8-bit banks can be treated as two separate 8-bit banks, as a 1K×2K 8-bit bank, as a 2K×1K 8-bit bank, or as a 1K×1K 16-bit bank. Although the A and B banks were used in this example, these banks would be used for displaying red, green, and blue component data.

In addition, there is great flexibility in the way the bank data can be displayed. The bank data can represent a color look up table (CLUT) image, where each pixel value represents an index to an RGB color. The bank data can be combined into direct pixels, where each pixel has red, green, and blue components which directly represent a color. The banks can also represent YCc (this notation is short for YUV or YIQ), DYUV, or CCC pixels (which are a compressed form of YCc or RGB pixels).

The position and timing for each bank is independently controllable relative to the absolute screen position. Each bank has an associated X and Y offset (this can be used for panning), a horizontal and vertical zoom factor, and a horizontal and vertical mosaic factor for varying the position of the bank and apparent pixel size. The horizontal and vertical zoom and mosaic factors are independent so that the aspect ratio may be altered. The video system controller 22 can manipulate a variety of display sources and control their display on a pixel by pixel basis using display priorities. Thus, at any given pixel, the highest priority display source is selected by the priority resolver 208. For example, if there are two rectangular windows which overlap, the window with the highest display priority is displayed as if it is on top.

There are seven different display sources that the video system controller 22 can control in one of two formats; twenty-four bits RGB, or eight bits gray scale. When an eight bit display source is selected, the eight bits are copied to each of the red, green, and blue components, thus providing a 24 bit grey scale display source. There are three fixed format sources which provide 24 bit data and three fixed format eight bit sources which provide 24 bit gray scale data. The thirteen different display sources are - Live A/D, Live Digital In, Video Bus one, Video Bus two, CLUT 1, CLUT 2, multiplier output, partial sum output, default color one, default color two, Live Digital in alpha channel, Video Bus Two alpha channel, and truncated partial sum output. The first seven of these display sources are the seven dual format sources. The next three of these display sources are the three fixed 24 bit sources. The last three of these display sources are the three fixed eight bit sources.

Analog live video can be fed to the input module 40 and the analog signal may be converted to 24 bits (8 red, 8 green, and 8 blue) by the analog to digital converters 70. These 24 bits are put on the Live A/D video bus 194 (LADC) and can be selected as one of the RGB display sources. The 32-bit digital video port 54 can accept live digital 32 bit data (Live Digital In bus 196-LDIG). This could for example be from the output of another system module 20. The low 24 bits of this can be selected as an RGB display source. The upper eight bits can be used to represent an intensity, and can be selected as an eight bit display source (which is expanded to 24 bits). The video system controller 22 contains two internal video buses: Video Bus One 198, and Video Bus Two 200. Video Bus One is a 24-bit RGB data path and Video Bus Two is a 32 bit ARGB data path. These data paths carry digital video information just as the Live A/D and Live Digital in data paths. However, in this case, the source of the information on the video buses comes from the video memory banks 56.

The video system controller 22 also contains two Color Look Up Tables (CLUT) which expand color indexes to 24-bit RGB data sources 230, 232. In addition, each CLUT can be put in a hardware cursor mode which displays a 16×16, or 32×32, 24-bit image. These CLUT sources 230, 232 are two of the RGB display sources. The multiplier 202 outputs can also be used as a display sources. In some modes, the upper eight bits of the multiplier array sum 236 may represent a partial sum output and can be used as a gray scale display source. Two additional video sources are provided by two default color registers with each register representing a 24-bit RGB color. Both default colors can be used as display sources.

Figure 4:
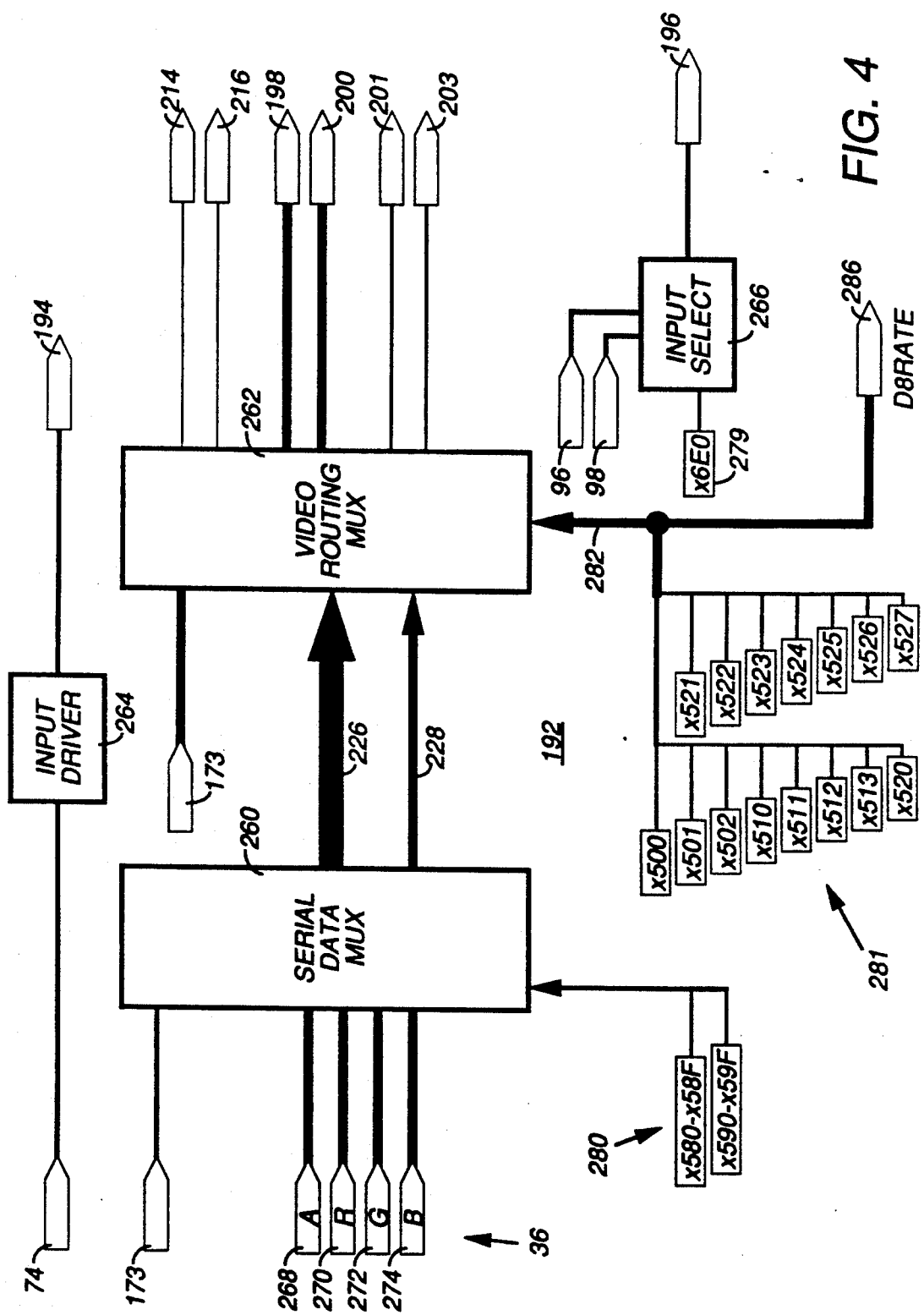
FIG. 4 is a detailed block diagram illustrating a specific embodiment of the video input interface shown in FIG. 3 in accordance with the invention.

Referring now to FIG. 4, there is shown a detailed block diagram of a specific embodiment of the video input interface 192 comprising primarily a serial data multiplexer 260 and a video routing multiplexer 262, together with an input driver 264 and an input select circuit 266, as shown. Serial digital video data is coupled to the serial data multiplexer from the video memory 56 via the video data bus 36 made up of four component buses 268, 270, 272, 274 for the alpha red, green and blue components. In addition, a set of control signals is coupled to the serial data multiplexer from the relative timing circuit 164 via the bus 173 and a set of control registers 280 also provide initial values of the DYUV mode. The serial data multiplexer demultiplexes the serial data from the bus 36 and couples it through on a 128 bit video data bus 226 to the video routing multiplexer 262. The control signal bus 173 includes a control line for initializing the DYUV mode and a data bus 228 couples DYUV decoded data from the serial data multiplexer 260 to the video routing multiplexer 262. The control signal bus 173 also couples control signals to the video routing multiplexer 262, as shown.

Also coupled to the video routing multiplexer 262 is a set of control registers 281 which are coupled via a control signal bus 282 to the video routing multiplexer 262. The control registers 281 are the display bank mode control registers which are loaded by the register interface 160 via the bus 162 (see FIG. 3) thereby permitting programmable control of the video input interface 192. The video routing multiplexer 262 decodes video pixel data and couples the video data to the video data bus One (VD1) 198 and the video data bus Two (VD2) 200 depending on the status of the control registers 281. In addition, the video routing multiplexer may generate a display priority and source signal on the priority bus 201 and 203 which are coupled to the video priority resolver 208. The multiplexer 262 also couples the alpha buffer data to the alpha buffer control 212 via the bus 214 and generates a color look-up mode control signal on the bus 216 which is coupled to the color look-up table 180.

An input select circuit 266 is also provided which selects one or both of the video port video data buses 96 and 98 under control of a control register 279. The resulting selected input is coupled to the output live digital video port bus 196, as shown. In addition, the control registers 281 determine a control signal (D8Rate) coupled to the system circuits via the output 286 which determines the color look-up bit mode for each bank independently (i.e., 1, 2, 4, 8 bit mode). In addition, live video data from the A/D converter 70 of the input module 40 is coupled via the bus 74 to an input driver 264 which couples the live input video to the live A/D (LADC) bus 194, as shown.

Figure 5:
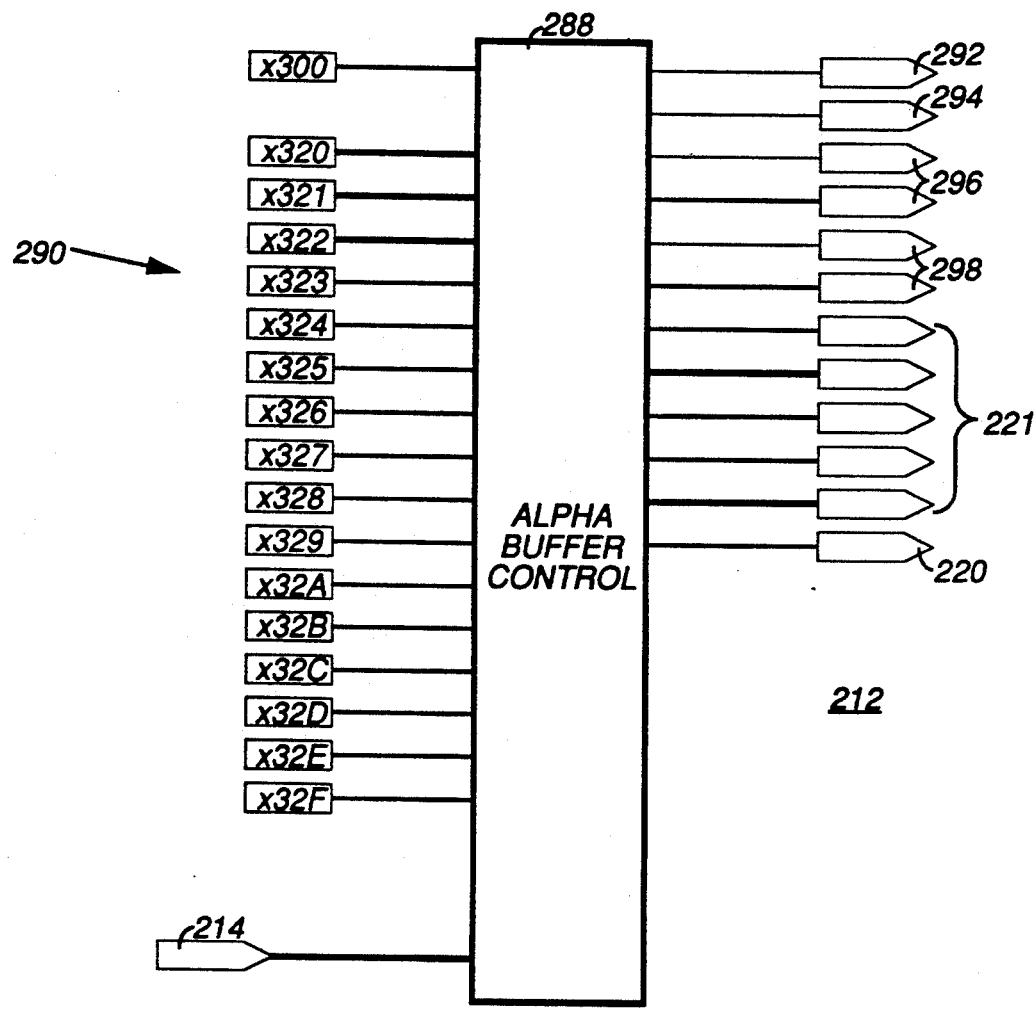
FIG. 5 is a detailed block diagram illustrating a specific embodiment of the alpha buffer control circuit shown in FIG. 3 in accordance with the invention.

FIG. 5 is a detailed block diagram of specific embodiment of the alpha buffer control circuit 212 which comprises primarily logic array 288 into which are coupled a set of control registers 290 which provide programmable control information to the alpha control array 288. In addition, the alpha buffer data is coupled from the video input interface 192 to the alpha buffer control array 288 via the bus 214, as shown. The alpha buffer is simply one of the banks of the video memory 56 which can contain image data, or the alpha buffer data can be used as a source of commands. These commands can alter the display on a pixel by pixel basis including control of a blending value for the multiplier 202, control of the inputs to the multiplier 202, control of generation of source and priority values and control of the input to the range thresholder 204. The alpha control array 288 generates control signals on a pixel by pixel basis which are primarily applied to the multiplier 202 via the control bus 221, as shown. In addition, a pixel capture control signal is coupled via a line 292 to the window control circuit 176 and an alpha capture shift clock enable signal is coupled to the relative timing circuit 164 via a control line 294. A set of enable capture signals are coupled to the display multiplexer 206 via a control bus 296 and a set of enable and threshold signals are coupled to the range thresholding circuit 204 via a bus 298. Priority and source signals are also coupled from the alpha control 288 to the priority resolver 208 via the control bus 220.

Figure 6:
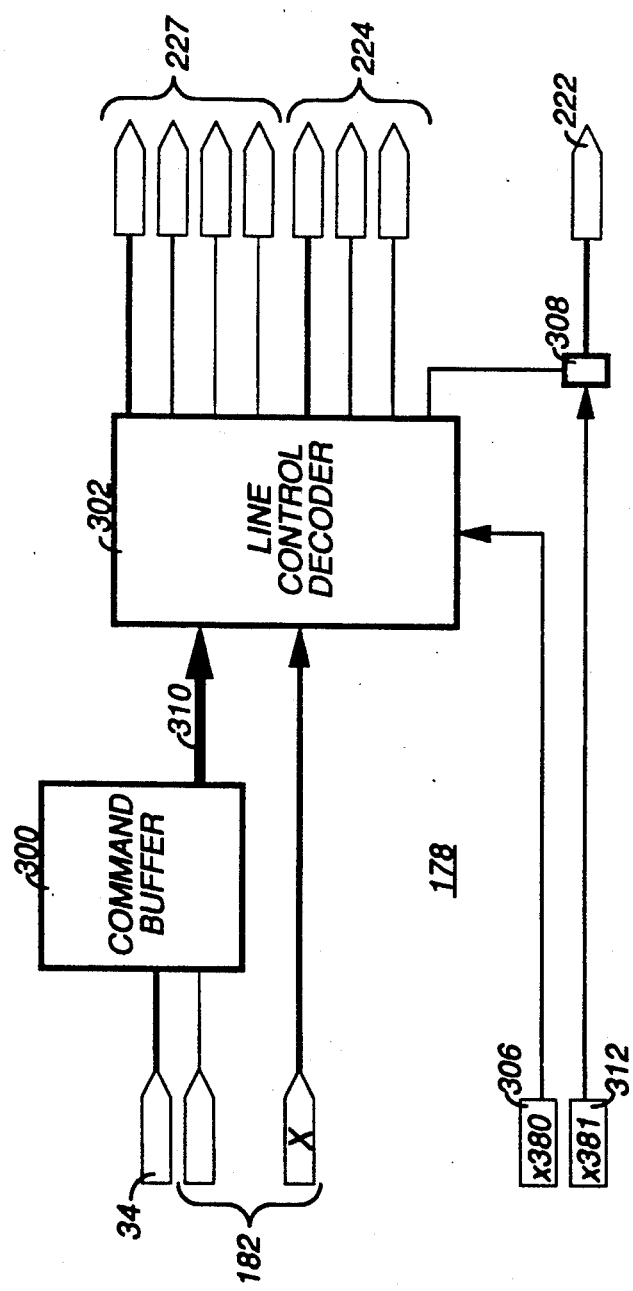
FIG. 6 is a detailed block diagram illustrating a specific embodiment of the line buffer control circuit shown in FIG. 3 in accordance with the invention.

Referring now to FIG. 6, there is shown a detailed block diagram of a specific embodiment of the line buffer control 178 comprising primarily a command buffer 300, a line control decoder 302, and a set of control registers 306, 312, and a combiner 308, as shown. The command buffer accepts line commands from the line command buffer 90 via the address/data bus 34. The command buffer is dual ported so that while signals are being coupled out of the command buffer 300, additional command information can be read in. Also coupled to the command buffer 300 are control signals pulled from the absolute timing circuit 166 on the control bus 182 which control operation of the buffers. The command buffer 300 couples command signals to the line control decoder 302 via a command bus 310 and the x position of the pixel are coupled to the line control decoder 302 via the bus 182. Also coupled to the line control decoder is a mode control register 306 which is loaded by the register interface 160 via the bus 162 (not shown) and which permit programmability of the line buffer control circuit 178. The line control decoder 302 provides control signals on a line by line basis (i.e., up to sixteen commands per horizontal scan line) to the multiplier 202 via a bus 224, as shown, and several additional prescan command signals which are coupled to the other functional circuits of the video system controller 22 on a bus 227. The line control decoder 302 also generates a source signal which is coupled to a combiner 308 and combined with a priority signal from a line control priority level register 312 to generate a priority and source select signal which is coupled on the priority bus 222 to the video priority resolver 208.

Figure 7:
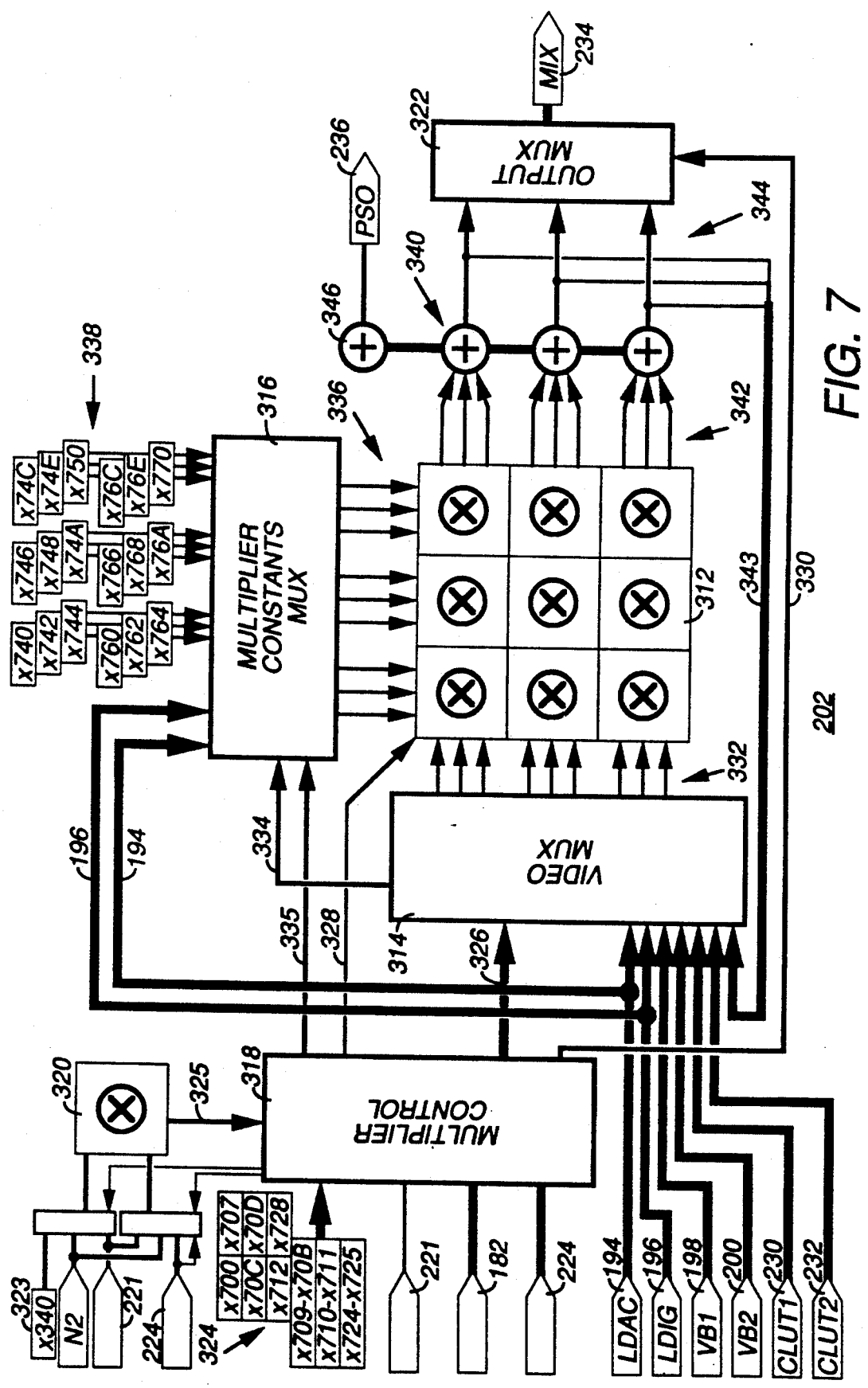
FIG. 7 is a detailed block diagram illustrating a specific embodiment of the multiplier circuit shown in FIG. 3 in accordance with the invention.

Referring now to FIG. 7, there is shown a detailed block diagram of a specific embodiment of the multiplier matrix circuit 202 which in the illustrated embodiment comprises primarily a three by three array 312 of 10×9 bit multipliers (a larger array, e.g., n by m, may be used), a video multiplexer 314, a constants multiplexer 316, a multiplier control circuit 318, a constant pre-scale multiplier 320, and an output multiplexer 322. An 8-bit alpha buffer constant is coupled via the bus 221 from the alpha buffer control 212 to two independent multiplexers, as is a source of white noise data signal. The alpha buffer constant may be changed on a pixel by pixel basis. A blend ration prescale factor is coupled from a BlendRatioScaleFactor register 323 to one of the multiplexers, and the line buffer blend constant is coupled to the other multiplexer via the bus 224. The selection of these two multiplexers is responsive to signals from the multiplier control 318 as well as a signal from the line buffer via the bus 224. The output of the two multiplexers are coupled to the pre-scale multiplier 320 as shown. The pre-scale multiplier 320 may thus perform one of nine functions: it may scale the alpha buffer constant by a register value; it may scale the alpha buffer constant by a random noise value; it may scale the alpha buffer constant by the alpha buffer constant, yielding alpha*alpha; it may scale the line buffer constant by a register value; it may scale the line buffer constant by a random noise value; it may scale the line buffer constant by the alpha buffer constant; it may scale the noise source by the register value; it may scale the noise source by the same noise source, yielding Gaussian noise; and it may scale the noise source by the line buffer constant.

The result of the pre-scale multiplier 320 is coupled to the multiplier control 318 via the bus 325. Typically, the pre-scale register factor is changed on a frame-to-frame basis. The pre-scaled constant is then coupled from the multiplier control 318 to the multiplier constants multiplexer 316 via a bus 335. The multiplier constants multiplexer 316 then uses the pre-scaled constant to override the constants registers 338 as needed under control of control signals coupled on the bus 335 and from the video multiplexer on the bus 334.

Also coupled to the control circuit 318 from the alpha buffer control circuit 212 on the bus 221 are a set of control signals, as shown. Control signals are also coupled to the multiplier control circuit 318 from the absolute timing circuit 166 on the bus 182 and from the line control buffer 178 via the control bus 224. A set of multiplier control registers 324 is also coupled to the multiplexer control circuit 318, as shown, which control multiplier modes, sources and formats. The multiplexer control circuit 318 controls the video multiplexer 314 via a control bus 326 and also controls the multiplier array 312 via a control bus 328 and the output multiplexer 322 via a control bus 330, as shown. Thus, the multiplier controller 318 controls video source and constant selection for the multiplier 312, as well as the form of both the inputs and outputs of the multipliers 312 responsive to the control registers 324 which include MultiplierInputSource registers, Format registers and a ConstantSource register.

Also coupled to the video multiplexer 314 are six video source data buses 194, 196, 198, 200, 230, 232, along with a feedback source which is a feed back of the multiplier output via the bus 343. The video multiplexer under control of the multiplier controller 318 selects any combination of components of the video sources (within timing constraints) to provide up to three complete source signals to be applied to the multiplier array 312 and arranges the data to apply the data in the proper sequence to the multiplier array 312 via a set of data buses 332, as shown. Video multiplexer 314 also generates a white or random noise signal which is coupled via a data bus 334 to the constants multiplexer 316. The constants multiplexer 316 couples constant values (K1 through K9) to the multiplier array 312 via a set of data buses 336. The constant values (K1-K9) may be provided by a set of constant registers 338 (registers for two sets of constants K1-K9 are provided) which are loaded from the register interface controller 160, with the alpha buffer constant coupled from the multiplier controller 318, the line buffer constant coupled from the multiplier controller 318, or may derive the values to be applied to the multiplier array 312 from the white or random noise signal or video source buses 194 and 196, as shown. Thus, the constants may be from the video memory banks (VD2), a live external video source (LDIG), noise, constant registers, the line buffer, or the alpha buffer.

The multiplier matrix 312 of the video system controller 22 performs highly programmable real-time (pixel-rate) video processing. These multipliers may operate in a transformation mode, a blend mode, an 8-bit 2-D filter mode, a 16-bit 2-D filter mode, a transformation blend mode, a blend-transformation mode, and a 16-bit frame accumulator mode. Both filter modes may programmably use a 9 tap or an 18 tap filter mode, The 18 tap filter, blend-transformation, and transformation-blend modes perform two complete multiplication cycles in one pixel period. Each input and the output is specified as signed or unsigned depending on the application. Transformation and gain constants are signed 2's complement 10-bit values. The video signals R, G, B, and Y are unsigned and orthogonal chrominance components (C and c) are signed; all are 8 bit values.

The multiplier array 312 couples the multiplication results to a set of three summing circuits 340 via a set of data buses 342. The control signals coupled from the multiplier controller 318 via the bus 328 control the format (i.e., signed or unsigned) and the bit resolution of the multiplication (i.e., one to nine bits, with greater speed available with lower resolution). The multipliers 312 in the illustrated embodiment multiply the input video source pixel component values of up to three sources by up to nine input constant values, and adds the results of each horizontal row of multipliers in a set of summing circuits 340. Each of the summing circuits 340 sums the result of the three associated multiplier outputs (i.e., sums each horizontal row of three multipliers) and couples that result to the output multiplexer 322 via a set of data buses 344, as shown. An additional summing circuit 346 adds the sums of the summing circuits 340 to provide a matrix total, the sixteen most significant bits of which form a partial sum which is coupled to the partial sum output (PSO) bus 236, as shown. The partial sum output is used to provide the filter mode capability of the Multiplier circuit 202. In addition, the feedback output is provided by combining eight bits of each summed output 340 to provide a 24-bit multiplier feedback video source which is used to perform two multiplication cycles in one pixel period. The output multiplexer 322 under the control of the multiplier controller 318 couples the summed multiplier output onto the multiplier output video bus 234 in the proper format.

In the transformation mode, the multiplier array performs three by three matrix transforms on one video vector to produce another. The multiplier input source registers should all be set to the same video source for transformation modes. Several examples of this are converting a stored YCc (e.g. YIQ or YUV) image to RGB for output display, converting RGB input to YCc for storage (color or B/W) or luma/chroma keying, or color axis rotation of the RGB or YCc vector to RGB' or YCc'.

The multiplier array 202 can blend or mix three images by setting the gain factors appropriately. Each image component is multiplied by a gain factor component (constant) and the three resulting components are added together to produce the new mixed image component. This is done for all three color axes. The gain factors are specified as 3-component K vectors (i.e., $K_1$, $K_4$, $K_7$; $K_2$, $K_5$, $K_8$; $K_3$, $K_6$, $K_9$) and typically the three multiplier input sources will be set to the same value. The equations for programmable blending are indicated below with $K_1$ through $K_9$ representing the nine blend constants within matrix multiplier array.

| Red Output | = | $K_1$ *Red Input 1 |
| --- | --- | --- |
| | | + $K_2$ *Red Input 2 |
| | | + $K_3$ *Red Input 3 |
| Green Output | = | $K_4$ *Green Input 1 |
| | | + $K_5$ *Green Input 2 |
| | | + $K_6$ *Green Input 3 |
| Blue Output | = | $K_7$ *Blue Input 1 |
| | | + $K_8$ *Blue Input 2 |
| | | + $K_9$ *Blue Input 3 |

The third input might be used as an error term to enhance the quality of one of the images at the input. A subtraction of two images involves setting the first gain vector to +0.5, the second gain vector to −0.5, and a third input to be a DC offset. Fading is similar to blending where the gain factors are functions of time. If one gain increases with time while the other decreases, the first image will fade in while the second image dissolves away.

In the 8-bit 2-D filter mode the multiplier 202 can accomplish from a $1 \times N$ up to a $18 \times N$ convolution or filter of an eight bit bank in N frame times. During each pixel clock the data along a horizontal line in a bank is multiplied by the constants in the multiplier array on a pixel by pixel basis. The products are added along with a value from the partial sum input bank, and the resulting sum is output to the partial sum output bank. This mode involves using three banks simultaneously. One bank holds the data to filter; another the partial sum input (which should be initially all zeros), and the third is the destination for the partial sum output. After one frame time, the data in the partial sum output bank is the result of a $1 \times 1$ to $18 \times 1$ convolution. This data is then used as the partial sum input on the next pass, and the previous partial sum input bank is usually used for the next pass as the partial sum output bank. Subsequent passes must shift the partial sum input data one line by using the bank offset registers. After N passes, the filtering is complete. Since two banks are used for partial sum values, the multiplier 202 can only filter up to two 8-bit banks of a 24-bit color image at a time. The third bank's data would have to be swapped out while the first two banks were filtered (taking N frames for each) and then one of the banks holding filtered data would be swapped out while the third bank was swapped back in for its N frames. Filtering is limited to up to $9 \times N$ convolutions when the pixel clock is faster than one half the VCLK rate.

In 16-bit 2-D filter mode the multiplier 202 can accomplish from a $1 \times N$ up to a $18 \times N$ convolution or filter of an eight bit external source in N frame times. During each pixel clock the data along a horizontal line in the external source is multiplied by the constants in the multiplier array on a pixel by pixel basis. The products are added along with a value from the partial sum input bank, and the resulting sum is output to the partial sum output bank. This mode uses all four video banks 56 simultaneously. Two banks hold the partial sum input, and the second two are the destination for the partial sum output. After one frame time, the data in the partial sum output bank is the result of a $1 \times 1$ to $18 \times 1$ convolution on the external input data. This data is then used as the partial sum input on the next pass, and the previous partial sum input banks are used for the next pass as the partial sum output banks. Subsequent passes shift the partial sum input data one line by using the bank offset registers. After N passes, the filtering is complete.

In a 16-bit frame accumulator mode a series of 8-bit external input images are summed on a pixel by pixel basis into a 16-bit bank pair. Under normal operation this mode is enabled for 256 frames only because there is no detection for numeric overflow in the 16-bit bank pair. This mode uses all four video banks 56 simultaneously. Two banks hold the previous sum input, and the second two are the destination for the new sum output. Since all four banks are used for sum values, the multiplier can only accumulate data from an external source in this mode. This data can come from the live A/D bus 194 or the digital video bus 196. Filtering is limited to up to $9 \times N$ convolutions when the pixel clock is faster than one half the VCLK rate.

When the pixel clock is set to one-half or less of the VCLK rate (i.e, the PixelClockDivider register is non-zero), the multiplier array may be used twice for each pixel. A transformation and a blend can be accomplished in a single pixel time period by multiplexing the use of the multiplier array. Thus, the multiplier array has a duplicate set for all constant registers. The output of the first operation is also the input to the source multiplexers for the second operation. The transform-blend mode is useful for transforming YCc images to RGB and then blending with another RGB image, for example. The YCc image is transformed to the RGB color space by the first operation, and then automatically used as source input number 1 for the blend operation. Source inputs 2 and 3 work as normally during the blend operation. The blend-transform mode is useful for blending two YCc images and then transforming to RGB, for example. The YCc images from the three input sources are blended component by component, and then the result may be transformed into the RGB color space.

Figure 8:
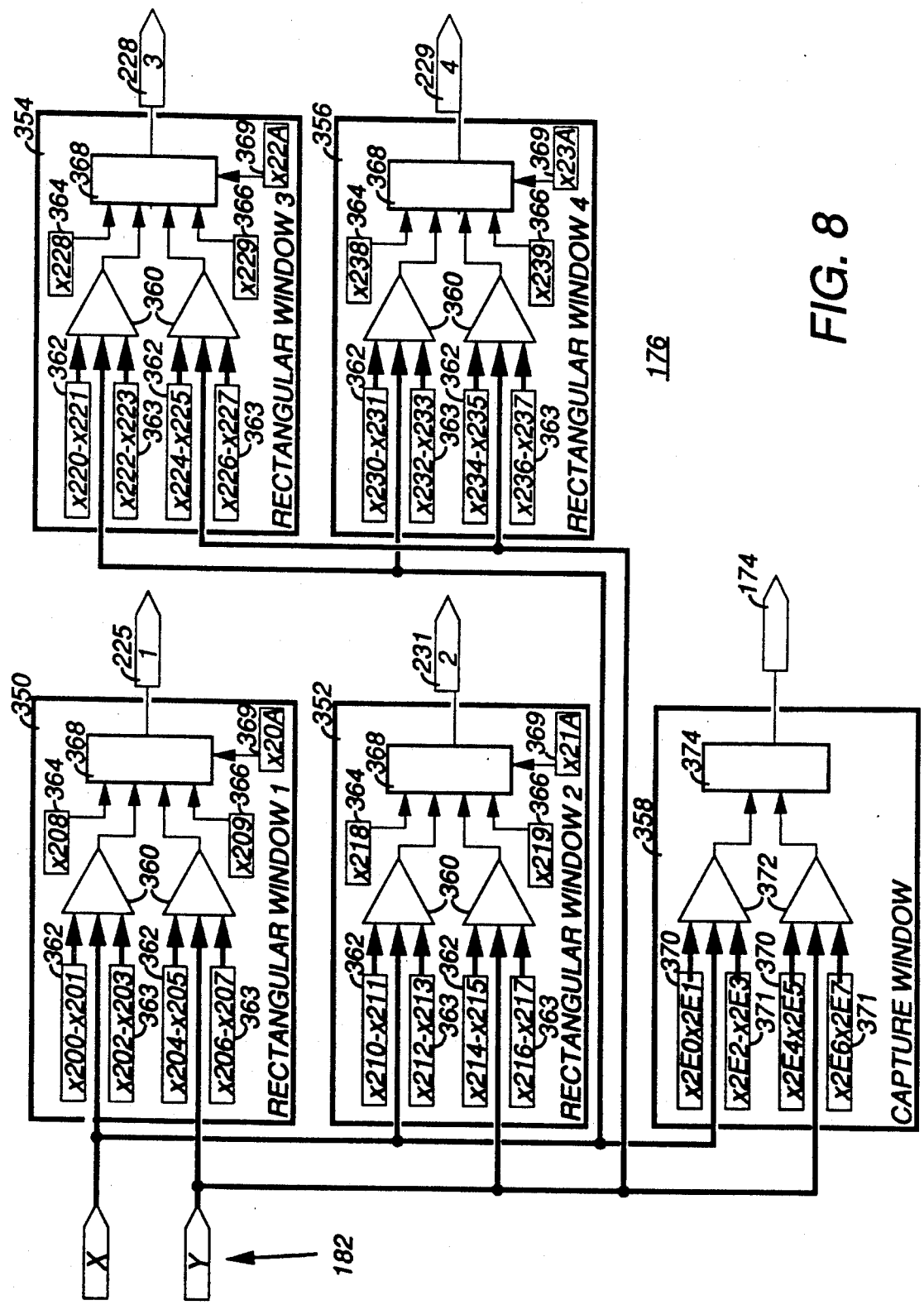
FIG. 8 is a detailed block diagram illustrating a specific embodiment of the window control circuit shown in FIG. 3 in accordance with the invention.

FIG. 8 is a detailed block diagram illustrating a specific embodiment of a windows control circuit 176 which comprises primarily a set of four rectangular window generating circuits 350, 352, 354, 356 and a capture window circuit 358, as shown. The pixel x and y coordinate positions are coupled to each of the blocks 350, 352, 354, 356, 358 via the control signal bus 182 and they are utilized to determine whether the pixel is in or out of the defined window of each of five definable windows. The windows are defined by loading the programmable registers for each of the five possible hardware definable windows. The rectangular window circuits 350, 352, 354, 356 are each composed of a set of comparators 360 and a enable circuit 368 with associated registers. As shown in block 350 (circuits 352, 354 and 356 are basically identical to block 350), the comparators 360 each have an x and a y rectangle start register 362 and an x and a y rectangle end register 363 which define the beginning and end values of the window for each of the x and the y coordinates. The x and y coordinate values are coupled to the comparators 360 and compared to the beginning and ending boundary values stored in the registers 362, 363. A signal from each comparator 360 is then coupled to the enable circuit 368 which, if enabled, couples the priority values stored in the RectangularWindowPriorityLevel register 364 and the display source value stored in the RectangularWindowDisplaySource register 366 to the respective priority bus 225, 231, 228, 229 thereby coupling the priority and source value to the video priority resolver 208. In addition, for each of the four window circuits 350, 352, 354, 356, there are values loaded into a control register 369 which specify the logical inversion of both comparators 360 outputs independently and the logical inversion of their output state, which determines which regions of the window are controlled.

The capture window circuit 358 comprises a set of comparators 372 and an enable circuit 374. The comparator circuits 372 compare the x and y coordinate values to stored high and low values in registers 370, 371 and if the x and y values are within the range of the stored coordinate values, the comparators 372 couple enable signals to the enable circuit 374 which generates a set of capture window control signals on the control bus 174 which are thereby coupled to the absolute timing circuit 166 and the relative timing circuit 164.

Figure 9:
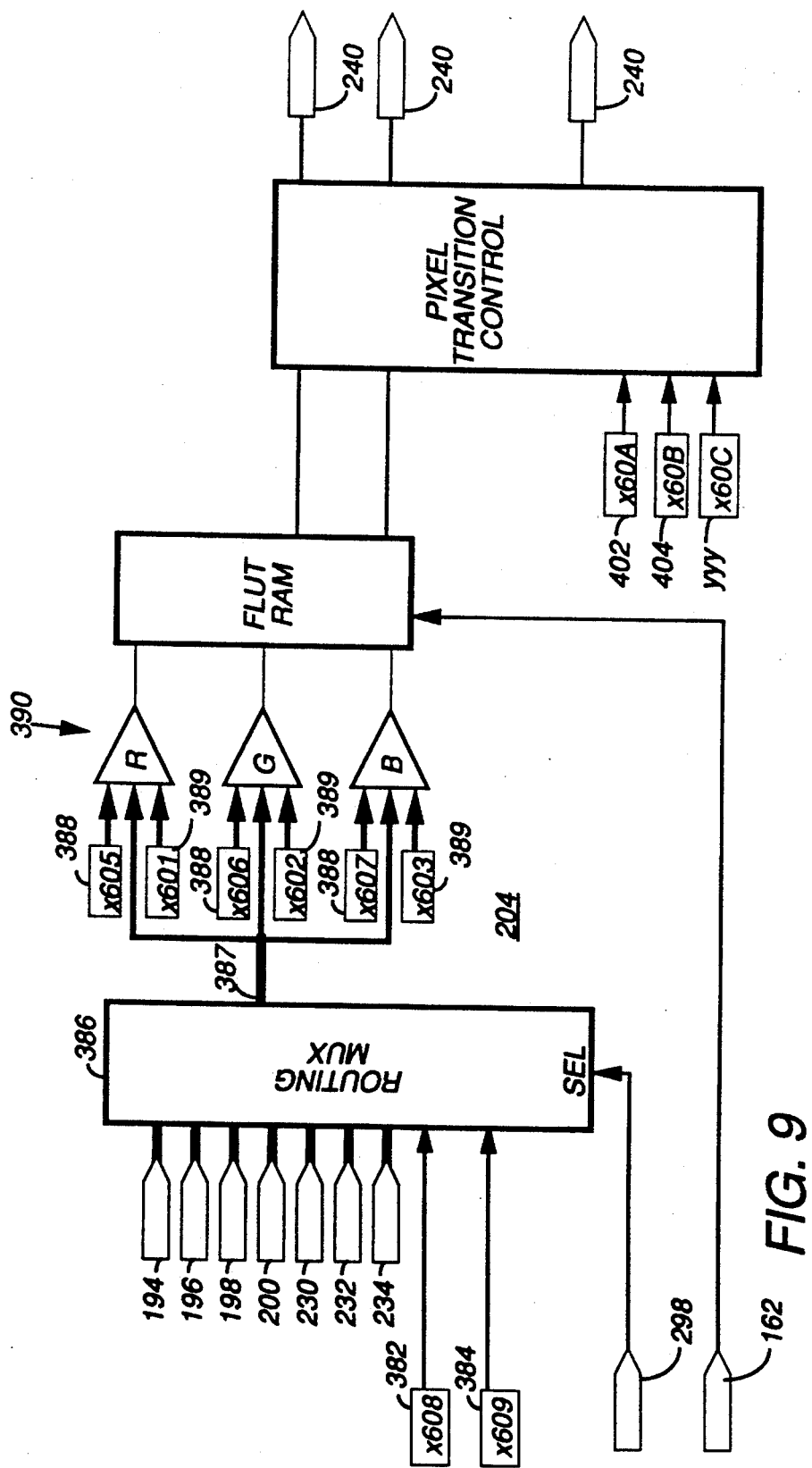
FIG. 9 is a detailed block diagram illustrating a specific embodiment of the range thresholding circuit shown in FIG. 3 in accordance with the invention.

Referring now to FIG. 9, there is shown a detailed block diagram of a specific embodiment of the range thresholding circuit 204 which comprises primarily a multiplexer 380, a routing multiplexer 386, three comparators 390, a function look up table, and a pixel transition control. A source select value from the alpha buffer control circuit 212 is coupled on a control bus 298 to the routing multiplexer 386. In addition, input mode and source format data are coupled to the routing multiplexer from a RangeThresholderInputMode register 382 and a RangeThresholderSourceFormat register 384, respectively. Eight video source buses 194, 196, 198, 200, 230, 232, 234, and the partial sum on green and blue, with red in the alpha component, of the live digital port input are coupled to the input of the routing multiplexer 386 which selects one of the seven input video sources responsive to the select signal from the control bus 298 and couples the source data (or anyone of their eight bit components spread to 24 bits) to an output video data bus 387 with the format selected by the register 384. The output bus 387 couples the three video components of the selected source, each on an 8 bit bus, to the comparators 390 representing the three color components RGB.

Each of the comparators 390 includes an input of an upper boundary from a RangeThresholderHi register 388 and a lower boundary from a RangeThresholderLo register 389 so that each pixel color component is compared to the high and low boundary value to determine if it is within the inclusive range defined by those two values. The registers 388, 389 are loaded with values through the register interface 160. The comparator 390 outputs are then used as an address into a function look up table RAM, which is programmable through the register interface 162. The outputs of the function look up table describe priority and source signals which are coupled to the pixel transition control as shown. Control registers 402 are also coupled to the pixel transition control as shown. The pixel transition control then programmably overrides the priority and source signals from the function look up table responsive to the control registers 402 when a transition in the state of the priority and source signals coupled from the function look up table is detected. The priority and source signals thus determined by the pixel transition control are coupled to the priority resolver 208 on the bus 240.

The pixel transition control also generates a signal 240 which is responsive to the priority signals coupled from the function look up table and the control registers 402. This signal is a capture signal which is coupled via a line 406 to the video capture multiplexer 190.

Figure 10:
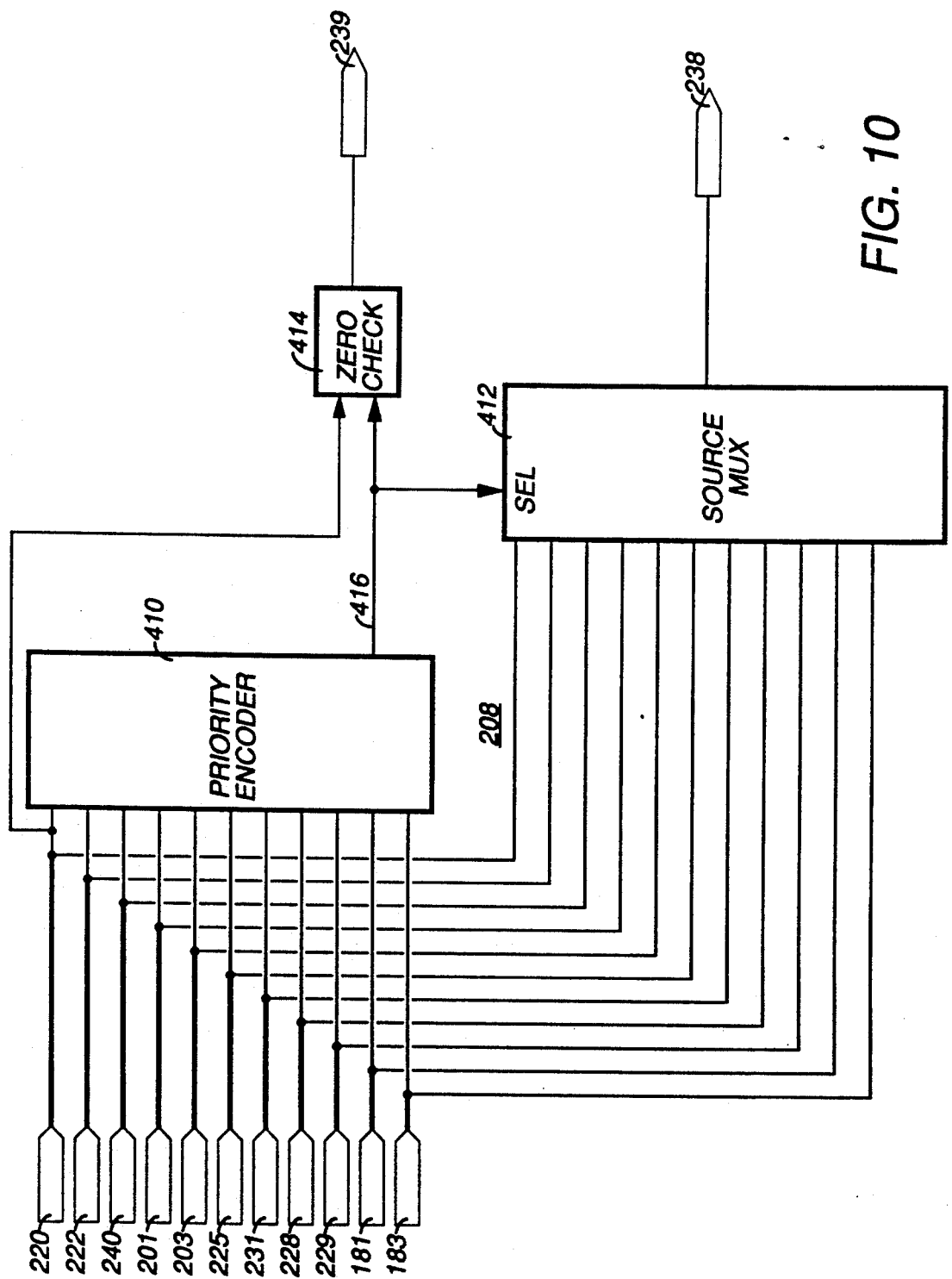
FIG. 10 is a detailed block diagram illustrating a specific embodiment of the video priority resolver shown in FIG. 3 in accordance with the invention.

FIG. 10 is a detailed block diagram illustrating a specific embodiment of the video priority resolver 208 which comprises primarily a priority encoder 410, a source multiplexer 412 and a zero checking circuit 414, as shown. The eleven priority buses 220, 222, 240, 201, 203, 225, 231, 228, 229 181, 183, are coupled as shown into the priority encoder 410, as well as into the source multiplexer 412, as shown. The priority encoder 410 is a self selecting multiplexer which examines the priority of each of the inputs and selects the highest priority input, outputting a select signal on a select bus 416 which is coupled to the zero checking circuit 414, and to a select input of the source multiplexer 412. Based on the select input, the source multiplexer 412 then couples the selected source code to the output select bus 238, thereby coupling the signal to the display multiplexer 206. The priority value from the alpha buffer control priority bus 220 is also coupled to the zero checking circuit 414. The zero checking circuit 414 checks to determine if both inputs are zero indicating that no priority existed, and generates a default detect signal on a line 239 of the bus 238 which is also coupled to the display multiplexer 206.

Figure 11:
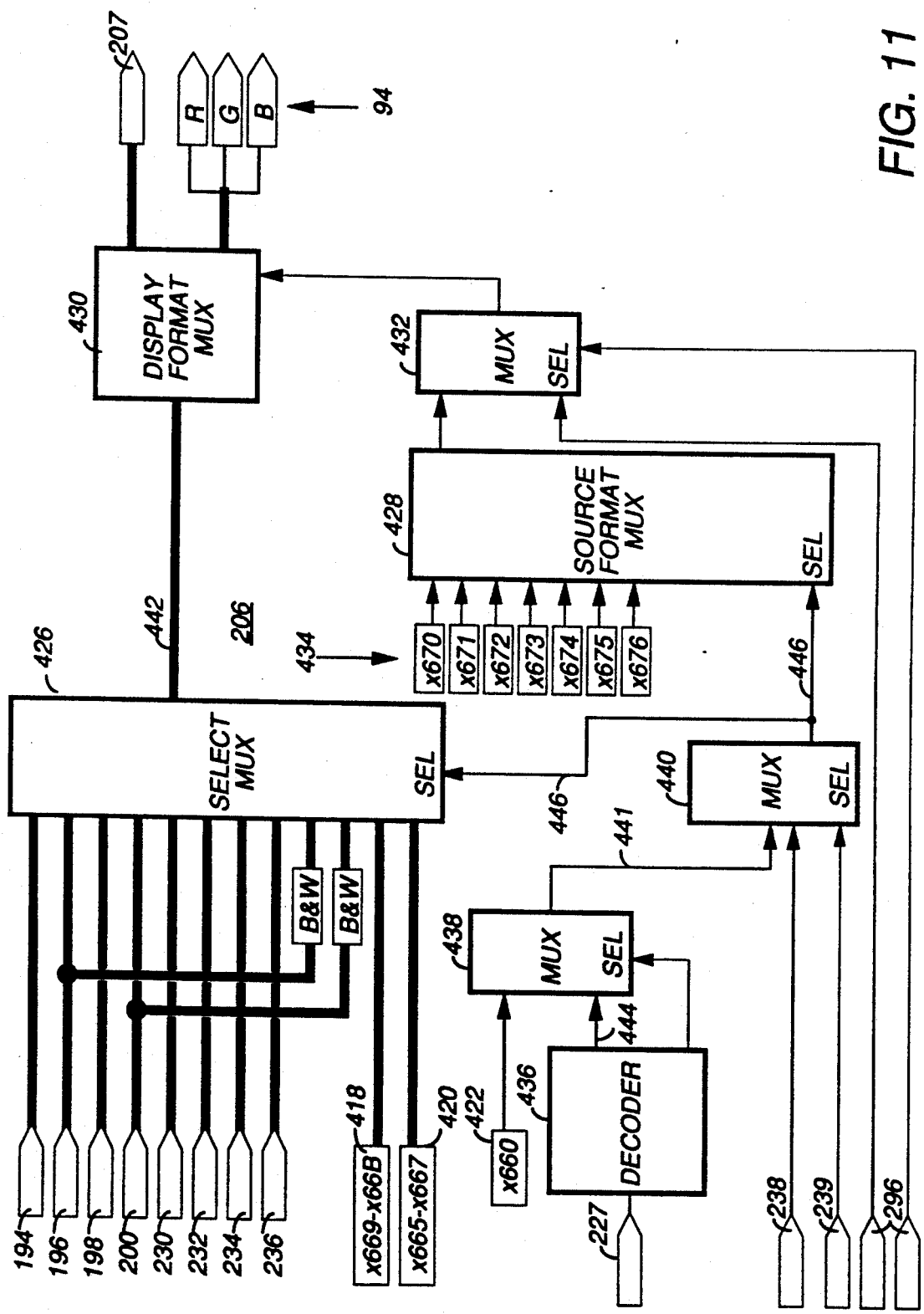
FIG. 11 is a detailed block diagram illustrating a specific embodiment of the display multiplexer shown in FIG. 3 in accordance with the invention.

A specific embodiment of the display multiplexer 206 is shown in FIG. 11 and comprises primarily a set of multiplexers 426, 428, 430, 432, 438, and 440, together with a decoder 436, as shown. Twelve input sources are provided to the select multiplexer 426, including the video source buses 194, 196, 198, 200, 230, 232, 234, and 236, together with an eight bit input of the bus 196 passed through a black and white circuit and coupled to the multiplexer 426 and an eight bit component of the video source bus 200 passed through a black and white circuit and coupled to the multiplexer 426. In addition, two sets of DefaultOutputColor registers 418 and 420 provide a first and second default color which is coupled to the multiplexer 426 and may be selected as one of the twelve selectable inputs. The select multiplexer 426 selects one of the twelve inputs based on a select signal coupled on a select line 446 from the multiplexer 440, as shown. The selected output from the select multiplexer 426 is coupled via a video data bus 442 through the display format multiplexer 430. The display format multiplexer 430 controls the format of the output and couples the formatted signal on the video data bus 207 to the capture multiplexer 190, and on the video bus 94 to the digital to analog converter 26. The selection is made under the control of a select signal coupled from the multiplexer 432, as shown.

A default display source is stored in a register 422 and loaded through the register interface 160 as are other registers and the resulting value is coupled to a multiplexer 438, as shown. Control signals from line control buffer 178 are coupled via the control bus 227 to the decoder 436 and the decoder 436 generates a source value coupled to the multiplexer 438 by the bus 444 and also couples a select signal to the multiplexer 438, as shown. The multiplexer 438 under control of the select signal selects one of the two source values and couples the result to the multiplexer 440 on a bus 441, as shown. In addition, the priority resolver selected source code from the video priority resolver 208 is coupled to the multiplexer 440 on the bus 238 and the default condition line 239 is coupled to the select input of the multiplexer 440, as shown. The multiplexer 440 under the control of the select input selects a source selection code which is coupled via the source select bus 446 to the select inputs of the select multiplexer 426 and the source format multiplexer 428. The source format multiplexer 428 includes a set of source format registers 434, which, under the control of the select signal line 446, selects a stored source format code which is coupled to the multiplexer 432, as shown. The multiplexer 432 selects between the source format output of the multiplexer 428 and the source format input of the alpha buffer on the bus 296 under the control of a select signal on the alpha buffer control bus 296 and couples the selected output to the display format multiplexer 430, as shown.

Figure 12:
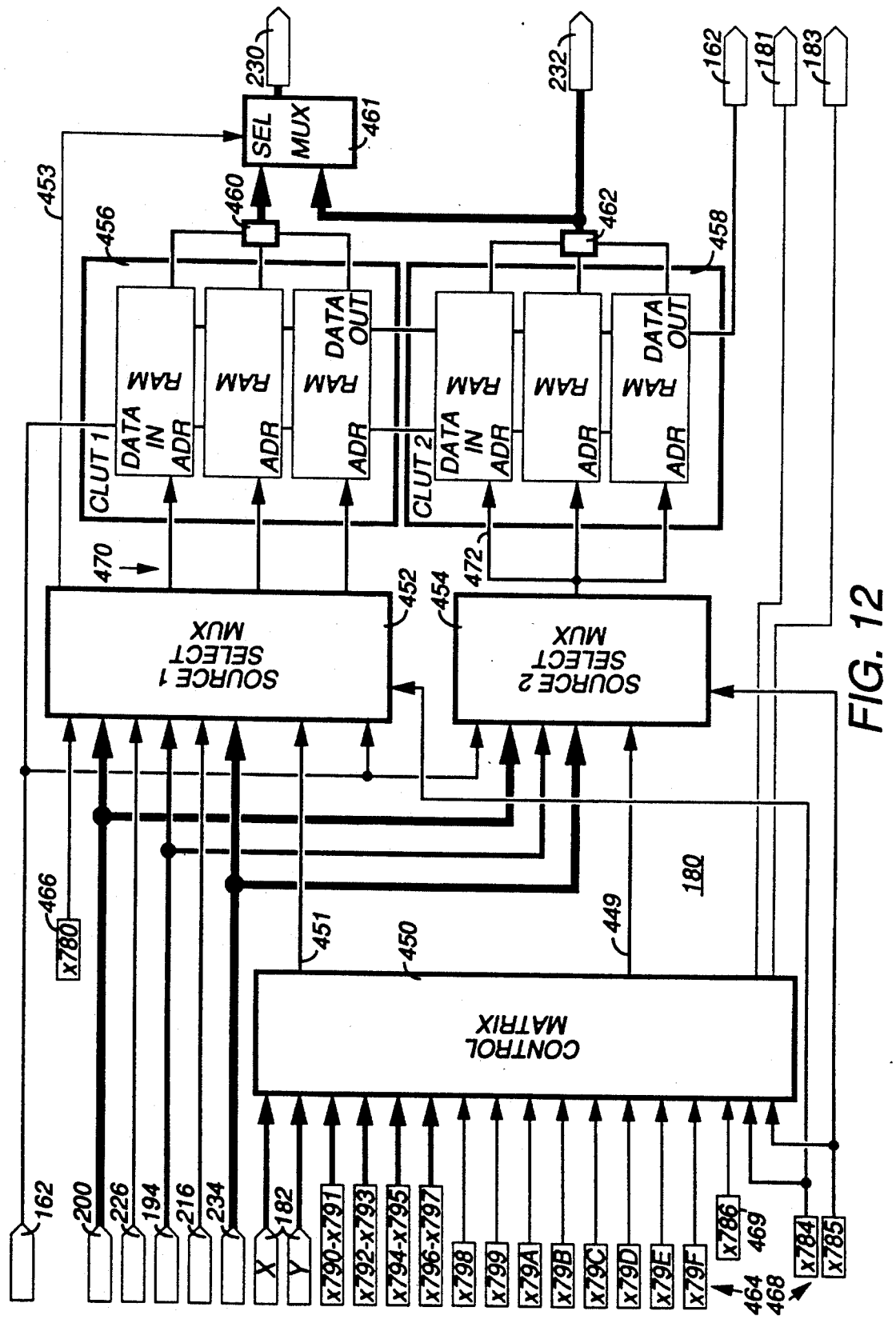
FIG. 12 is a detailed block diagram illustrating a specific embodiment of the color look-up table shown in FIG. 3 in accordance with the invention.

In FIG. 12 there is shown a detailed block diagram of a specific embodiment of the color look-up table 180 comprising primarily a control matrix 450, a source one select multiplexer 452, a source two select multiplexer 454, a first color look-up table (CLUT1) 456, and a second color look up table (CLUT2) 458. The x and y pixel coordinate values are coupled on the bus 182 to the control matrix 450 along with inputs from a series of CLUT control registers 464, Source registers 468, and a Matrix Mode register 469. The control matrix 450 is made up of a number of multiplexers and gates and couples a mode select value via a bus 451 to the source 1 select multiplexer 452 and via a bus 449 to the source 2 select multiplexer 454, as shown. The mode select signal is determined by the control matrix based upon the inputs from the registers 464, 468, 469 and the x, y coordinate inputs on the bus 182.

The video data source buses 200, 194 and 234 are coupled to the multiplexers 452 and 454. Also coupled to the source 1 select multiplexer 452 is a set of control signals from the line buffer control circuit 178 via the bus 227, a CCC control bus 216 and a color look-up table mode value from a CLUT Mode register 466. Coupled to both multiplexers 452, 454 is a data write signal coupled from the register interface 160 on a line of the bus 162 which is also coupled to the color look-up tables 456, 458, as shown. Color look-up table source values from the Source registers 468 are coupled to both the control matrix 450 and the multiplexers 452 and 454. The source one select multiplexer 452 couples a set of 8 bit color look-up table addresses to the three color component memories of the color look-up table 456 via a set of address buses 470. The source select multiplexer 454 couples an eight bit address to each of the three random access memory components of the color look-up table 458 via an address bus 472, as shown. An 8 bit color component is output from each of the address locations in the memory segments of the color look-up table 456 which are coupled to a combiner 460 and combined into a single 24 bit output which is coupled to a multiplexer 461 having an output coupled to the color look-up table output video bus 230. Similarly, the color look-up table 458 outputs a color component from each of the memory segments of the table which are addressed and couples the three eight bit components to a combiner 462 which combines the components into a single 24 bit signal which is coupled to the multiplexer 461 and to the color look up table video bus 232.

The multiplexer 461 can pass the 24 bit signal from the combiner 460 or combine that signal with the variable width signal from the combiner 462 to produce 512 color outputs for a nine-bit color look-up mode. The multiplexer 461 is controlled by the ninth bit of the nine-bit component coupled to the multiplexer 461 via a select line 453. The ninth bit may be supplied by a video source input or the CCC control input on the bus 216. The color look up tables 456 and 458 also generate an eight bit output component on the bus 162 coupled to the register interface 160 permitting the values in the CLUTs to be read. The control matrix 450 also generates two output display priority and source codes on the color look-up table display priority buses 181, 183 which are coupled to the video priority resolver 208. These display priority and source codes are generated based upon source and priority data in the registers 464.

Figure 13:
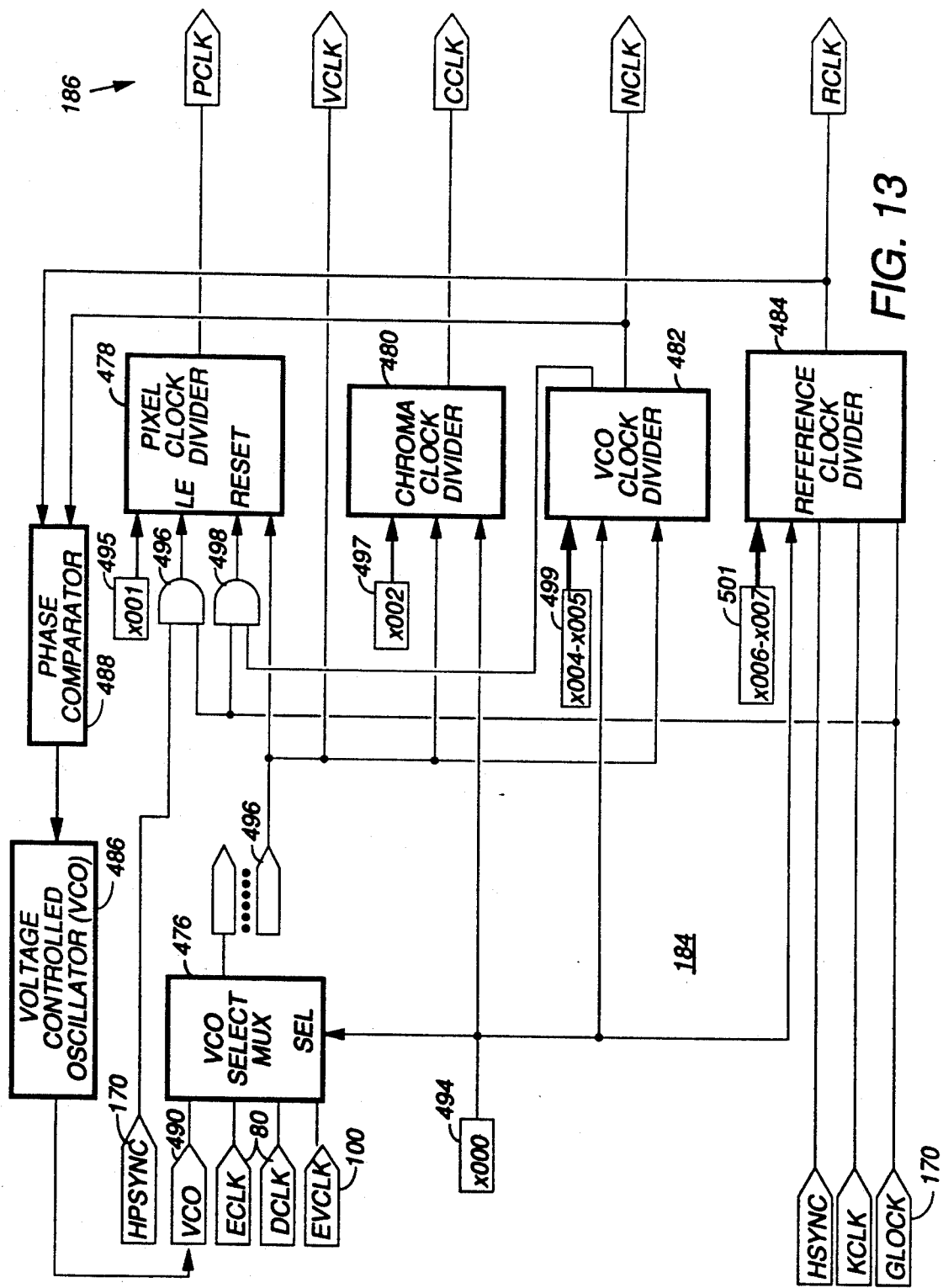
FIG. 13 is a detailed block diagram illustrating a specific embodiment of the master clock generator shown in FIG. 3 in accordance with the invention.

Referring to FIG. 13, there is shown a detailed block diagram of a specific embodiment of the clock generator circuit 184 comprising primarily a VCO selection multiplexer 476, a set of dividers 478, 480, 482, 484, a voltage controlled oscillator (VCO) 486 (e.g., having a range of 20–40 MHz in the illustrated embodiment), and a phase comparator 488, as shown. The VCO select multiplexer 476 selects one of three clock signal inputs: a VCO input 490, an external clock inputs (ECLK and DCLK) coupled from the input module 40 on the bus 80, or an external video bus clock (EVCLK) input from the video bus port 54 on the control bus 100. The VCO select multiplexer selects one of the inputs based on a select signal coupled from a clock control register 494 which is also coupled to the dividers 480, 482, 484, as shown. The output signal from the VCO select multiplexer 476 is coupled to a video clock line 496 which is coupled to the clock inputs of the pixel clock divider 478, the chroma clock divider 480 and the VCO clock divider 482. A horizontal pixel synch signal is coupled from the absolute timing circuit 166 on the bus 170 to a AND gate 496 along with a genlock signal which is also coupled to an AND gate 498 and to an input of the reference clock divider 484, as shown. An output of the VCO clock divider 482 is also coupled to the second input of the AND gate 498. The output of the AND gate 496 is coupled to a load enable input of the pixel clock divider 478 and the output of the AND gate 498 is coupled to a reset input of the pixel clock divider 478.

A set of control registers 495, 497, 499, 501 are coupled to each of the dividers 478-484 which provide the divide ratio to each of the dividers and which are programmable through the register interface 160. Thus, the divide ratio of each of the dividers 478-484 are programmable. An internal reference clock (KCLK), which in the illustrated embodiment is 40 MHz, is coupled to the reference clock divider 486 along with an external reference clock (HSYNC) coupled from the input module 40 or the digital video bus port 54. A Genlock (GLOCK) signal is also coupled to the divider 484 to select the external reference in the genlock mode.

The pixel clock divider 478 generates a pixel clock signal (PCLK), the chroma clock divider 480 generates a chroma clock signal (CCLK) and the output of the VCO select mutliplexer 476 is used as a system video clock signal (VCLK), all three of which are coupled to the system functional circuitry via the clock bus 186. In addition, a VCO divider clock signal (NCLK) and a reference divider clock signal (RCLK) are each generated respectively by the VCO clock divider 482 and reference clock divider 484 and are coupled to the phase comparator 488. The phase comparator compares the two signals and generates a control signal based upon the difference between the two input signals. The control signal from the phase comparator 488 is coupled to the input of the VCO 486 which generates an output clock signal which is determined by the input control signal from the phase comparator. The output of the VCO 486 is coupled the VCO input 490 of the VCO select multiplexer 476.

Thus, when the VCO is selected by the multiplexer 476 under control of the value in the control register 494, the VCO signal is divided in the VCO clock divider 482 by the divider value in the VCO Clock Divider register 499. The 40 Mhz internal reference clock (KCLK) or the external clock reference (HSYNC), as selected by the GLOCK signal, is divided in the divider 484 by the value in the ReferenceClock Divider register 501. These two divider signals are compared in the phase comparator and the VCO is continuously adjusted until the divided signals match in phase and frequency. The VCO signal is thus locked by this phase locked loop (PLL) circuit to a frequency equal to the reference clock frequency times the (VCOClockDivider register value +1) divided by the (ReferenceClockDivider register value +1). This signal or the external signal selected by the VCO select multiplexer is then used as the system video clock (VCLK) and is divided in the pixel clock decoder 478 by the value in the PixelClockDivider register 495 to generate the pixel clock. The same signal is also divided in the chroma clock divider 480 by the value in the ChromaClockDivider register 497 to generate the chroma signal. This PLL system permits generation of a wide range of programmable clock frequencies. If the video timing is genlocked, the circuit will lock to the external clock signal provided.

The ClockControl register 494 couples a select signal to the divider 482, 484 which selects between a square wave or pulse output and couples an enable signal to the divider 480 which enables or tri-states the chroma clock output. The GLOCK signal, in addition to selecting the internal or external reference clock for the divider 484 also enables the AND gates 496 and 498 to permit the pixel clock to be reset in synchronization with the horizontal pixel sync (HPSYNC) signal when the VCO clock divider 482 detects a momentary loss of sync.

Figure 14:
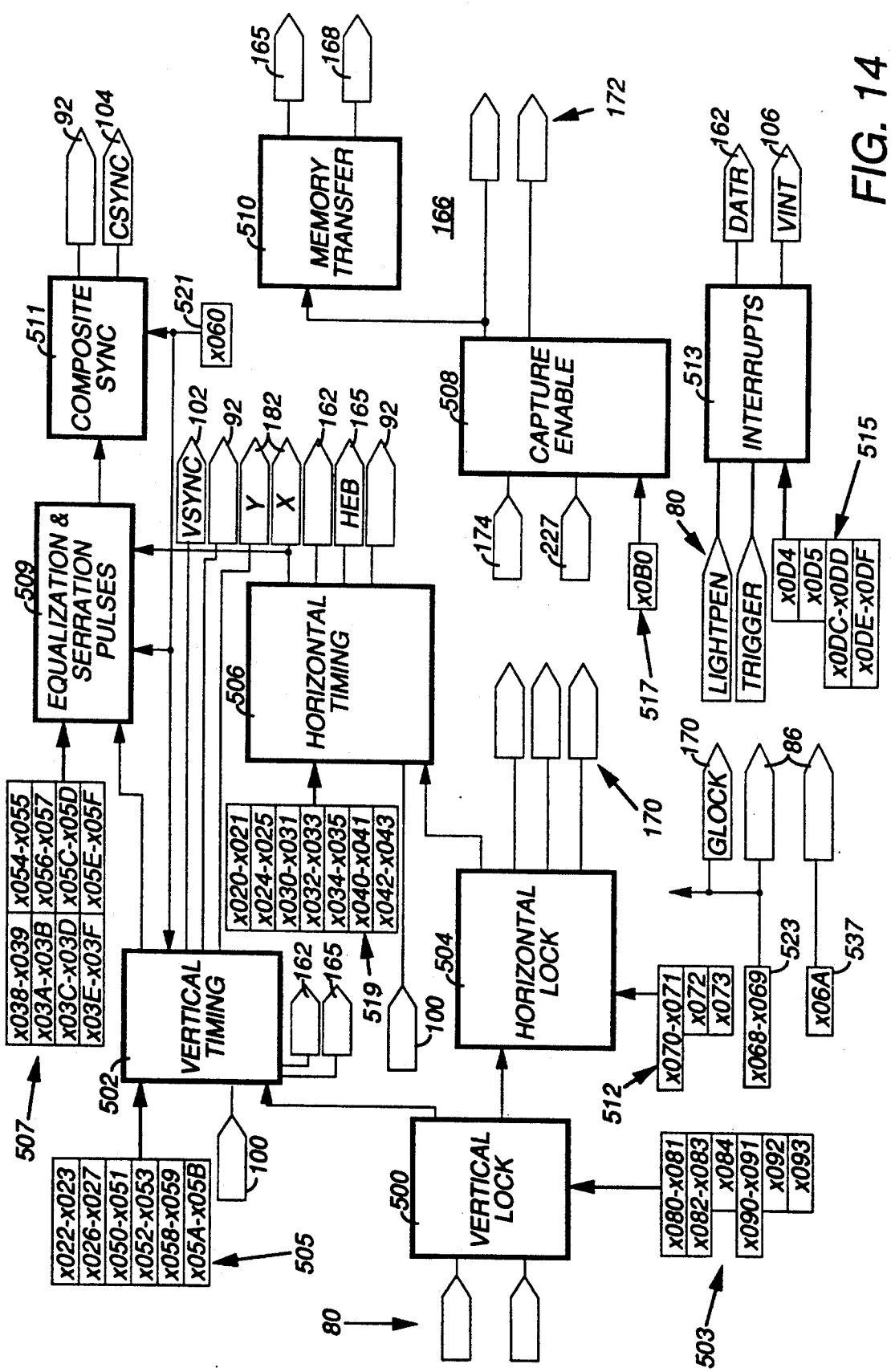
FIG. 14 is a detailed block diagram illustrating a specific embodiment of the absolute timing circuit shown in FIG. 3 in accordance with the invention.

FIG. 14 is a detailed block diagram illustrating a specific embodiment of the absolute timing circuitry 166 which primarily comprises a vertical lock circuit 500, a vertical timing circuit 502, a horizontal lock circuit 504, a horizontal timing circuit 506, a capture enable circuit 508, a memory transfer generator 510, an equalization circuit 509, composite sync circuit 511 and an interrupts circuit 513. Various control registers 503, 505, 507, 512, 515, 517, 519, 521, 523, 537 which are loaded via the register interface 160 control the programmable capabilities of the absolute timing circuit 166. External synchronization signals are coupled to the vertical lock circuit 500 via the external synch bus 80. The vertical lock circuit extracts a vertical lock signal from the external synchronization or internal system clock signals (not shown) based upon data in a set of control registers 503. The vertical lock signal is coupled to a vertical timing circuit 502, as shown. The vertical lock signal and external sync signals are also coupled to the horizontal lock circuit 504, as shown. The horizontal lock circuit 504 extracts a horizontal lock signal based upon data in a set of control registers 512. This lock signal is coupled to the horizontal timing circuit 506. The horizontal lock circuit 504 also generates a separate horizontal sync signal and timing signals which are coupled to the synchronization bus 170, as shown.

The vertical timing circuit 502 generates an absolute y (vertical) coordinate signal based upon the vertical lock signal, an external vertical sync signal from the bus 100, data in a set of control registers 505 and a vertical format register 521. The vertical timing circuit 502 also generates a vertical sync signal (VSYNC) which is coupled to the display port 52 via the bus 102 and a vertical sync signal coupled to the D/A converter 26 via the bus 92. In addition, timing and control signals are coupled to the relative timing circuit 164 on the bus 165. An internal read only vertical counter status register (not shown) may be read via the bus 162. The horizontal timing circuit 506 generates an absolute x coordinate signal based upon the horizontal lock signal, an external horizontal sync signal from the bus 100, and data in a set of control registers 519. The x and y coordinate signals are coupled to the bus 182 and the x coordinate signal is also coupled to the equalization circuit 509, as shown. The horizontal timing circuit 506 generates horizontal synchronization signals which are coupled to the D/A converter 26 on the bus 92 and timing and control signals which are coupled to the relative timing circuit 164 via the bus 165. An internal read only horizontal counter status register (not shown) may be read via the bus 162. The vertical timing circuit 502 also generates a vertical timing signal which is coupled, as shown, to the equalization circuit 509. The equalization circuit 509 generates conventional equalization pulses and serration pulses responsive to the vertical timing and horizontal coordinate signals and under control of a set of control registers 507, 521. These pulses and the horizontal and vertical signals are coupled to the composite sync circuit 511, as shown. The composite sync circuit 511 under control of the register 521 forms these signals into a composite video synchronization signal to be coupled to a display device 42 on the sync line 104 and forms another composite synchronization signal coupled to the D/A converter 26 via the bus 92.

Capture enable signals from the window control circuit 176 are coupled on the bus 174 along with control signals from the line buffer control 178 on the bus 227 to a capture enable circuit 508. The capture enable circuit 513 generates memory capture enable signals responsive to a capture bank enable register 517 which are coupled to the capture multiplexer 190 via the control bus 172 and to the memory transfer generator 510. The memory transfer generator 510 generates transfer request signals, for controlling transfer in and out of memory, which are also coupled to the timing bus 168, and to the relative timing circuit 164 via the bus 165, as shown.

Light pen and trigger signals are coupled from the input module 40 on the control bus 80 to the interrupt circuit 513 along with inputs from a set of control registers 515 and inputs from the x and y coordinate bus 182 (not shown). When a light pen or external trigger signal is detected, the interrupt circuit 513 generates an interrupt (VINT) coupled to the interface controller 24 on the bus 106. The interrupt circuit 513 also places the x and y position at the time the signal is detected into internal status registers (not shown) which may be read via the data read (DATR) bus (which is part of bus 162) to provide identification of the position at which the interrupt occurred. A register 523 also provides a genlock (GLOCK) which is coupled to the bus 170 and to the Horizontal and Vertical lock and timing circuits 500, 502, 504, 506, as well as providing control signals which are coupled to the input module 40 on the bus 86. A register 537 determines control signals to control the clamp and shift/scaler circuits 64, 66, which are coupled to the input module 40 via the control bus 86.

Figure 15:
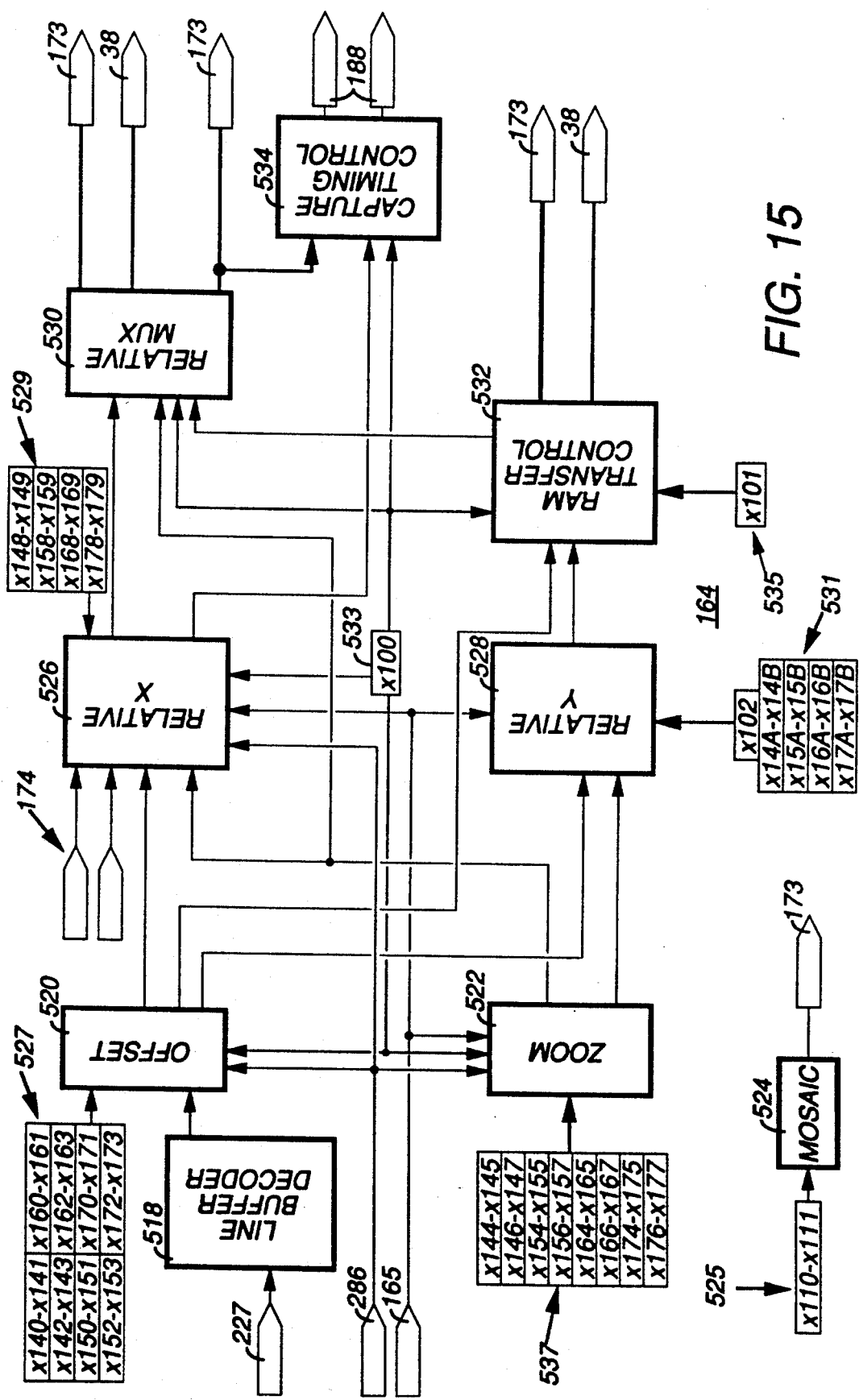
FIG. 15 is a detailed block diagram illustrating a specific embodiment of the relative timing circuit shown in FIG. 3 in accordance with the invention.

In FIG. 15, there is shown a detailed block diagram of a specific embodiment of the relative timing circuit 164 which primarily comprises a line buffer decoder 518, an offset generator 520, a zoom generator 522, a mosaic generator 524, a relative x pixel coordinate counter 526, a relative y pixel coordinate counter 528, a relative multiplexer 530, a RAM transfer controller 532 and a capture timing control circuit 534. A set of control registers 525, 527, 529, 531, 533, 535, 537, which are loaded through the register interface 160, provide control information which is coupled as shown to each respective functional block of the relative timing circuit 164. Mode control signals from the video input interface 192 on the bus 286 are coupled to the offset generator 520, the zoom generator 522 and the relative x pixel coordinator counter 526 to indicate whether the system is in 1, 2, 4 or 8 bit per pixel mode. Control and timing signals from the absolute timing circuit 166 are coupled via the bus 165 to the zoom circuit 522, the relative x circuit 526, and the relative y circuit 528. Capture window signals from the window control circuit 176 are coupled to the relative x pixel coordinate counter 526 via the bus 174 and control signals from the line buffer control 178 are coupled to the line buffer decoder 518 via the bus 227. The line buffer controller 518 decodes the control signals on the bus 227 and couples the decoded control signal to the offset circuit 520. The offset circuit 520 is primarily a set of latches which determine if there will be any offset of the pixel in either the x or y direction based on control signals from the decoder 518, control signals from the bus 286, and data from the x and y offset registers 527. The offset generator couples control signals to the relative x and relative y pixel coordinate counters 526 and 528 to control x and y offset of the pixel counters, as well to the RAM transfer control circuit 532, as shown.

The zoom circuit 522, under control of the x and y zoom factor registers 537, the buffer dependency register 533, and the control signals from the buses 286, 165, generates zoom control signals which are coupled to the relative x and relative y pixel coordinate counters 526 and 528 as well as to the relative multiplexer 530 to effectively stretch the display time for each pixel. The relative x pixel coordinate counter 526 generates the relative pixel position in the x direction in response to the input control signals and data from the registers 529, 533. The relative y pixel coordinate generator or counter 528 generates the pixel count position in the vertical or y direction in response to the input control signals and the y mosaic factor registers 531. The output of the relative x pixel coordinate counter 526 is coupled to the relative multiplexer 530 and the capture timing control circuit 534. The output of the relative y pixel coordinate counter 528 is coupled to the RAM transfer controller 532, as shown.

The relative multiplexer 530 generates clock enable signals which are coupled to the video memory 56 via the control bus 38 and generates control signals, clock signals and enable signals which are coupled to the video input interface 192 via the control signal bus 173. In addition, the relative multiplexer couples control signals to the capture timing control circuit 534. These signals are generated in response to the control signals input to the multiplexer 530 and the data in the buffer dependency register 533. The RAM transfer control circuit 532 also generates video memory, buffer concatenation signals and buffer control signals which are coupled to the video input interface 192 via the control signal bus 173, and generates control signals and address signals to control the video memory banks 56 which are coupled to the control bus 38. These signals are generated utilizing control signals coupled to the RAM transfer control circuit 532 and the data in the buffer concatenation register 535. The capture timing control circuit 534 primarily comprises a set of multiplexers which select single or double pixel control signals coupling them to the control bus 188 which is coupled to the video capture multiplexer 190. The mosaic generator 524 based on inputs from the live x mosaic factor control register 525 generates live mosaic control signals which are coupled to the video input interface 192 on the control signal bus 173.

Figure 16:
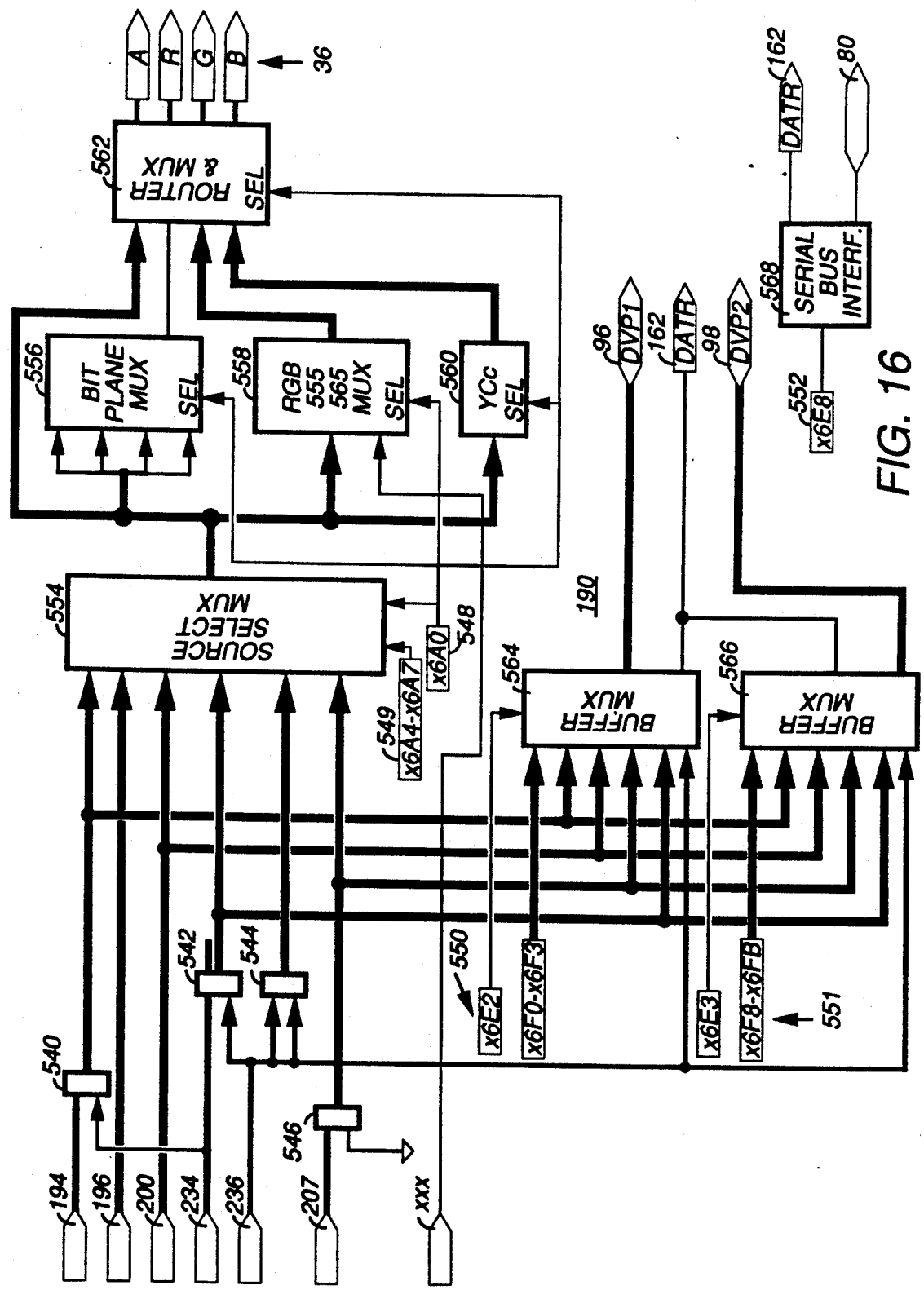
FIG. 16 is a detailed block diagram illustrating a specific embodiment of the capture multiplexer shown in FIG. 3 in accordance with the invention.

Referring to FIG. 16, there is shown a detailed block diagram of a specific embodiment of the capture multiplexer 190 comprising primarily a source select multiplexer 554, buffered multiplexers 564 and 566, a bit plane multiplexer 556, an RGB multiplexer 558, a YCc multiplexer 560, a router and multiplexer 562, and a serial bus interface 568. Six input source buses 194, 196, 200, 234, 236 and 207 provide video input sources to the capture multiplexer 190 coupled as shown to the source select multiplexer 554. The bus 194 is coupled through a combiner 540 which combines the RGB signal with data, e.g. luminance, chrominance, etc., from the bus 234. The signals on the bus 234 are combined with partial sum signals from the bus 236 in a combiner 542 before being coupled to the source select multiplexer 554. The bus 236 is also coupled through a combiner 544 to expand the partial sum signal to a thirty-two bit signal which is coupled to the source select multiplexer 554. The bus 207 is coupled through a combiner 546 which adds 8 bits of grounded input before being coupled to the source multiplexer 554. The resulting video data from the buses 194, 200, 234, 236, and 207 are coupled as shown to the buffer multiplexers 564 and 566.

Control information is coupled into the source select multiplexer 554 from a capture color constant register 549, also a capture data source/format register 548. Control information is coupled into the digital video port (DVP) buffered multiplexers 564, 566 from a set of DVP control and Write data registers 550, 551, as shown. The data from the capture data source/format register 548 is also coupled to the select input of each of the multiplexers 556, 558, 560, 562. The source selected by the source select multiplexer 554 is coupled to each of the multiplexers 556–562 and the output of each of the multiplexers 556, 558, 560 is coupled into the router and multiplexer 562. The bit plane multiplexer 556 selects one of the four input video components coupling the 8 bit component to the router multiplexer 562. The RGB multiplexer 558 selects either a 555 or 565 mode of RGB arranging the data and coupling it to the router and multiplexer 562; the threshold output xxx is also coupled to the multiplexer 558 as shown, and may thus be captured in the 555 format. The YCc multiplexer 560 selects and arranges the video data on the input and couples it to the router and multiplexer 562 in YCc format. The router and multiplexer 562 under control of select signals from the register 548 arranges and couples digital video data signals to the 64 bit data bus 36 in two to one pixel interleaved format to be stored in the video memory banks 56. The buffered multiplexer 564 selects one of the video sources under the control of the DVP1 control and write data registers 550 and couples the signal to the bi-directional digital video data bus 96. Similarly, the buffer multiplexer 566 under the control of the DVP2 control and write data registers 551 couples a selected video source to the bi-directional digital video data bus 98. Data coupled into the buffered multiplexer on the bi-directional DVP buses 96, 98 is read out of the buffered multiplexers 564, 566 via the bus 162 to the register interface 160. The serial bus interface, under control of the serial bus control register 552 generates control signal which are coupled to the input module 40 via the control bus 80. The status registers of the serial bus interface are read via the bus 162.

Figure 17:
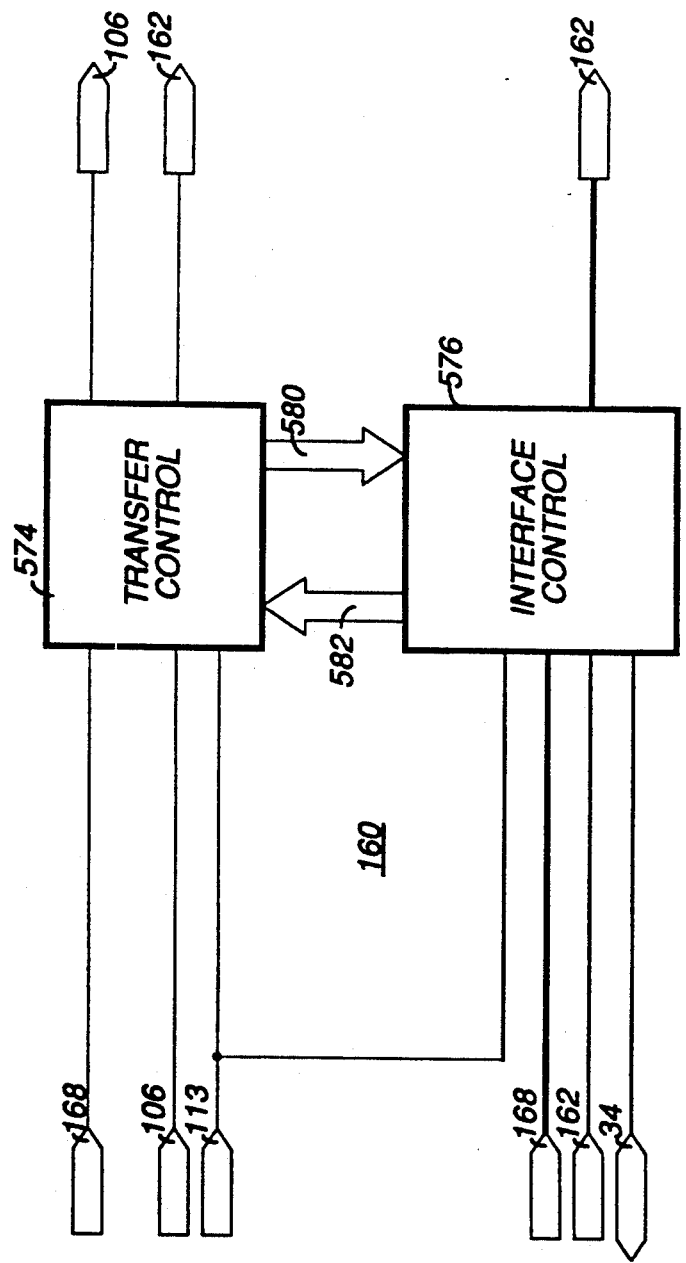
FIG. 17 is a detailed block diagram illustrating a specific embodiment of the register interface shown in FIG. 3 in accordance with the invention.

In FIG. 17, there is shown a detailed block diagram of a specific embodiment of the register interface 160 comprising primarily a transfer control circuit 574 and an interface control circuit 576. Memory transfer control signals are coupled to the transfer control circuit 574 on the bus 168 from the absolute timing circuit 166 along with timing signals from the interface controller 24 via the control bus 106. A reset signal is coupled from the host computer Nubus port 28 to the transfer control 574 and the interface controller 576 via the reset line 113. Address and timing signals from the relative timing circuit 164 and absolute timing circuit 166 are coupled to the interface control circuit 576 on the bus 168. The transfer control circuit 574 generates transfer control signals which are coupled to the interface controller 24 via the bus 106 and a start control signal which is coupled to the bus 162. In addition, the transfer control circuit 574 couples timing control signals to the interface control circuit 576 on a timing control bus 580, as shown. The interface control circuit 576 comprising primarily staging latches generates transfer clear signals which are coupled to the transfer control circuit 574 on the bus 582. The interface control circuit 516 also transfers data and addresses to and from the interface controller 24 via the bus 34, and transfers data and addresses to the various circuits of the video system controller 22 via the bus 162.

Figure 18:
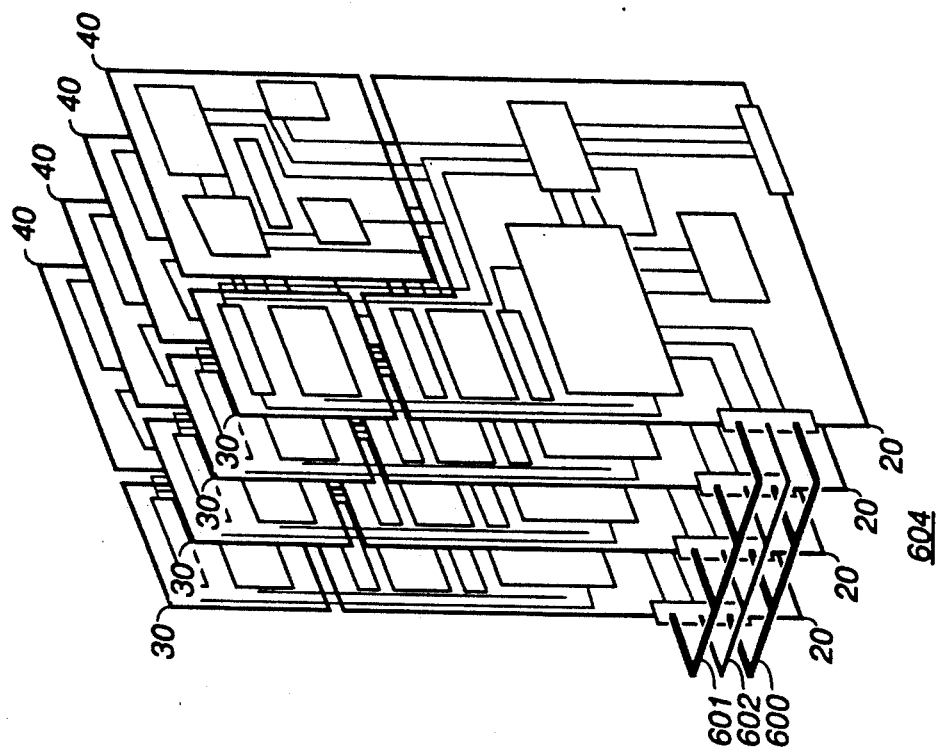
FIG. 18 is a generalized block diagram illustrating a specific embodiment of the video bus means shown in FIG. 1 with generalized block diagrams of two possible example interconnections in accordance with the invention.
Figure 18:
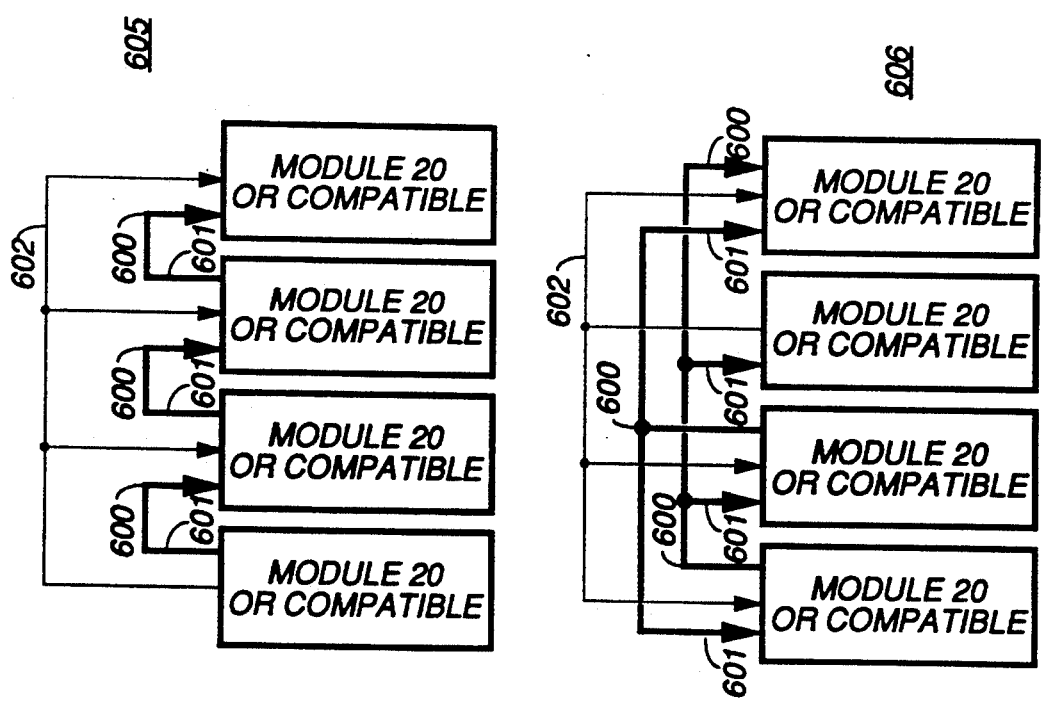

In FIG. 18, there is shown a generalized block diagram 604 of a specific embodiment of multiple video processor modules 20 interconnected and two possible example interconnection diagrams 605 and 606. As indicated in interconnection diagram 604, multiple video processor modules 20 or compatible external devices may be coupled through the video bus connector 54, utilizing the digital video buses 600, 601 and the clock-/sync bus 602. Interconnection diagram 605 is an example of a specific interconnection using multiple system modules 20 or compatible modules in a cascade arrangement, wherein each module is coupled to the next module, which in turn is connected to the next module, until the end of the cascade chain. Interconnection diagram 606 is an example of a specific interconnection using multiple system modules 20 or compatible modules coupled in an arbitrary manner, wherein each module may be coupled to a plurality of modules.

Figure 19:
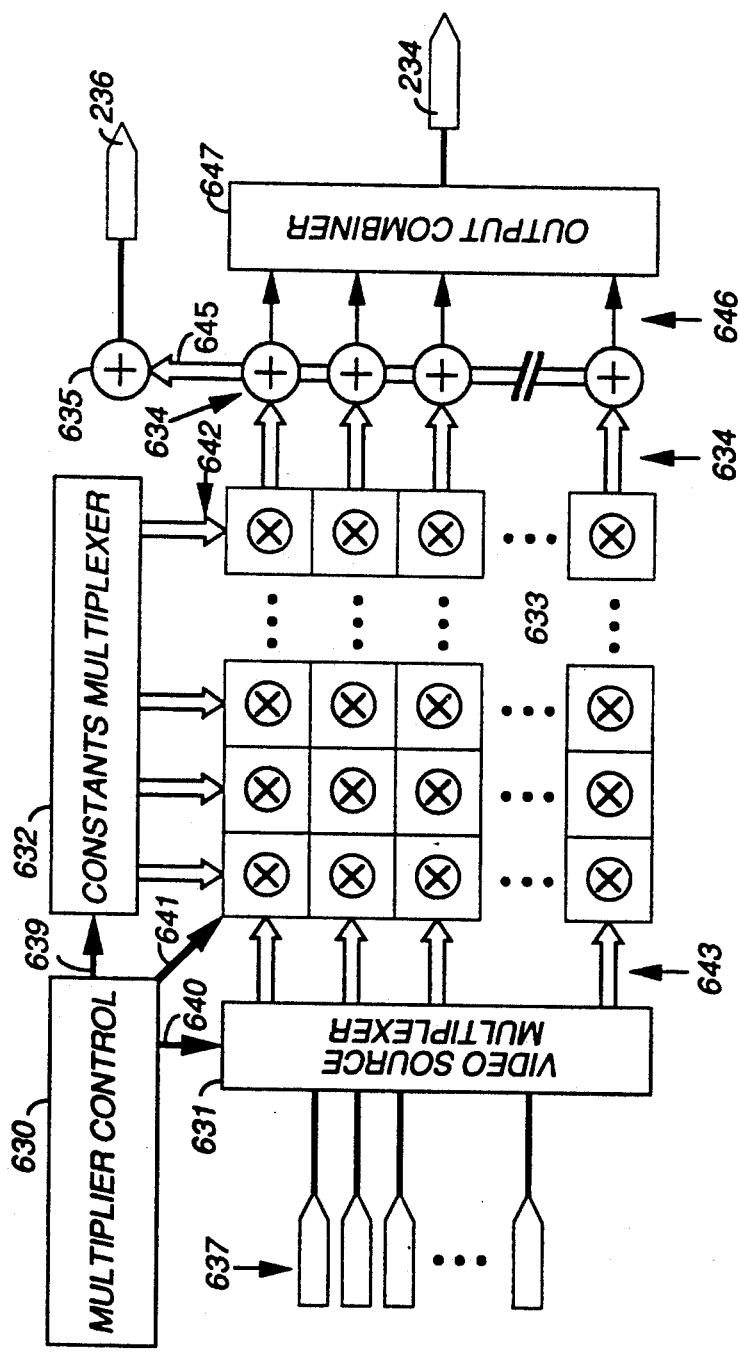
FIG. 19 is a generalized block diagram illustrating a specific embodiment of the multiplier circuit shown in FIG. 3 in accordance with the invention.

In FIG. 19, there is shown a generalized block diagram illustrating a specific embodiment of the multiplier circuit 202 shown in FIG. 3 comprising essentially a multiplier control block 630, an n×m multiplier array 633, a constants multiplexer 632, a video source multiplexer 631, summing circuits 634, and a grand summer 635. Control registers (not shown) are coupled to the multiplier control 630, as are a plurality of prescaler (not shown) and blending constant values (not shown), one of each is selected by the multiplier controller 630 responsive to control signals coupled from the alpha buffer control on the bus 221 (not shown). Constants registers (not shown) are coupled to the constants multiplexer 632, as is the multiplier control 630. The constants multiplexer selects between the constants registers and the product of the selected prescaler and blending constant values responsive to control signals coupled from the multiplier control 630. Constant values are coupled from the constants multiplexer 632 to the n×m multiplier array 633 on the buses 642. Control signals are also coupled from the multiplier control 630 to the n×m multiplier array 633 on the bus 641. Control signals are also coupled from the multiplier control 630 to the video source multiplexer 631, which selects one of a plurality of video sources 637 on a component by component basis responsive to those control signals. The selected components are coupled through buses 643 to the n×m multiplier array 633.

The results of n×m multiplications by the multiplier array 633 are coupled to the m summing circuits 634 via the buses 644. These sums are coupled to the output combiner 647 via the buses 646 and to the grand summer 635 via the bus 645. A grand sum or partial sum output 236 is made available outside the multiplier circuit 202, as is the mixed output 234 of the output combiner 647.

Figure 20:
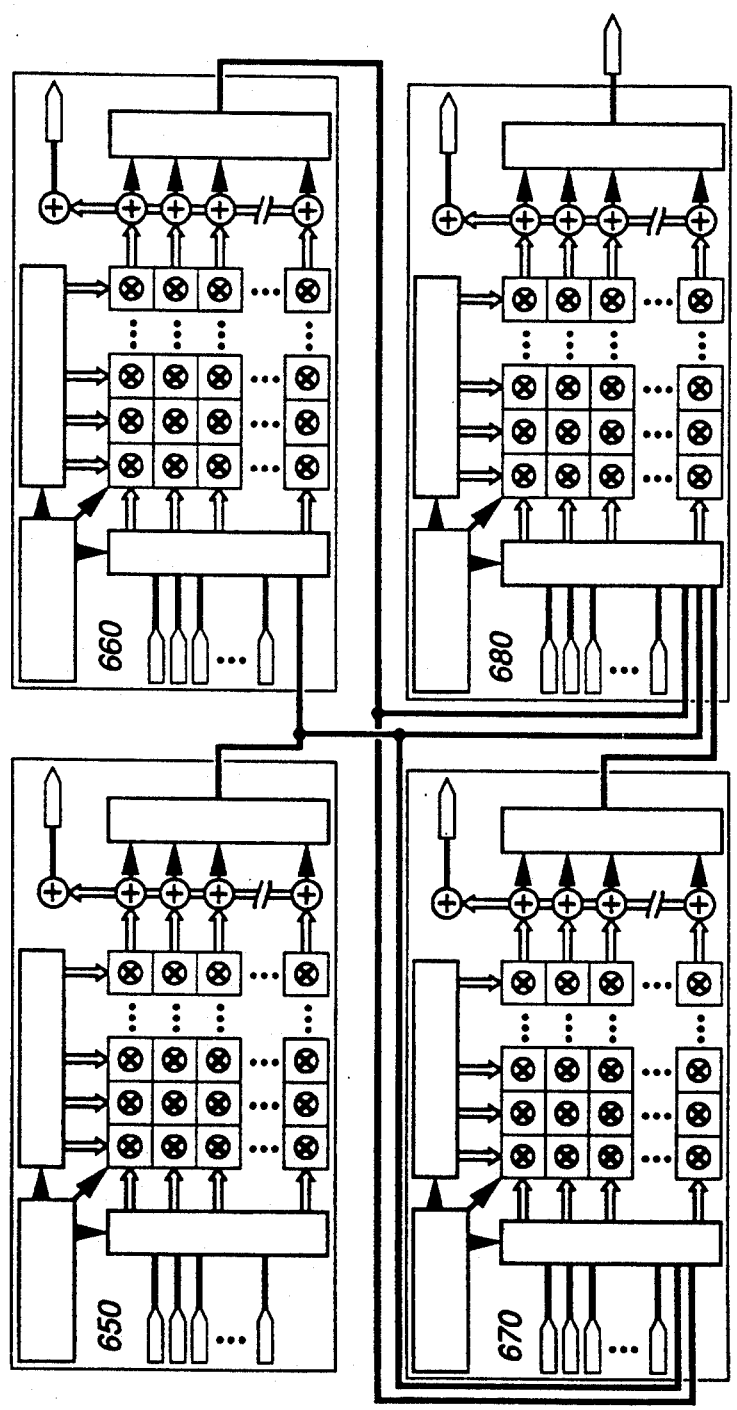
FIG. 20 is a generalized block diagram illustrating a specific embodiment of the multiplier circuit shown in FIG. 3 in accordance with the invention.

FIG. 20 is a generalized block diagram illustrating a specific embodiment of the multiplier circuit 202 shown in FIG. 3 comprising a plurality of n×m multiplier arrays 650, 660, 670, and 680 as previously detailed in FIG. 19. The output of multiplier array 650 is coupled to a plurality of multiplier arrays 660, et al where it is selectable as one of the video source inputs characteristic of inputs 637 in FIG. 19. The output of multiplier array 660 is coupled to a plurality of multiplier arrays where it is selectable as one of the video source inputs also characteristic of input 637 in FIG. 19. Multiplier arrays 670, 680, et al are similarly coupled to a plurality of multiplier arrays. Grand sum or partial sum outputs of the arrays are coupled to a partial sum multiplexer/adder (not shown) which sums one or more of the partial sum outputs to produce the partial sum output 236 (not shown) of the multiplier array 202.

The digital video image processor system 10 is a memory mapped system which in the illustrated embodiment is meant to operate in a NuBus slot of a host computer such as a Macintosh II marketed by Apple Computer Co. The host Macintosh II can use its processor's data manipulation instructions to read or write to a memory location in order to read or write to a peripheral register. Thus, the programming and control of the system 10 is performed from the host computer via the NuBus and programming and loading of the internal registers within the system 10 perform through the NuBus address space. Each NuBus slot has a 16 Megabyte minor slot space and a 256 Megabyte major slot space. However, the system module 20 only decodes the minor slot space. The 16 Megabytes of the minor slot space thus are utilized as the address space for the system module 20 and the memory is mapped as shown in Table I.

TABLE I

| Address | Register |
|---|---|
| $Fs000000–$Fs7FFFFF: | Video Display Memory Banks |
| $Fs800000–$FsEFFFFF: | Reserved |
| $FsF00000–$FsF005FF: | VSC Registers (Writes shadowed to Shadow RAM, reads from Shadow RAM) |
| $FsF00600–$FsF007FF: | VDE Resisters (Writes shadowed to Shadow RAM, reads from Shadow RAM) |
| $FsF00800–$FsF00BFF: | CLUT 1 |
| $FsF00C00–$FsF00DFF: | CLUT 2 |
| $FsF00E00–$FsF03FFF: | Reserved |
| $FsF04000–$FsF047FF: | WIC Registers (Writes shadowed to Shadow RAM, reads from Shadow RAM) |
| $FsF04800–$FsF07FFF: | Reserved |
| $FsF08000–$FsF085FF: | VSC Alternate Registers (True reads, unshadowed writes) |
| $FsF08600–$FsF087FF: | VDE Alternate Registers (True reads, unshadowed writes) |
| $FsF08800–$FsF0BFFF: | Reserved |
| $FsF0C000–$FsF0C7FF: | WIC Alternate Registers (True reads, unshadowed writes) |
| $FsF0C800–$FsF3FFFF: | Reserved |
| $FsF40000–$FsF40007: | Bt473 DAC Resisters (Gamma Table) |
| $FsF40008–$FsF4FFFF: | Reserved |
| $FsF50000–$FsF57FFF: | 32Kx8 Static RAM-Direct R/W Access (not currently supplied) |
| $FsF58000–$FsF7FFFF: | Reserved |
| $FsF80000–$FsF9F7FF: | Line Control Memory |
| $FsF9F800–$FsF9FFFF: | Shadow RAM |
| $FsFA0000–$FsBFFFFF: | Reserved |

TABLE I-continued

| Address | Register |
|---|---|
| $FsFC0000–$FsFF7FFF: | Declaration EEPROM reserved space |
| $FsFF8000–$FsFFFFFF: | Declaration EEPROM |

Note that in the addresses, the s represents the slot number in which the card is located. In addition, note that the video system controller (VSC) and the interface controller (IC) mapping ranges coincide with the Shadow RAM. Since the registers of both circuits never share the same lower 12 bits, the VSC and IC shadow memory addresses don't conflict. Of the 256K reserved for the declaration ROM, only the top 32K is used.

The system 10 is controlled by its register set and thus may be programmed directly using the registers. The registers are loaded by properly addressing the register location and setting the desired condition. Depending on which register is being accessed, it may be a byte (eight bits), word (16 bits), or long word (32 bits). When writing to the registers, the data written is copied into the shadow RAM 90 and when reading from these registers, data is read from the shadow RAM 90.

$Fsxxxxxx:{B/W/L}:{bits} RegisterName

Register descriptions include their full 32-bit address where "s" is the slot number, and "xxxxxx" is the register offset. This is followed in Table II below by the size of the register-Byte, Word, or Long word and the number of valid bits. This is then followed by a symbolic register name. Table II below lists the various registers and their addresses.

TABLE II

| Address | Register |
|---|---|
| VIDEO MEMORY | |
| $FsF000000–$Fs7FFFFF: | Video Memory |
| CLOCK GENERATOR | |
| $FsF00000:B:8 | Clock Control |
| $FsF00002:B:3 | Pixel Clock Divider |
| $FsF00003:B:3 | Chroma Clock Divider |
| $FsF00004:W:12 | VCO Clock Divider |
| $FsF00006:W:12 | Reference Clock Divider |
| ABSOLUTE TIMING | |
| $FsF00020:B:1 | HVControl |
| $FsF00024:B:5 | HCnt |
| $FsF00025:B:5 | HRAM |
| $FsF00026:B:5 | VCnt |
| $FsF00027:B:5 | VRAM |
| $FsF00030:W:12 | HLV |
| $FsF00032:W:12 | VLV |
| $FsF00040:B:2 | BoardControlParameters |
| $FsF00041:B:7 | SyncMode |
| $FsF00042:W:14 | GLock |
| $FsF00044:B:4 | HorizontalLockMissingSync |
| $FsF00045:B:4 | VerticalLockMissingSync |
| $FsF000B0:B:4 | Capture Bank Enables |
| $FsF000D4:B:4 | Enable Interrupts |
| $FsF000D5:B:3 | Clear Interrupts |
| $FsF000DC:W:12 | Horizontal Interrupt Point |
| $FsF000DE:W:12 | Vertical Interrupt Point |
| RELATIVE TIMING | |
| $FsF00100:B:8 | Bank Configurations |
| $FsF00102:B:4 | CCC Enables |
| $FsF00110:W:11 | Live X Mosaic Factor |
| $FsF00140:W:15 | Bank A X Offset |
| $FsF00142:W:15 | Bank A Y Offset |
| $FsF00144:W:11 | Bank A X Zoom Factor |
| $FsF00146:W:11 | Bank A Y Zoom Factor |
| $FsF00148:W:11 | Bank A X Mosaic Factor |
| $FsF0014A:W:11 | Bank A Y Mosaic Factor |
| $FsF00150:W:15 | Bank B X Offset |
| $FsF00152:W:15 | Bank B Y Offset |
| $FsF00154:W:11 | Bank B X Zoom Factor |
| $FsF00156:W:11 | Bank B Y Zoom Factor |

TABLE II-continued

| Address | Register |
|---|---|
| $FsF00158:W:11 | Bank B X Mosaic Factor |
| $FsF0015A:W:11 | Bank B Y Mosaic Factor |
| $FsF00160:W:15 | Bank C X Offset |
| $FsF00162:W:15 | Bank C Y Offset |
| $FsF00164:W:11 | Bank C X Zoom Factor |
| $FsF00166:W:11 | Bank C Y Zoom Factor |
| $FsF00168:W:11 | Bank C X Mosaic Factor |
| $FsF0016A:W:11 | Bank C Y Mosaic Factor |
| $FsF00170:W:15 | Bank D X Offset |
| $FsF00172:W:15 | Bank D Y Offset |
| $FsF00174:W:11 | Bank D X Zoom Factor |
| $FsF00176:W:11 | Bank D Y Zoom Factor |
| $FsF00178:W:11 | Bank D X Mosaic Factor |
| $FsF0017A:W:11 | Bank D Y Mosaic Factor |
| WINDOW CONTROL | |
| $FsF00200:W:11 | Rectangle 1 X Start |
| $FsF00202:W:11 | Rectangle 1 X End |
| $FsF00204:W:11 | Rectangle 1 Y Start |
| $FsF00206:W:11 | Tectangle 1 Y End |
| $FsF00208:B:4 | Rectangle 1 Display Source |
| $FsF00209:B:4 | Rectangle 1 Priority Level |
| $FsF0020A:B:3 | Rectangle 1 I/O Control |
| $FsF00210:W:11 | Rectangle 2 X Start |
| $FsF00212:W:11 | Rectangle 2 X End |
| $FsF00214:W:11 | Rectangle 2 Y Start |
| $FsF00216:W:11 | Rectangle 2 Y End |
| $FsF00218:B:4 | Rectangle 2 Display Source |
| $FsF00219:B:4 | Rectangle 2 Priority Source |
| $FsF0021A:B:3 | Rectangle 2 I/O Control |
| $FsF00220:W:11 | Rectangle 3 X Start |
| $FsF00222:W:11 | Rectangle 3 X End |
| $FsF00224:W:11 | Rectangle 3 Y Start à, < 'å |
| $FsF00226:W:11 | Rectangle 3 Y End |
| $FsF00228:B:4 | Rectangle 3 Display Source |
| $FsF00229:B:3 | Rectangle 3 Priority Level |
| $FsF0022A:B:3 | Rectangle 3 I/O Control |
| $FsF00230:W:11 | Rectangle 4 X Start |
| $FsF00232:W:11 | Rectangle 4 X End |
| $FsF00234:W:11 | Rectangle 4 Y Start |
| $FsF00236:W:11 | Rectangle 4 Y End |
| $FsF00238:B:4 | Rectangle 4 Display Source |
| $FsF00239:B:4 | Rectangle 4 Priority Level |
| $FsF0023A:B:3 | Rectangle 4 I/O Control |
| $FsF002E0:W:11 | Capture Window X Start |
| $FsF002E2:W:11 | Capture Window X End |
| $FsF002E4:W:11 | Capture Window Y Start |
| $FsF002E6:W:11 | Capture Window Y End |
| ALPHA BUFFER CONTROL | |
| $FsF00300:B:4 | Pixel Control Mode |
| $FsF00320:B:8 | Pixel0 ICF |
| $FsF00321:B:8 | Pixel1 ICF |
| $FsF00322:B:4 | Pixel0 Display Source |
| $FsF00323:B:4 | Pixel1 Display Source |
| $FsF00324:B:4 | Pixel0 Priority Level |
| $FsF00325:B:4 | Pixel1 Priority Level |
| $FsF00326:B:3 | Pixel0 Multiplier Input Source 1 |
| $FsF00327:B:3 | Pixel1 Multiplier Input Source 1 |
| $FsF00328:B:3 | Pixel0 Multiplier Input Source 2 |
| $FsF00329:B:3 | Pixel1 Multiplier Input Source 2 |
| $FsF0032A:B:3 | Pixel0 Multiplier Input Source 3 |
| $FsF0032B:B:3 | Pixel1 Multiplier Input Source 3 |
| $FsF0032C:B:3 | Pixel0 Range Thresholder Input Source |
| $FsF0032D:B:3 | Pixel1 Range Thresholder Input Source |
| $FsF0032E:B:2 | Pixel0 Display Source Format |
| $FsF0032F:B:2 | Pixel1 Display Source Format |
| LINE BUFFER CONTROL | |
| $FsF00380:B:2 | Line Control Mode |
| $FsF00381:B:4 | Line Control Priority Level |
| BUFFER DISPLAY MODES | |
| $FsF00500:B:8 | Bank Component Size |
| $FsF00501:B:8 | Pixel Mode 1 |
| $FsF00502:B:7 | Pixel Mode 2 |
| $FsF00510:B:7 | CLUT Offset A |
| $FsF00511:B:7 | CLUT Offset B |
| $FsF00512:B:7 | CLUT Offset C |
| $FsF00513:B:7 | CLUT Offset D |
| $FsF00520:B:4 | A-B RGB555 Display Source à,= 'å |
| $FsF00521:B:4 | A-B RGB555 Priority Level |
| $FsF00522:B:2 | A-B RGB555 Mode |
| $FsF00523:B:3 | A-B RGB555 LSBs |
| $FsF00524:B:4 | C-D RGB555 Display Source |
| $FsF00525:B:4 | C-D RGB555 Priority Level |
| $FsF00526:B:2 | C-D RGB555 Mode |
| $FsF00527:B:3 | C-D RGB555 LSBs |
| $FsF00580–$FsF0058F:B:8 | Delta UV LUT |
| $FsF00590–$FsF0059F:B:8 | Delta Y LUT |
| RANGE THRESHOLDER | |
| $FsF00600:L:24 | Range Thresholder Lo |
| $FsF00604:L:24 | Range Thresholder Hi |
| $FsF00608:B:3 | Range Thresholder Input Source Format |
| $FsF00609:B:3 | Range Thresholder Input Mode |
| $FsF0060A:B:4 | Range Thresholder Transition Display Source |
| $FsF0060B:B:4 | Range Thresholder Transition Priority Level |
| $FsF0060C:B:2 | Pixel Transition |
| $FsF00630–$FsF00637:B:8 | Range Thresholder Display Source LUT |
| DISPLAY MULTIPLEXER | |
| $FsF00660:B:4 | Default Display Source |
| $FsF00664:L:24 | Display Output Color 1 |
| $FsF00668:L:24 | Display Output Color 2 |
| $FsF00670:B:2 | Live A/D Color Format |
| $FsF00671:B:2 | Live Digital In Color Format |
| $FsF00672:B:2 | Video Bus 1 Color Format |
| $FsF00673:B:2 | Video Bus 2 Color Format |
| $FsF00674:B:2 | CLUT 1 Color Format |
| $FsF00675:B:2 | CLUT 2 Color Format |
| $FsF00676:B:2 | Multiplier Output Color Format |
| CAPTURE MULTIPLEXER | |
| $FsF006A0:B:8 | Capture Data Source/Format |
| $FsF006A4:L:32 | Capture Color Constant |
| DIGITAL VIDEO PORT | |
| $FsF006E2:B:5 | DVP1 Control |
| $FsF006E3:B:5 | DVP2 Control |
| $FsF006E8:B:4 | Serial Bus Control |
| $FsF006F0:L:32 | Write DVP1 Data |
| $FsF006F8:L:32 | Write DVP2 Data |
| MULTIPLEXER ARRAY | |
| $FsF00700:B:4 | Multiplier Mode |
| $FsF00707:B:4 | Multiplier BW/Noise Generator |
| $FsF00708:L:24 | Multiplier Color Constant |
| $FsF0070C:B:2 | Filter Source |
| $FsF0070D:B:2 | Partial Sum In Buffer |
| $FsF00710:W:12 | Multiplier Input Source Formats |
| $FsF00712:B:7 | Multiplier Output Formats |
| $FsF00724:B:10 | Blend Ratio Total |
| $FsF00728:B:3 | Constants Source |
| $FsF00740:W:10 | Multiplier 1 K1 |
| $FsF00742:W:10 | Multiplier 1 K2 |
| $FsF00744:W:10 | Multiplier 1 K3 |
| $FsF00746:W:10 | Multiplier 1 K4 |
| $FsF00748:W:10 | Multiplier 1 K5 |
| $FsF0074A:W:10 | Multiplier 1 K6 |
| $FsF0074C:W:10 | Multiplier 1 K7 |
| $FsF0074E:W:10 | Multiplier 1 K8 |
| $FsF00750:W:10 | Multiplier 1 K9 |
| $FsF00760:W:10 | Multiplier 2 K1 |
| $FsF00762:W:10 | Multiplier 2 K2 |
| $FsF00764:W:10 | Multiplier 2 K3 |
| $FsF00766:W:10 | Multiplier 2 K4 |
| $FsF00768:W:10 | Multiplier 2 K5 |
| $FsF0076A:W:10 | Multiplier 2 K6 |
| $FsF0076C:W:10 | Multiplier 2 K7 |
| $FsF0076E:W:10 | Multiplier 2 K8 |
| $FsF00770:W:10 | Multiplier 2 K9 |
| CLUT CONTROL | |
| $FsF00780:B:5 | CLUT Modes |
| $FsF00784:B:3 | CLUT Source 1 |
| $FsF00785:B:4 | CLUT Source 2 |
| $FsF00786:B:2 | CLUT Matrix Mode |
| $FsF00790:W:11 | CLUT 1 Matrix X Start |
| $FsF00792:W:11 | CLUT 1 Matrix Y Start |
| $FsF00794:W:11 | CLUT 2 Matrix X Start |
| $FsF00796:W:11 | CLUT 2 Matrix Y Start |

TABLE II-continued

| Address | Register |
| --- | --- |
| $FsF00798:B:4 | CLUT 1 Display Source |
| $FsF00799:B:4 | CLUT 1 Priority Level |
| $FsF0079A:B:4 | CLUT 1 Black Detect Display Source |
| $FsF0079B:B:4 | CLUT 1 Black Detect Priority Level |
| $FsF0079C:B:4 | CLUT 2 Display Source |
| $FsF0079D:B:4 | CLUT 2 Priority Level |
| $FsF0079E:B:4 | CLUT 2 Black Detect Display Source |
| $FsF0079F:B:4 | CLUT 2 Black Detect Priority Level |
| COLOR LUTS | |
| $FsF00800–$FsF00BFF:L:24 | CLUT 1 |
| $FsF00C00–$FsF00DFF:L:32 | CLUT 2 |
| MEMORY CONTROL | |
| $FsF04400:W:9 | Video Memory Configuration |
| $FsF04404:W:12 | Physical Memory X Offset |
| $FsF04406:W:13 | Physical Memory Y Offset |
| $FsF04408:L:32 | Video Memory Write Protect |
| $FsF04410:B:3 | Master Control |
| $FsF04412:W:12 | Refresh Rate |
| $FsF044A4:L:32 | Security Code (Protects $FsF00000–AF) |
| I/O REGISTERS | |
| $FsF08028:L:32 | HRAMData |
| $FsF0802C:L:32 | VRAMData |
| READ ONLY STATUS REGISTERS | |
| $FsF08048:B:2 | HVLockStatus |
| $FsF080C0:W:12 | Horizontal Counter Status |
| $FsF080C2:W:12 | Vertical Counter Status |
| $FsF080D8:B:7 | Interrupt Status |
| $FsF086C0:L:24 | Live A/D Configuration Status (Input Module Configuration) |
| $FsF086E9:B:1 | IMD Input |
| $FsF086F4:L:32 | Read DVP1 Data |
| $FsF086FC:L:32 | Read DVP2 Data |
| IC READ ONLY STATUS REGISTER | |
| $FsF0C420:W:12 | Board Status |
| BT473 DAC REGISTERS | |
| $FsF40000:B:8 | DACWriteRAMAddress |
| $FsF40001:B:8 | DACColorPaletteRAMs |
| $FsF40002:B:8 | DACPixelReadMaskRegister |
| $FsF40003:B:8 | DACReadRAMAddress |
| $FsF40004:B:8 | DACWriteOverlayAddress |
| $FsF40005:B:8 | DACOverlayRegisters |
| $FsF40006:B:8 | DACCmd |
| $FsF40007:B:8 | DACReadOverlayAddress |
| DCP MEMORY | |
| $FsF80000–$FsF9FFFF | Display Control Memory |
| DECLARATION EEPROM RANGE | |
| $FsFF8000:L:32 | EEPROM Read Space |

The system module 20 can have various configurations of video memory bank 56 with different amounts of video RAM installed in the memory module 30 ranging from no video RAM up to 8 MB of video RAM. The Macintosh II slot in which the system module 20 is installed determines the start address for video memory and uses the slot space, which has addresses of the form $Fsxxxxxx. Video memory starts at an address in the form $Fs000000 where "s" represents one of the possible NuBus slots in the Macintosh II. Video memory addresses proceed in a linear ascending fashion from this address up the amount of video memory installed and is a full 32-bit wide memory. The highest address used for video memory is in the form $Fs7FFFFF, which refers to the last byte in an 8 MB memory. These addresses are full 32-bit addresses.

The video RAM has a dual port architecture, which means the host computer 50 and the system module 20 can each independently and simultaneously access the video RAM. The primary port (bus 34) on the video RAM allows the host computer (i.e., Macintosh II) to directly access any location in video memory and to refresh the video memory. The second port (bus 36) on the video RAM is optimized for video usage. Since video requires a stream of output data representing consecutive pixels, the second port is designed to supply this stream of data from consecutive memory locations. The second port is additionally capable of reading and storing data representing consecutive pixels enabling the capture of images in real time by accepting data into the video RAM through the second port.

The primary, random access port (bus 34) on the video RAM is directly controlled by the system memory controller 128. Refresh cycles, necessary to retain data within dynamic memory, are supplied by the controller 128 as are data from the host computer system. The secondary port (bus 36) is controlled by the relative timing circuit 164, which works in cooperation with the video memory controller 128 to initiate video transfer cycle requests. The relative timing circuit controls how often pixels are read from or written to the video memory secondary port. The secondary port receives pixel data from the capture multiplexer 190, which takes pixels from one of a number of video sources and supplies them to the video memory 56. The primary port on the video memory 56 supplies requested data to the interface controller 24, which in turn supplies the data to the host computer system through the NuBus interface. The secondary port of the video memory supplies pixel data to the video input circuit 192, which can translate the pixel data into a number of different internal formats automatically.

Video memory 56 can appear to the host Macintosh II computer as if it was arranged in several different patterns. The fundamental block in the video memory 56 configuration is known as a buffer. A buffer is simply an array of bytes, whose size is determined by the amount of video RAM present. The buffers may be arranged in patterns in three dimensions and can be concatenated vertically, horizontally, or as multiple bytes deep. The interface controller 24 only controls how the Macintosh II addresses video memory, and has no effect on the display.

The system module 20 can have zero to eight megabytes (in half megabyte increments) of memory installed on the memory module 30. The 23 bits used to describe an 8 megabyte linear address space may address the video memory array differently depending on the user's viewpoint of the organization of memory. For example, a 4 megabyte memory module might look like a 1024×1024 pixel array with 32-bits/pixel or the memory might be configured as one 2048×2048 image filled with 8-bit CLUT colors. A VideoMemory Configuration register ($FsF004400) determines how the video memory is mapped. This register uses the first nine bits as follows:

| Bits | Function |
| --- | --- |
| 1-0 | 00 = 1/2/4/8 bits/pixel |
|  | 01 = 16 bits/pixel |
|  | 10 = reserved |
|  | 11 = 32 bits/pixel |
| 3-2 | 00 = xSize 1K |
|  | 01 = xSize 2K |
|  | 10 = xSize 4K |
|  | 11 = reserved |
| 6-4 | 000 = reserved |
|  | 001 = reserved |

-continued

| Bits | Function |
|---|---|
|  | 010 = reserved |
|  | 011 = ySize 512 |
|  | 100 = ySize 1K |
|  | 101 = ySize 2K |
|  | 110 = ySize 4K |
|  | 111 = ySize 8K |
| 7 | 0 = linear addressing mode |
|  | 1 = matrix addressing mode |
| 8 | Enable double plane interleaving |

The two least significant bits determines the pixel depth. This depth and the xSize determine hardware rowbytes (the number of bytes between each successive scan line). The total amount of RAM should equal the product of xSize, ySize, and the depth (where 32 bits/pixel=4, 16 bits/pixel=2, and 1/2/4/8 bits/pixel=1). Bit 7 should normally be cleared to 0. Setting this bit to 1 puts the system module 20 in a special "CCC debug" mode. Bit 8 should normally be cleared to 0. Setting this bit to 1 enables a double plane interleaving mode.

A PhysicalMemoryXOffset ($FsF04404) register uses the first twelve bits to set an X coordinate memory offset and a PhysicalMemoryYOffset ($FsF04406) register uses the first thirteen bits to set a Y coordinate memory offset. The X and Y screen coordinates normally correspond to the X and Y memory coordinates. However, these registers can be used to add a signed offset to the X and Y memory coordinate. These registers offset where the host computer writes to the screen in memory, but does not offset the memory being displayed. These values are signed within their defined lengths; the sign bit is in bit 11 for the PhysicalMemoryXOffset register and in bit 12 in PhysicalMemoryYOffset register. The format of these signed numbers is 2's complement. Since the upper reserved bits are ignored, it would be acceptable to write a standard 16-bit signed value into these registers. One example of using the physical memory offset registers would be to offset memory references to a different page to use a single buffer draw routine to accomplish double buffer animation. This can fool software which thinks it is accessing the screen, but instead it is accessing different physical memory. This can be followed by offsetting the display (by setting the display offset registers) to the second page to display what was drawn. Then the physical memory offset registers can be swapped back to the first page, drawing can be done off screen again, then the display can be offset to the first page again. This technique allows for flicker-free animation.

The VideoMemoryWriteProtect register ($FsF04408) is a 32-bit protection mask to control the modification of memory to a bit level. This register is normally cleared to zero. Each bit which is set to one protects that bit in buffer memory from being modified. This could be used, for example, to write-protect specific bits in any buffer(s), and only affects host computer writes to the buffers. The VideoMemoryWriteProtect register has no effect on capturing data, so the CaptureBufferEnables register is the only way to mask off captured data from being recorded in the buffers.

The interface controller (IC) circuit 24 has a read only BoardStatus register ($FsF0C420) that contains a value that describes the version of the IC, and the configuration of the VRAM and EEPROM. Writing to this register has no effect. Bit 0 reads as a 1 if 1 Mb or 2 Mb VRAMs are used; it reads as a 0 if 4 Mb VRAMs are used. Bit 1 reads 0 if there is only one bank of VRAM installed; if there are two banks it reads 1. Bit 2 reads 1 for EEPROM normal operation; it reads 0 if the EEPROM is not present or non-functional. Bits 9 through 3 are reserved for future status signals. Bits 11 and 10 describe the IC version number. The only number defined so far is 00.

The video input circuit 192 provides image information from the video memory bank 56 for use by other sections. The video memory is organized in units called banks, and the four banks are referred to by name as A, B, C, and D. These names don't have any special significance, other than being a convenient method of referring to the banks. The banks are identical to one another, but there are some subtle restrictions on which banks can be used in certain circumstances.

The video input interface 192 fetches up to a byte from each of the banks present in parallel for each displayed pixel. These four bytes are used to derive the data to put on video bus one 198 and video bus two 200. Many different methods can be used to derive this data, including the following:
. Bytes from all four banks may simply be concatenated into a 32-bit pixel
. Bytes from a pair of banks may be concatenated and expanded into a 24-bit pixel
. A byte from a single bank may be used a bit at a time for color look up mode
. A byte from a single bank may be used two bits at a time for color look up mode
. A byte from a single bank may be used four bits at a time for color look up mode
. A byte from a single bank may be used in its entirety for color look up mode
. Bytes from a pair of banks may be used nine bits at a time for color look up mode The video input interface 192 also directly interprets several special compressed image formats including delta encoded video components and CCC images. There is a restriction on which banks may be paired for use in the interface 192. Specifically, there are two valid bank pairs: A-B, and C-D. There are no other valid bank pairs. When two banks are paired as indicated, the resulting construction is a 16-bit bank of the same width and height as the original two 8-bit banks. The first named bank supplies the most significant byte for the 16-bit pair.

A CCCEnables register ($FsF00102) controls the CCC mode for the input interface. This register uses the first four bits as follows:

| Bit | Function |
|---|---|
| 0 | 0 = D bank normal |
|  | 1 = D bank in CCC mode |
| 1 | 0 = C bank normal |
|  | 1 = C bank in CCC mode |
| 2 | 0 = B bank normal |
|  | 1 = B bank in CCC mode |
| 3 | 0 = A bank normal |
|  | 1 = A bank in CCC mode |

This register is normally set to zero. However, a bank can be put into a CCC (Color Cell Compression) mode. CCC mode offers quality images from a compressed image format. There are two display sources called Video Bus One 198, and Video Bus Two 200. To Display video memory data, the input circuit 192 uses the Video Bus One 198 and Video Bus Two 200 display sources.

The following three registers control the pixel formats on these buses. A BankComponentSize register ($FsF00500) controls bank pixel depth. This register uses eight bits with the two LSB for the D bank, next two for the C bank, third two for the B bank and the two MSB for the A bank as follows:

00 = 8-bits per component
01 = 4-bits per component
10 = 2-bits per component
11 = 1-bits per component A PixelModel register ($FsF00501) controls decoding of pixel data. This register uses eight bits as follows:

| Bits | Function |
| --- | --- |
| 1-0 | 00 = RGB888 |
|  | 01 = DYUV (see bits, 7,6) |
|  | 10 = Output of AB decoder (see bits 5,4) |
|  | 11 = Output of CD decoder (see bits 3,2) |
| 3-2 | 00 = CD Decoded to RGB555 |
|  | 01 = CD Decoded to YCc |
|  | 10 = CD Decoded to CCC 4 bits/pixel |
|  | 11 = reserved |
| 5-4 | 00 = AB Decoded to RGB555 |
|  | 01 = AB Decoded to YCc |
|  | 10 = AB Decoded to CCC 4 bits/pixel |
|  | 11 = reserved |
| 7-6 | 00 = DYUV from A bank |
|  | 01 = DYUV from B bank |
|  | 10 = DYUV from C bank |
|  | 11 = DYUV from D bank |

A PixelMode2 register ($FsF00502) also controls decoding of pixel data. This register uses eight bits with a pair of bits for D,C and B buffers, respectively, and the seventh bit for the alpha buffer as follows:

| Bits | Function |
| --- | --- |
| 1-0(B) | 00 = Straight buffer data |
| 3-2(C) | 01 = CCC 2 bits/pixel |
| 5-4(D) | 10 = DYUV |
|  | 11 = Output of AR Decoder |
| 6(A) | 0 = Straight buffer data |
|  | 1 = CCC 2 bits/pixel |
| 7 | 0 = truncated DYUV |
|  | 1 = averaged DYUV |

The BankComponentSize register controls the number of bits fetched from each buffer for forming a pixel. This would normally be set to 00 (8-bits fetched from each buffer to generate a pixel). The exception to this is when fewer bits are fetched and used as indexes to CLUT entries.

The PixelModel and PixelMode2 registers control the decoding of pixel data from memory. Pixel data can represent RGB pixels directly, RGB pixels indirectly through a color look up table, YCc pixels, DYUV pixels, and CCC pixels. Display sources are always 8-bits on the red, green and blue components. When the, three components of an RGB555 pixel are expanded from five bits to eight bits the five bits are shifted to the most significant bits of the eight bit components. Instead of simply leaving the three least significant bits zero, they are programmable through the following registers using the three least significant bits: ABRGB555LSBs register ($FsF00523) and CDRGB555LSBs register ($FsF00527). If the pixels were originally from an 8-bit source and they were rounded before being truncated then this register should be cleared to zero (the default). This register may be set to 111 to slightly brighten (add a luminance offset to) the image.

DYUV is another way of representing images. The Y, U, and V components are encoded into four bit delta values. Each four bit component represents one of 16 8-bit delta values. The layout of two consecutive DYUV pixels in memory is delta-U, delta-Y0, delta-V, delta-Y1. The luminance component has twice the horizontal frequency as the chrominance components. To decode DYUV pixels, each four bit delta value is expanded to an 8-bit component delta via a 16-value table. This delta is added to the previous value to form a YUV pixel value. This YUV pixel value is then transformed to RGB components via the multiplier 202, then the multiplier output is coupled to the D/A converter 26 to display the image. The system 10 allows for separate delta decoding tables for the (U and V) and the Y components. This allows for flexibility even if current DYUV encoding techniques encode all components with the same algorithm using the same fixed set of constants. The 16 entry difference table should be loaded into each delta decoding table using the following eight bit register ranges: a DeltaUVLUT register range ($FsF00580-$FsF0058F), and a DeltaYLUT register range ($FsF00590-$FsF0059F).

If the DYUV mode specifies delta values, there needs to be some way to initialize the YUV registers. This is done with a pre-scan line command. YUV and YIQ are very similar, so the DYUV mode could also be a DYIQ mode with appropriate selection of multiplier constants. By not using the multiplier 202 at all, this mode becomes DRGB, which samples the red component at twice the frequency of the green and blue components.

The system module 20 digital video port 54 has a connector for two bi-directional 32-bit channels 96, 98 of video rate data. These ports can be used to output data to other devices, to accept data from another digital video source, or to exchange data with another system module 20.

The DVP1Control register ($FsF006E2) determines whether Digital Video Port one 96 is used for data input or output, and if output which display source is used. The DVP2Control register DVP2Control ($FsF006E3) determines whether Digital Video Port two 98 is used for data input or output, and if output which display source is used. The first FIVE bits of these registers are used. Bits 2 through 0 select the data source for output to the selected Digital Video Port 96, 98, Data source 000 is comprised of the alpha, red, green, and blue channels on Video Bus Two 200. Data source 001 is comprised of the red, green, and blue channels that are selected by the display multiplexer 206; the upper 8 bits are undefined. Data source 010 is comprised of the red, green, and blue channels from the A/D converter 74 with the upper 8 bits undefined. Data source 011 is the 32-bit data register WriteDVP1Data ($FsF006F0) or WriteDVP2Data ($FsF006F8). Data source 100 is comprised of the 8-bit partial sum output of the multiplier 202 in the alpha component concatenated with the red, green and blue output channels of the multiplier 202. Data source 101 is comprised of 8-bit data from the Alpha buffer concatenated with the red, green, and blue output channels of the multiplier 202. Data source 110 is comprised of 16-bit data from the AB bank pair concatenated with 16-bit partial sum data from the multiplier 202. Data source 111 is CLUT1 for Digital Video Port 1, and CLUT 2 for Digital Video Port 2.

Bit 3 enables the output of the data lines when set to 1, and disables the output of the data lines when set to 0, for the selected Digital Video Port. Bit 4 enables the input of the data lines when set to 1, and disables the input of the data lines when set to 0, for the selected Digital Video Port. When both ports are enabled for input, they are logically XORed together. WriteDVP-1Data and WriteDVP2Data are 32-bit registers that hold a constant which is output onto the Digital Video Ports if they are in output mode and have the data source 011 selected. ReadDVP1Data register ($FsF086F4) and ReadDVP2Data register ($FsF086FC) are 32-bit registers that hold the current data present on the Digital Video Ports if they are in input mode. If either port is in output mode then the respective read register returns the value currently being output on the Digital Video Port by the system module 20.

Display controls of equal priority are resolved by the priority resolver 208 in the following order of the inputs from highest priority to lowest priority—Alpha buffer control 220, line buffer control 222, range thresholder 240, rectangular window one 225, rectangular window two 231, rectangular window three 228, rectangular window four 229, A:R alpha control bit 201, G:B alpha control bit 203, CLUT one 181, CLUT two 183, range thresholder. The default display source will be displayed at each pixel where all other display control priorities are zero. The default display source is defined by the DefaultDisplaySource register ($FsF00660), and has an implied priority of zero. The DefaultDisplaySource register uses four bits as shown below, but should not be set to values that are indicated as "reserved".

| Bits | Function |
|---|---|
| 3-0 | 0000 = Live A/D |
| | 0001 = Live Digital In |
| | 0010 = Video Bus 1 |
| | 0011 = Video Bus 2 |
| | 0100 = Clut 1 |
| | 0101 = Clut 2 |
| | 0110 = Multiplier Output |
| | 0111 = Default Color 1 |
| | 1000 = Default Color 2 |
| | 1001 = Live Digital In (31..24) |
| | 1010 = Video Bus 2 (31..24) |
| | 1011 = Multiplier partial sum output (31..16) |
| | 1100 = reserved |
| | 1101 = reserved |
| | 1110 = reserved |
| | 1111 = reserved |

The default color display source values are defined by RGB888 color values and can be set with the 24 bit DisplayOutputColor1 ($FsF00664) and DisplayOutputColor2 ($FsF00668).

Nine of the display sources are 24-bits wide. However, any or all of these display sources can enable any single 8-bit component to be duplicated into the three components red, green, and blue, thus providing a gray scale image. Each display source expansion is independent from all the others. The value 00 implies no duplication (i.e., the data is passed through all three components red, green and blue) unchanged). The format of these nine display sources is defined by the following registers.

LiveADColorFormat ($FsF00670)
LiveDigitalInColorFormat ($FsF00671)
VideoBus1ColorFormat ($FsF00672)
VideoBus2ColorFormat ($FsF00673)
CLUT1ColorFormat ($FsF00674)
CLUT2ColorFormat ($FsF00675)
MultiplierOutputColorFormat ($FsF00676)
These registers use two bits as follows:

| Bits | Function |
|---|---|
| 1-0 | 00 = 24-bit color |
| | 01 = Expand R or Y to 24-bits |
| | 10 = Expand G or C to 24-bits |
| | 11 = Expand B or c to 24-bits |

A MasterControl register ($FsF04410) uses bits 0-2 to enable several functions. Bit 0 of this register is set to enable RAM refresh. Without refresh cycles the integrity of the data in the frame buffer and line control buffer is not guaranteed. Bit 1 is set to enable video RAM transfer cycles. When this bit is clear the serial I/O channel of the video RAM is inactive. Bit 2 is a master enable for all interrupts. Regardless of the enable/disable state of the individual interrupts, no interrupts will occur if this bit is not set.

A refresh rate is determined by a refresh value in the RefreshRate register ($FsF04412). In the preferred embodiment, video RAM used in the system 10 must be refreshed at a rate of 512 lines every 8 ms. This works out to 1 line per 15.625 μs. The RefreshRate register is the product of 15.625 μs and the reference clock frequency, minus 1. For the standard 40 Mhz reference clock the RefreshRate register would be set to 624.

The video memory banks (A,B,C and D) 56 can be combined and concatenated in various ways. There are twenty-three valid bank configurations controlled by two registers. For example, the A and B banks can be concatenated so that they represent a 2K×1K 8-bit bank.

The BankConfigurations register ($FsF00100) uses eight bits to define bank configurations as follows:

| Bits | Function |
|---|---|
| 4-0 | specify concatenation modes |
| 5 | 1 = Enable G:B 8-bit mode double plane interleave |
| 6 | 1 = Enable A:R 8-bit mode double plane interleave |
| 7 | 1 = Enable A:R/G:B 16-bit mode double plane interleave |

The system 10 can have a bank which is horizontally and vertically larger than the total active screen size. Horizontal and vertical bank offset registers for each of the four banks allow for the display area to be offset to any coordinate so that this extra bank area can be selectively displayed. Changing these offset registers gradually over time allows for a smooth pan effect. The registers defining both X and Y offset for each bank are the following, each of which uses 15 bits to define offset.

BankAXOffset ($FsF00140)
BankAYOffset ($FsF00142)
BankRXOffset ($FsF00150)
BankRYOffset ($FsF00152)
BankGXOffset ($FsF00160)
BankGYOffset ($FsF00162)
BankBXOffset ($FsF00170)
BankBYOffset ($FsF00172)

These registers allow the position of each frame bank to be independently controlled relative to the absolute screen position.

Changing the bank offsets can be used to display memory in other logical pages or can be used to pan the screen. For example, incrementing the X offset(s) over time accomplishes horizontal panning to the right, as the image appears to slide left. Each bank can be offset independently.

A video bank can be zoomed by an integer factor from 1 to 2048 by replicating the pixel in the X direction and replicating the whole video line a specified number of times in the Y direction. The zoom factor in the X and Y direction for each bank is controlled by the following eight buffer zoom factor registers which each provide for a 11 bit zoom factor.

BankAXZoomFactor ($FsF00144)
BankAYZoomFactor ($FsF00146)
BankRXZoomFactor ($FsF00154)
BankRYZoomFactor ($FsF00156)
BankGXZoomFactor ($FsF00164)
BankGYZoomFactor ($FsF00166)
BankBXZoomFactor ($FsF00174)
BankBYZoomFactor ($FsF00176)

These registers define the zoom factor of each frame bank. The zoom factor specifies the number of times a pixel is replicated in a particular direction and the values are zero-based (i.e., a zoom factor of zero implies normal display). Zoom does not affect the contents of the bank memory, only the display, and the zoom factor should be greater than or equal to the mosaic factor.

Horizontal mosaicing is achieved by sampling a pixel from the bank and displaying that value for the horizontal zoom period, and then "jumping" over a number of pixels determined by the horizontal mosaic factor for the next pixel. Vertical mosaicing is achieved by sampling a line from the bank and displaying that line for the vertical zoom period, and then "jumping" over a number of lines determined by the vertical mosaic factor for the next line. This is the same as reducing the horizontal and/or vertical resolution of an image, with the limitation that the mosaic factor must be smaller than or equal to its respective zoom factor. The mosaic control registers which define the mosaic X and Y factor for each bank are 11 bit registers as follows:

BankAXMosaicFactor ($FsF00148)
BankAYMosaicFactor ($FsF0014A)
BankRXMosaicFactor ($FsF00158)
BankRYMosaicFactor ($FsF0015A)
BankGXMosaicFactor ($FsF00168)
BankGYMosaicFactor ($FsF0016A)
BankBXMosaicFactor ($FsF00178)
BankBYMosaicFactor ($FsF0017A)

The mosaic values are zero-based, i.e., a mosaic factor of zero implies normal display and the mosaic process is dependent on the zoom process.

A LiveXMosaicFactor register ($FsF00110) allows for horizontal mosaicing of the live digital video signal. The live video signal being digitized is sampled once and that sampled value is held for the LiveXMosaicFactor extra pixel periods. This register is zero-based, i.e., a mosaic factor of zero implies normal capture operation.

The system module 20 supports two direct RGB pixel formats-RGB888, and RGB555. Both formats allow RGB images to be represented directly without the use of a CLUT. Below is an example of one way to configure the register to display RGB888 images:

BankConfiguration ($FsF00100)=%00000000
BankModes ($FsF00102)=%00000000
VideoMemoryConfiguration
  ($FsF04400)=%00000000 00110011 (2Meg)
BankComponentSize ($FsF00500)=%00000000
BankPixelMode2 ($FsF00502)=%00000000
DefaultDisplaySource ($FsF00660)=%00000000

This is only one of many ways to configure the system for RGB888 images. This configuration specifies that there is no bank concatenation. The VideoMemoryConfiguration register is set up for a 32 bits/pixel depth, a horizontal buffer size of 1K (row-bytes=1K), a vertical size of 512 lines, and linear addressing mode. This specifies how the host computer sees the memory configuration, thus the 1K by 512 is not necessarily the resolution being displayed. This example is for a 2 megabyte memory configuration. A 4 megabyte configuration would be specified as 1K by 1K by 32-bits.

The BankComponentSize register is set to 8-bits per component for all four components. This specifies that 8-bits must be fetched from each bank to form the RGB888 pixel. The DefaultDisplaySource register is set to select Video Bus two 200 and BankPixelMode2 is defined to copy each component out of each bank to form the red, green, and blue components of each pixel. Alternatively, DefaultDisplaySource could be set to Video Bus One 198, and BankPixelMode1 could be set to zero which would also decode RGB888 pixels from the Red, Green, and Blue buffers.

RGB555 pixels are represented as 16-bits for each of the red, green, and blue components and an extra "unused" bit. The extra (most significant) bit can be used by the system for other purposes. The below example is one of many ways of configuring the system for RGB555 mode.

BankConcatenation ($FsF00100)=%00000000
BankModes ($FsF00102)=%00000000
VideoMemoryConfiguration
  ($FsF04400)=%00000000 00110101 (2Meg)
BankComponentSize ($FsF00500)=%00000000
BankPixelMode1 ($FsF00501)=%00000010
DefaultDisplaySource ($FsF00660)=%00000010

This configuration specifies that the buffers are concatenated in a horizontal fashion. This allows a 16-bit image of 512 lines by 2048 pixels across in video RAM. Although the display might not show the entire image all at one time, the system's panning ability can smoothly pan horizontally across the image. Concatenating the banks tells the hardware that when displaying, for example, pixel 1023 (16-bits from the Alpha-Red banks), the next pixel, 1024, comes from the Green-Blue buffer. Without this concatenation, the display hardware would wrap around to pixel offset zero.

When in 16-bit per pixel mode, only 15-bits are normally used for display purposes, and there is an extra bit which is normally set to zero. This bit can also be used for display purposes. The following registers control the RGB555 alpha bit:

ABRGB555Mode ($FsF00522)
CDRGB555Mode ($FsF00526)

These registers use the first two bits as follows:

| Bits | Function |
| --- | --- |
| 1-0 | 00 = Alpha bit not used |
| | 01 = Alpha bit is extra green bit (LSB) |
| | 10 = Save thresholder output in alpha bit |

| Bits | Function |
|---|---|
| | 11 = Use alpha bit as display source enable |

For 32-Bit QuickDraw compatibility, these mode registers are normally set to zero. For special applications, one of the three other alpha bit modes may be used. Mode 01 uses the alpha bit as additional resolution in the green component (i.e., RGB565). The green component was chosen because the human eye is more sensitive to shades of green than shades of red and blue. This option provides more color information in 16-bit pixels than is normally provided. This works in both capture and display of RGB555 images. The alpha bit provides the least significant bit of green. Mode 10 uses the alpha bit to save the thresholder output. This can be useful for comparing two images and tagging the differences in the alpha bits. This mode only works when capturing data to an RGB555 memory bank pair. Mode 11 is used to allow the alpha bits to act as video select bits. The ABRGB555 and CDRGB555 display controls will override the default display source, if the priority is high enough, for each pixel where the alpha bit is enabled. This mode works only when displaying an RGB555 image from the buffer and not when capturing.

The following registers define the bank pair AB and CD display controls:
ABRGB555DisplaySource ($FsF00520)
CDRGB555DisplaySource ($FsF00524)

These two registers use four bits to determine the display source as follows:

| Bits | Function |
|---|---|
| 3-0 | 0000 = Live A/D |
| | 0001 = Live Digital In |
| | 0010 = Video Bus 1 |
| | 0011 = Video Bus 2 |
| | 0100 = Clut 1 |
| | 0110 = Clut 2 |
| | 0111 = Default Color 1 |
| | 1000 = Default Color 2 |
| | 1001 = Live Digital In (31..24) |
| | 1010 = Multiplier partial sum output (31..16) |
| | 1100 = reserved |
| | 1101 = reserved |
| | 1110 = reserved |
| | 1111 = reserved |

ABRGB555PriorityLevel ($FsF00521)
CDRGB555PriorityLevel ($FSF00525)

These registers allow four bits to define priority level in the lower four bits of the register.

When using the color look up table (CLUT) 180, each pixel does not directly represent a color, but instead it is an index into a table of direct colors. The system module 20 supports several CLUT pixel formats. These include the conventional Apple Color QuickDraw 1, 2, 4, and 8-bits per pixel modes and a new 9-bit per pixel mode. The CLUT 180 allows for images to be represented in a more compact format with the tradeoff of using fewer colors. These colors are stored in one of two color look-up tables in the CLUT circuit 180 as follows:
CLUT1 ($FsF00800-FsF00BFF)
CLUT2 ($FsF00C00-FsF00DFF)

Each table location is 24 bits (i.e., eights bits each for red, green and blue components). The two separate color look up tables (CLUT1 and CLUT2) are useful, for example, for optimizations with software palette managers. Other uses include joining the CLUTs to support up to 512 simultaneous colors. The CLUTs can be treated as 256 entries of long word aligned, zero byte padded, 24-bit RAM. The most significant byte of each long word does not exist and should be treated as zero. The low three bytes of each long word represent a direct color with 8 bits for red, 8 bits for green, and 8 bits for blue. The CLUT 180 has the following 7-bit offset control registers:
CLUTOffsetA ($FsF00510)
CLUTOffsetB ($FsF00511)
CLUTOffsetC ($FsF00512)
CLUTOffsetD ($FsF00513)

These registers provide offsets into the 256 entry CLUTs for 1, 2 and 4-bit per pixel modes. For example, CLUT1 could be set up with 16 different 16 entry CLUTs for 4-bit per pixel mode. Then simply by changing a pointer, a different CLUT may be selected. There is a separate CLUT offset for each source buffer of CLUT pixels.

A CLUTModes register ($FsF00780) uses five bits to define the CLUT operation mode as follows:

| Bits | Function |
|---|---|
| 2-0 | 000 = 8 bits live A/D for each component |
| | 001 = 7 bits live A/D, 1 bit from source |
| | 010 = 6 bits live A/D, 2 bits from source |
| | 011 = 5 bits live A/D, 3 bits from source |
| | 100 = 4 bits live A/D, 4 bits from source |
| | 101 = 3 bits live A/D, 5 bits from source |
| | 110 = 2 bits live A/D, 6 bits from source |
| | 111 = 1 bit live A/D, 7 bits from source |
| 4-3 | 00 = normal 8-bit CLUT mode |
| | 01 = CLUT1 in mixed mode (used with bits 0..2) |
| | 10 = 9-bit CLUT mode (512 colors) |
| | 11 = 9-bit CCC 2-bit/pixel mode |

Bits 3 and 4 of this register are set to 00 for normal CLUT operation. Mode 01 is a simple "mixed mode". For proper video mixing the multiplier 202 is normally used. This mode allows for 1 to 8 bits of each component of live video to be the high bits of an index and the low bits of each component of Video Bus Two 200 to be the low bits of the same index to each component of CLUT1. This mode allows for 24 bits to act as three component indexes instead of the normal mode where eight bits act as a single color index. If all eight bits of live A/D are used, this allows the CLUT to be used for separate gamma correction of each component, or to invert or remap live video. By using the four high bits of live video and the four low bits of the components on Video Bus two, live video can be mixed with an image on Video Bus two. This is done by using the live A/D top four bits as indexes to sixteen different groups of sixteen intensities which are indexed by the low four bits. Mode 10 allows the two 8-bit CLUTS to act as a single 9-bit CLUT. This assumes a 16-bit deep source buffer (bank pair AB or bank pair CD) where the low 9 bits are indexes to a 512 entry CLUT (the upper 7 bits are ignored). Mode 11 adds another CCC display mode. In this mode, each cell's two 8-bit colors, Color0 and Color1, become 8-bit indexes into CLUT1, and CLUT2 respectively.

Two registers CLUTSource1 ($FsF00784) and CLUTSource2 ($FsF00785) use three and four bits respectively to define CLUT index sources as follows:

| Bits | Function |
|---|---|
| 2-0 | 000 = Video Bus 2 A component |
| | 001 = Video Bus 2 R component |
| | 010 = Video Bus 2 G component |
| | 011 = Video Bus 2 B component |
| | 100 = Multiplier Y Output |
| | 101 = Multiplier partial sum output |
| | 110 = Matrix address |
| | 111 = reserved |

The first six modes of these registers specify the source of the CLUT index. Normally this would come from one of the four components on Video Bus two 200. The CLUT index can also be either the Y or partial sum outputs of the multiplier 202. Luminance values either from the multipliers or video memory 56 can be used to color an image based on an intensity.

The CLUTMatrixMode register ($FsF00786) determines operating parameters for the CLUTs when in matrix modes and uses two bits as follows:

| Bits | Function |
|---|---|
| 0 | 0 = 16×16 matrix mode (CLUT1) |
| | 1 = 32×32 matrix mode (CLUT1) |
| 1 | 0 = 16×16 matrix mode (CLUT2) |
| | 1 = 32×32 matrix mode (CLUT2) |

Matrix addressing modes can be used to put the CLUT in a different mode. Instead of the CLUT memory representing indexed colors, each CLUT can instead represent a 16×16 image, for example, to implement a hardware cursor. This matrix mode use of the CLUTs displays either a 16×16 or a 32×32 image (which is the same as the 16×16 matrix but zoomed both horizontally and vertically by a factor of two). Each CLUT can be in matrix mode so that there can be up to two CLUT matrix images simultaneously. The registers below use 11 bits to control the X and Y origin of the displayed images:

CLUT1MatrixXStart ($FsF00790)
CLUT1MatrixYStart ($FsF00792)
CLUT2MatrixXStart ($FsF00794)
CLUT2MatrixYStart ($FsF00796)

In matrix mode, the image can have transparent pixels. This is useful if the image is being used as an arrow or I-beam cursor. A transparent matrix pixel is a pixel which is detected to be black (zero on all three components). The following registers control the image display when the CLUT is in matrix mode:

CLUT1DisplaySource ($FsF00798)
CLUT1BlackDetectDisplaySource ($FsF0079A)
CLUT2DisplaySource ($FsF0079C)
CLUT2BlackDetectDisplaySource ($FsF0079E)
These registers use four bits as follows:

| Bits | Function |
|---|---|
| 3-0 | 0000 = Live A/D |
| | 0001 = Live Digital In |
| | 0010 = Video Bus 1 |
| | 0011 = Video Bus 2 |
| | 0100 = Clut 1 |
| | 0101 = Clut 2 |
| | 0110 = Multiplier Output |
| | 0111 = Default Color 1 |
| | 1000 = Default Color 2 |
| | 1001 = Live Digital In (31..24) |
| | 1010 = Video Bus 2 (31..24) |

-continued

| Bits | Function |
|---|---|
| | 1011 = Multiplier partial sum output (31..16) |
| | 1100 = reserved |
| | 1101 = reserved |
| | 1110 = reserved |
| | 1111 = reserved |

The following registers permit setting a four bit priority and black detect priority level for each CLUT:
CLUT1PriorityLevel ($FsF00799)
CLUT1BlackDetectPriorityLevel ($FsF0079B)
CLUT2PriorityLevel ($FsF0079D)
CLUT2BlackDetectPriorityLevel ($FsF0079F)

The CLUT matrix display control is active (enables its display source at its specified priority) at its 16×16 or 32×32 pixel rectangle similar to a rectangular control source being active based on its bounds. The output is assigned a certain priority level which chooses the CLUT output or any other source as the display source. If all three components are zero (black) then an alternative black detect source and priority level will be chosen. Note that choosing a display source that is not CLUT memory provides an effect which appears as a "hole" looking into another display source instead of an overlay when the matrix rectangle is moved. This is because it displays the corresponding area of the selected display source instead of the static image of the matrix in CLUT memory.

YCc is short for "YIQ or YUV". YIQ and YUV are alternative color representations to the RGB color designations. In both models the "Y" represents the luminance component (the gray scale values on a black and white TV set), and the IQ or UV components represent the chrominance components. Because the human eye perceives more image information from the luminance component and because the system 10 allows for YCc images to provide the "Y" component at twice the horizontal frequency as the Cc components, the YCc mode is a more efficient model than the RGB model for representing color images. Because there is a mathematical relationship (a matrix transformation) between the RGB and YIQ, and RGB and YUV color spaces, the system 10 can display YCc images by using the multiplier 202 to carry out the transformation to the RGB color space in real time.

Using color cell compression (CCC), images can be compressed significantly. CCC relies on the fact that chrominance changes in images almost always indicate a luminance change. 24-bit images (8-bits per red, green, and blue component) are broken down into R, G, B and Y values. This representation is then broken down into 4×4 pixel cells. An average Y-value for each cell is obtained. A 4×4 bitmap is then constructed where is represent pixels above the average Y, and Os represent pixels below the average Y. Two 24-bit color values, representing high and low values for each 4×4 cell are chosen. Each 1 in the bitmap represents the high color and each 0 represents the low color. Each 4×4 cell is represented by a 16-bit bitmap and two 24-bit color values, 64-bits for 16 pixels, or 4 bits/pixel. If the 24-bit colors are instead 8-bit indexes to 256 24-bit colors, then each pixel is represented by a 16-bit bitmap and two 8 bit color indexes, 32-bits for 16-pixels, or 2 bits/pixel. If CCC video image data is provided, the system module 20 can display CCC images using real-time hardware decompression. It is possible to have CCC images which have YCc colors associated with each cell instead of RGB colors. The YCc colors can be transformed through the multiplier array 202 to RGB pixels.

The system module 20 requires word width (16-bit depth) data for the CCC 4-bits/pixel mode. This can be in the AB memory bank pair or the CD memory bank pair. Thus, the register must have a bit set for each buffer which is in CCC mode. The PixelModel register allows selection of the CCC 4-bits/pixel source (AB or CD), and output of the data on Video Bus one 198.

The system module 20 requires byte width (8-bit depth) data for the CCC 2-bits/pixel mode which can be in the memory bank A, B, C, or D. The CCCEnables register must have a bit set for each buffer which is in CCC mode. The PixelMode2 register allows selection of the CCC 2-bits/pixel source buffer(s) (A, B, C, and/or D), and output of the data on Video Bus Two 200 to the CLUT. The CLUTSource (1 or 2) register should be set to select the CLUT index input. Then selecting the CLUT output as a display source allows viewing the CCC image.

The system module 20 requires three byte width (8-bit depth) data sources for the CCC 6-bit/pixel mode. These are the memory banks B, C, and D. The CCCEnables register must have a bit set for each buffer which is in CCC mode. The PixelMode2 register allows setting the memory banks BA, C, D to represent 3 channels of CCC 2-bits/pixel sources, and output the data on Video Bus two. Then selecting the Video Bus Two 200 output as a display source allows viewing the CCC image.

Some of the various video buffer display configurations allow 8-bit or 16-bit data to be interleaved. Interleaved modes are useful for higher horizontal resolution. Normally, pixels are retrieved in a burst of 4 from the video memory 56 before being channeled to their destination. In interleaved modes, two groups of four pixels are retrieved from two different buffers or buffer pairs and interleaved as a whole group. An interleave mode is designed to reduce the possibility of the video RAM access time becoming a bottleneck. Bit 8 in the VideoMemoryConfiguration register must be set to enable any double plane interleave. 8-bit data interleaving can be accomplished by using one or two of two valid memory bank pairs, AB or CD. In this mode, pixels are retrieved in groups of four from both members of the pair and interleaved before being output to the other sections of the system module 20. Both memory bank pairs may be interleaved at the same time, or one can be interleaved and the other not interleaved. 8-bit interleaving can only be accomplished in specific modes as specified by the BankConfigurations register. The BankConfigurations register must specify that the pair of buffers to interleave are adjacent horizontally. Sixteen bit interleaving can be accomplished by using all four buffers arranged as two pairs. This mode requires that the 16-bit buffer pairs be arranged so that they are adjacent horizontally.

The clock generator 184 has several registers for clock control, and clock outputs and inputs. The first of these registers is an eight bit ClockControl register. In addition, there are four registers for clock divider values. The ClockControl register ($FsF00000) is a protected register and uses eight bits as follows:

| Bits | Function |
|---|---|
| 1-0 | 00 = Select VCO clock |

-continued

| Bits | Function |
|---|---|
|  | 01 = Select A/D clock input |
|  | 10 = Select DVP clock input |
|  | 11 = reserved |
| 2 | 0 = TriStated |
|  | 1 = ChromaClk |
| 3 | 0 = Pulses |
|  | 1 = /2 Square wave |
| 4 | 0 = Disable DCP shift clock |
|  | 1 = Enable DCP shift clock |
| 5 | 0 = Disable VRAM shift clock |
|  | 1 = Enable VRAM shift clock |
| 6 | 0 = DCLK is input |
|  | 1 = DCLK is output |
| 7 | 0 = PCLK free runs |
|  | 1 = PCLK phase referenced |

Bits 1 and 0 determine from which of three clock sources the VSC 22 system clock signal (and subsequently the pixel clock) is derived. Source 00 selects the VCO circuit for programmable clock rates. Source 01 selects an external clock input from the input module 40. Source 10 selects the clock input from the Digital Video Port buses 96, 98. Source 11 is reserved. Bit 2 controls the ChromaClock output; when this bit is set to 1 the clock generator 184 drives the ChromaClock output signal (typically 3.579545 MHz for NTSC). If this bit is cleared to zero this signal is tri-stated. Bit 3 is normally cleared to 0 and is set to one for square wave conversion (divide-by-two) of VCO and reference clock divider pulse outputs. Bit 4 enables the shift clocks to the line command buffer 90. This bit is cleared when not using the line control function. Bit 5 enables the shift clocks to the display buffer VRAMs and is set on power up by the host controller 50. Bit 6 determines the direction of the clock pin in the digital video ports. When it is set to 1, the clock pin is an output. When it is cleared to 0, the clock pin is an input. Bit 7 controls the PCKL refrence. When it is set to 1, PCLK is phase referenced to the incoming synchronization edge. When it is cleared to 0, PCLK free runs. Typically this bit is cleared to 0.

The three least significant bits of the PixelClockDivider register ($FsF00002) determine the VCO divider factor as follows (this register is a protected register):

| Bits | Function |
|---|---|
| 2-0 | 000 = /1 |
|  | 001 = /2 |
|  | 010 = /4 |
|  | 011 = /8 |
|  | 100 = /16 |
|  | 101 = /32 |
|  | 110 = /64 |
|  | 111 = /128 |

The VCO output is fed to the chroma clock divider and divide-by-two circuit for chroma phase reference derivation by dividing by (ChromaClockDivider+1) *2. This produces the chroma clock divider 480 output. The ChromaClockDivider register ($FsF00003) provides three bits for the divide factor and is a protected register.

The VCO clock divider (divide by N) 482 divides the VCO signal by the factor VCOClockDivider+1. The ratio of this and the divided reference clock divided by the PixelClockDivider yields the pixel clock rate. The VCOClockDivider register ($FsF00004) provides twelve bits for the divide factor and is a protected register.

The reference clock divider (divide by R) 484 divides the reference clock (40 Mhz in the illustrated embodiment) by the factor ReferenceClockDivider+1. The ReferenceClockDivider register ($FsF00006) provides twelve bits for the divide factor and is a protected register.

The HorizontalCounterStatus register ($FsF080C0) maintains a real time index of the video signal in units of pixel clocks from the beginning of the currently active video line. This register uses twelve bits and is a read only register.

The VerticalCounter Status register ($FsF080C2) maintains a real time index of the video signal in units of horizontal lines from the beginning of the active video frame. This register uses twelve bits and is a read only register. The start of horizontal sync is the beginning of a new scan line which will increment the VerticalCounterStatus register.

The system 10 can genlock with an external video source and a GLock ($FsF00042) can be programmed to generate video timing system counters, or a genlocked horizontal and vertical counter. This register is a protected register and uses fourteen bits as follows:

The Board Control Parameter Register ($FsF0006A) specifies A/D input parameters for the input module 40. This register is a protected register and uses two bits as follows:

Bit 0 of the Board Control Parameters register determines which video sync input is used on the input module 40. A one selects synchronization derived from green video of input 68, and a zero selects synchronization derived from black-burst input 84. Bit one is normally set. This indicates a 7.5 IRE offset from the reference level (of blanking obtained during clamping) to the black level. Clearing this bit equates the reference level and the black level.

There are two modes of acquiring horizontal lock. The first is sync-lock which resynchronizes the horizontal counter to the external synchronization on a line-by-line basis. The video system controller 22 starts out in a search mode for horizontal lock. The leading edge on incoming horizontal synchronization represents the reference point for horizontal frequency locking. This edge synchronizes the twelve-bit horizontal counter by locking a horizontal lock value (or starting value) from a twelve-bit HLV register ($FsF00030) into the counter at this point. Hence there is a programmable timing relationship between incoming and outgoing video. Once the horizontal counter is synchronized for HLockAquisitionTime ($FsF00046) horizontal lines, horizontal lock is obtained. However, HorizontalLockMissingSyncs register ($FsF00044) and the search mode will be entered again. These registers are protected registers. The window control circuit 176 generates four rectangular windows for controlling display sources. Each window represents a rectangular area for a display source at a given priority. Each window also has three flags to specify if the display source is inside or outside its boundary in the X direction, the Y direction, and overall. The four windows are entirely independent of one another, thus they each have their own rectangle, their own display source, and their own priority. The bounds of each window are defined by the following registers:

Rectangular Window 1XStart ($FsF00200)
Rectangular Window 2XStart ($FsF00210)
Rectangular Window 3XStart ($FsF00220)
Rectangular Window 4XStart ($FsF00230)
Rectangular Window 1XEnd ($FsF00202)
Rectangular Window 2XEnd ($FsF00212)
Rectangular Window 3XEnd ($FsF00222)
Rectangular Window 4XEnd ($FsF00232)
Rectangular Window 1YStart ($FsF00204)
Rectangular Window 2YStart ($FsF00214)
Rectangular Window 3YStart ($FsF00224)
Rectangular Window 4YStart ($FsF00234)
Rectangular Window 1YEnd ($FsF00206)
Rectangular Window 2YEnd ($FsF00216)
Rectangular Window 3YEnd ($FsF00226)
Rectangular Window 4YEnd ($FsF00236)

Pixels that lie in the range XStart up to but excluding XEnd and YStart up to but excluding YEnd are defined to be inside the rectangle, as long as XStart is less than XEnd (if X is set to inside) and YStart is less than YEnd (if Y is set to inside). There is also a control bit to select inside area or the region outside of it. If the XStart value is greater -, 2 than the XEnd value, then this inverts the meaning of the x inside/outside bit along that line. If the YStart value is greater than the YEnd value or if the upper-left equals the lower-right, then the rectangle encloses no pixels. The registers defining each window display source are as follows:

Rectangular Window 1Display Source ($FsF00208)
Rectangular Window 2Display Source ($FsF00218)
Rectangular Window 3Display Source ($FsF00228)
Rectangular Window 4Display Source ($FsF00238)

Each of these registers use the lower four bits as follows:

| Bits | Function |
| --- | --- |
| 3-0 | 0000. = Live AD |
| | 0001 = Live Digital In |
| | 0010 = Video Bus 1 |
| | 0011 = Video Bus 2 |
| | 0100 = CLUT 1 |
| | 0101 = CLUT 2 |
| | 0110 = Multiplier Output |
| | 0111 = Default Color 1 |
| | 1000 = Default Color 2 |
| | 1001 = Live Digital In (31..24) |
| | 1010 = Video Bus 2 (31..24) |
| | 1011 = Multiplier partial sum output (31..16) |
| | 1100 = reserved |
| | 1101 = reserved |
| | 1110 = reserved |
| | 1111 = reserved |

The registers defining each window priority level are four-bit registers as follows:

Rectangular Window 1Priority Level ($FsF00209)
Rectangular Window 2Priority Level ($FsF00219)
Rectangular Window 3Priority Level ($FsF00229)
Rectangular Window 4Priority Level ($FsF00239)

The registers defining the inside/outside control bits for each window use a zero for inside and a one for outside. These registers are as follows:

Rectangular Window 1IOControl ($FsF0020A)
Rectangular Window 2IOControl ($FsF0021A)
Rectangular Window 3IOControl ($FsF0022A)
Rectangular Window 4IOControl ($FsF0023A)

By setting a window's inside/outside control flag to outside, the area inside the window is untouched and the region outside the window is manipulated by the window control.

The video memory 56 has four memory banks—A, B, C, and D. To capture data into a buffer requires setting an enable bit for each buffer that will accept and store data. Normally these parameter bits will be set up during the vertical blanking period, or else somewhat less than the full frame will be captured. When capturing, the buffer offset registers allow the displacement of the captured data within the buffers.

The buffer zoom registers work differently during the capture operation. Using the zoom registers results in a decimation of the image. For example, setting the zoom registers to 1 (a zoom factor of 2) results in an image captured into the buffers that is one half the size vertically and one half the size horizontally of the original image. With no buffer offset(s) applied, this image will be captured into the upper left corner of the buffer(s). The effective result is to shrink the live video frame by integer shrink factors (the zoom factors) and store it in the buffer. The CaptureBankEnables register ($FsF000B0) has one bit for each buffer to enable capturing, the zero-bit for bank D, the next bit for bank C, the next for bank B, and the fourth-bit for bank A capture enable. When not capturing, this register should be set to zero.

The capture window is defined by the following eleven-bit registers:
Capture Window XStart ($FsF002E0)
36 Capture Window XEnd ($FsF002E2)
Capture Window YStart ($FsF002E4)
Capture Window YEnd ($FsF002E6)

The capture window is referenced to the upper left corner of the live video signal and not the address of pixel 0,0 in the buffer. Before captured data is captured to one or more buffers, its source and format must be determined and then it must be passed back to the buffers. The eight-bit CaptureDataSourceFormat register ($FsF006A0) controls these functions as follows:

| Bits | Function |
| --- | --- |
| 1-0 | 00 = Capture 32-bit video |
| | 01 = Low 24 bits goes to AR and GB buffers as RGB555 data |
| | 11 = Duplicate component selected by bits 3..2 to all components |
| 3-2 | 00 = Select A component |
| | 01 = Select R component |
| | 10 = Select G component |
| | 11 = Select B component |
| 6-4 | 000 = Y Multiplier (31..24), Live A/D RGB |
| | 001 = 32-bit live digital in |
| | 010 = 32-bit multiplier output |
| | 011 = Video Bus 2 (32-bits) |
| | 100 = Display multiplexer output (24 bits) |
| | 101 = Default capture color (32-bits) |
| | 110 = 16-bit, PSO, 16-bit PSO |
| | 111 = reserved |
| 7 | 0 = YCc Mode even pixel Cc |
| | 1 = YCc Mode average pixel Cc |

Bits 6 to 4 of the CaptureDataSourceFormat register determine the source of the bits to be captured. Bits 1 and 0 describe the format of the data being captured. Mode 00 takes the 32-bits and passes them unchanged to the buffers. Note that the A/D converter 70 on input module 40 does not supply alpha information, so the data supplied on the alpha component is undefined. Mode 01 truncates the 24-bit RGB888 data to RGB555 values and puts those values on both the AB and CD buses so that data can be captured in a 16-bit per pixel mode. Typically only one of these two buffer pairs is enabled by the CaptureBankEnables register. Mode 10 puts the data in 16-bit YCc format. In this mode, 24-bit YCc data on the red, green, and blue component buses is presented to both 16-bit buffer pairs AB and CD; the CaptureBankEnables register determines which buffers actually record data. The data is recorded such that the high order bank (A or C) receives the Y values at every pixel. The low order bank (B or D) alternately receives C data on even pixels and C data on odd pixels. The nature of the C and c data are determined by bit 7. Mode 11 is used to duplicate a single component across all four components. In this mode, bits 3 to 2 select a single component to be duplicated across all four memory banks 56. This can be useful if the selected component is an intensity, and it is to be saved across the red, green, and blue components. This is also useful for moving data from one buffer to a different buffer without using the host computer. Bit 7 determines the nature of the C and c data used in YCc capture mode. When bit 7 is cleared to 0, the C and c values are sampled only in the even pixel. When bit 7 is set to 1, the C and c values are sampled for both the even and odd pixel periods and averaged. Capture source 101 is the value held in the 32-bit Capture Color Constant register ($FsF006A4). Capturing a constant value into the video buffer(s) 56 is a very fast way of initializing a large amount of video memory in a short time; for example, clearing the screen to black or initializing the alpha buffer to a constant can be done in one frame time.

The multiplier matrix 202 of the video system controller 22, comprising a three by three array of 10×9-bit multipliers, performs highly programmable real-time (pixel-rate) video processing capable of multiplying up to three video sources with a set of input constants. The registers which define the multiplier constants are ten-bit registers as follows:

| Multiplier1K1 ($FsF00760) | ($FsF00740) | Multiplier2K1 |
| Multiplier1K2 ($FsF00762) | ($FsF00742) | Multiplier2K2 |
| Multiplier1K3 ($FsF00764) | ($FsF00744) | Multiplier2K3 |
| Multiplier1K4 ($FsF00766) | ($FsF00746) | Multiplier2K4 |
| Multiplier1K5 ($FsF00768) | ($FsF00748) | Multiplier2K5 |
| Multiplier1K6 ($FsF0076A) | ($FsF0074A) | Multiplier2K6 |
| Multiplier1K7 ($FsF0076C) | ($FsF0074C) | Multiplier2K7 |
| Multiplier1K8 ($FsF0076E) | ($FsF0074E) | Multiplier2K8 |
| Multiplier1K9 ($FsF00770) | ($FsF00750) | Multiplier2K9 |

For modes in which the multiplier 202 is used twice per pixel (blend-transform, and transform-blend), the second set of constants are loaded for the second multiplier operation. The multiplier constants are two's complement 10-bit values with an implicit binary point between bits 7 and 6, yielding a rang of ±4. The mode of operation of the multiplier array is determined by the MultiplierMode register ($FsF00700). This register uses five bits as follows:

| Bits | Function |
| --- | --- |
| 2-0 | 000 = Transform |
| | 001 = Blend |

| Bits | Function |
|---|---|
| | 010 = Transform, Blend |
| | 011 = Blend, Transform |
| | 100 = 2-D Filter, 8-bit |
| | 101 = 2-D Filter, 16-bit |
| | 110 = Frame Accumulator, 16-bit |
| | 111 = reserved |
| 3 | 0 = 9-tap filter |
| | 1 = 18-tap filter |
| 4 | 0 = clamp output to 8 bits |
| | 1 = clamp output to 16 bits |

The MultiplierInputSource registers determine which of up to nine sources are to be up to three input sources to the multiplier. These are:
Pixel0MultiplierInputSource1 ($FsF00326)
Pixel1MultiplierInputSource1 ($FsF00327)
Pixel0MultiplierInputSource2 ($FsF00328)
Pixel1MultiplierInputSource2 ($FsF00329)
Pixel0MultiplierInputSource3 ($FsF0032A)
Pixel1MultiplierInputSource3 ($FsF0032B)
These registers use three bits as follows:

| Bits | Function |
|---|---|
| 2-0 | 000 = Live A/D |
| | 001 = Live Digital In |
| | 010 = Video Bus 1 |
| | 011 = Video Bus 2 |
| | 100 = CLUT 1 |
| | 101 = CLUT 2 |
| | 110 = Multiplier Default Color |
| | 111 = Multiplier BW/Noise Generator |

The blend mode blends up to three different sources, therefore all three source registers are set to different values. When in transformation mode all three MultiplierInputSource registers are set to the same value.

A MultiplierInputSourceFormat register ($FsF00710) defines the format, including sign mode of the multiplier inputs. This register uses twelve bits as follows:

| Bits | Function |
|---|---|
| 2-0 | B blend control: 0=unsigned, 1=signed for each input source |
| 5-3 | G blend control: 0=unsigned, 1=signed for each input source |
| 8-6 | R transform control: 0=unsigned, 1=signed (B,G,R) for each input source |
| 11-9 | Transform control: 0=unsigned, 1=signed (B,G,R) |

A MultiplierOutputFormats register ($FsF00712) defines the sign mode for the multiplier outputs. This register uses 7 bits as follows:

| Bits | Function |
|---|---|
| 0 | Partial sum output control: 0=unsigned, 1=signed |
| 3-1 | Multiplier 2 output control: RGB 0=unsigned, 1=signed |
| 6-4 | Multiplier 1 output control: RGB 0=unsigned, 1=signed |

When a multiplier input source selects the Noise Generator, the MultiplierBWNoiseGenerator register ($FsF00707) controls the pixel values for the multiplier inputs. This register uses six bits as follows:

| Bits | Function |
|---|---|
| 2-0 | 000 = Video Bus 2-A expanded to 24-bit B/W |
| | 001 = Video Bus 2-R expanded to 24-bit B/W |
| | 010 = Video Bus 2-G expanded to 24-bit B/W |
| | 011 = Video Bus 2-B expanded to 24-bit B/W |
| | 100 = Live Digital In-A expanded to 24 bit B/W |
| | 101 = reserved |
| | 110 = 8-bit noise-B/W expanded to 24-bit B/W |
| | 111 = 24-bit noise-color |
| 3 | 0 = Non-synchronous noise |
| | 1 = Frame-synchronous noise |
| 4 | 0 = 13 tap noise |
| | 1 = 19 tap noise |
| 5 | 0 = $00 to $7F seven bit noise |
| | 1 = $00 to $Ff eight bit noise |

If the lower three bits of this register are set for 24-bit noise, then each pixel will consist of a 24 random bits. If the lower three bits are set for 8-bit noise, then each pixel will consist of an 8-bit random number duplicated into all three components. The lower three bits can also select one of the 8-bit Video Bus two components or the live digital input alpha channel, duplicated into all three components. This can be used to mix an 8-bit gray scale image with another color or black and white image. If bit 3 is set to 1, then the noise will be synchronous with each frame, otherwise, it will be non-synchronous.

The MultiplierColorConstant register ($FsF00708) provides a 24-bit RGB color with eight bits per component to be used as three of the multiplier inputs. A FilterSource register ($FsF0070C) uses two bits to select the filter source inputs (8-bit components) for the multiplier 2-D filter mode as follows:

| Bits | Function |
|---|---|
| 1-0 | 00 = A of Video Bus 2 |
| | 01 = R of Multiplier Source Input Source #1 |
| | 10 = G of Multiplier Source Input Source #1 |
| | 11 = B of Multiplier Source Input Source #1 |

A PartialSumIn register ($FsF00700) uses three bits to select partial sum inputs (8-bit components) for the multiplier 2-D filter made as follows:

| Bits | Function |
|---|---|
| 1-0 | 00 = Bank A |
| | 01 = Bank B |
| | 10 = Bank C |
| | 11 = Bank D |
| 2 | 0 = input bank selected by bits 1 and 0 |
| | 1 = force partial sum input to zero |

As an example of using the system 10 to perform a transformation, to transform a standard color television YIQ signal to RGB formats, the YIQ image is stored in the R, G, and B buffers 56. This data is then placed on Video Bus 1, fed to the multipliers, converted to RGB data, and then displayed. To program the multipliers to do this transformation requires that the MultiplierMode register be set to TRANSFORM (000) and the multiplier input sources to be all set to Video Bus 1. The nine multiplier constants would be set to K1=1, K2=0.956; K3=0.621; K4=1, K5=0.272; K6=0.647; K7=1; K8=−1.106; and K9=1.703. The MultiplierInputSourceFormats would be set to %10 011 000 000 000

(this indicates the Y component is unsigned and the I and Q components are signed) and the MultiplierOutputFormats would be set to %0 000 000 0 (this indicates the multiplier outputs for this transformation are unsigned). The ConstantsSource register would be set to %00000 111 to use the multiplier constants registers and finally the display source would be set to the multiplier output to permit viewing the image.

There are three comparators in the range thresholding circuit 204 which can perform 3-axis range thresholding or three data range comparisons. Each range comparator can be programmed with an 8-bit low boundary and an 8-bit high boundary thus defining a separate range for each. Each comparator will compare the incoming data to the range specified inclusive of the limit values. The outputs of the three range comparators are AND'ed together. Each range comparator output can be inverted so that the AND function looks for an out-of-range data component. The output of the AND or NAND function enables the range thresholding display control. The input source comes from one of seven 24-bit sources, or any one of their 8-bit components spread to 24-bits. Two 24-bit registers, RangeThresholderLo ($FsF00604) and RangeThresholderHi ($FsF00600) set the high and low comparator boundaries for the red, green, and blue components with the lowest eight bit byte for blue, the second byte for green and the third byte for red. The source of the input to the range comparators are defined by the Pixel0RangeThresholderInputSource register ($FsF0032C) and the Pixel1RangeThresholderInputSource register ($FsF0032D), using three bits as follows:

| Bits | Function |
| --- | --- |
| 2-0 | 000 = Live A/D |
|  | 001 = Live Digital In |
|  | 010 = Video Bus 1 |
|  | 011 = Video Bus 2 |
|  | 100 = Clut 1 |
|  | 101 = Clut 2 |
|  | 110 = Multiplier Output |
|  | 111 = reserved |

A RangeThresholderInputMode register ($FsF00609) uses three bits to define an input mode to the range comparators as follows:

| Bits | Function |
| --- | --- |
| 2-0 | 000 = alpha component expanded to 24-bits |
|  | 001 = red component expanded to 24-bits |
|  | 010 = green component expanded to 24-bits |
|  | 011 = blue componenet expanded to 24-bits |
|  | 100 = 24-bit mode |
|  | 101 = reserved |
|  | 110 = reserved |
|  | 111 = reserved |

This register is typically set to 00000100 (24-bit mode). This means that the red, green, and blue components of the input source are compared against the red, green, and blue ranges defined by the RangeThresholderLo and RangeThresholderHi registers. However, this register allows for one of the 8-bit components to be spread across the red, green, and blue inputs to the comparators. This is useful for enabling the range thresholder display source based on two or three ranges of data in a single component.

This register enables each comparator output to be normal or inverted. In addition, this register controls whether the three comparator outputs are ANDed or NANDed, and the comparator mode is controlled by a RangeThresholdSourceFormat register ($FsF0060F) using 3 bits with the lowest for the blue component, the next bit for green, and the next for red, with zero indicating an unsigned and a one indicating a signed component. Thus, this register controls the comparator mode for each component independently. Each comparator can be signed or unsigned.

Memory bank A of the video memory can contain video information or it can act as an 8-bit alpha control buffer. In this control mode, the alpha buffer is used to control a number of features of the system module 20 on a pixel by pixel basis. The alpha buffer can operate in one of five control modes. This mode is set up with the AlphaBufferControlMode register ($FsF00300) using four bits as follows:

| Bits | Function |
| --- | --- |
| 2-0 | 000 = 8-bit ICF (Image Contribution Factor) |
|  | 001 = 4-bit display source, 4-bit priority level |
|  | 010 = 7-bit ICF, 1-bit select for gang select for pixel control |
|  | 011 = 8-bits for direct pixel control |
|  | 100 = Pixel by pixel capture enables |
|  | 101 = reserved |
|  | 110 = reserved |
|  | 111 = reserved |
| 3 | 0 = ICFScaleFactor from register |
|  | 1 = ICFScaleFactor from bank A |

Bits from Alpha control register selects channel (Mode 011)

(Modes 010 and 011) or AlphaControl-Selects0/1
D7=ICF (mode 011 only)
D6=Display Source
D5=Display Priority level
D4=Multiplier input source #1
D3=Multiplier input source #2
D2=Multiplier input source #3
D1=Thresholder input source
D0=Color or B/W display A 0 bit selects the register from alpha control register set 0.

A 1-bit selects the register from alpha control register set 1.

The first mode allows an 8-bit image contribution factor (ICF) to be loaded directly into the multiplier 202 for mixing of the currently selected multiplier sources. This provides extreme flexibility for the mixing ratio of two images anywhere over the display. The second mode divides the eight bits into a four-bit display source and a four-bit priority level. This provides extreme flexibility for choosing the display source at any given pixel. The third mode devotes the seven most significant bits to the ICF, and the least significant bit is used to gang select the Pixel0RangeThresholderInputSource and the Pixel1RangeThresholderIInputSource registers. Each alpha control select register contains seven register select bits. Each bit selects one of two other registers that control the alpha display source and priority level, the input sources to the multipliers and thresholder, and expansion of a color component to 24 bits.

The fourth control mode devotes all 8 bits to one level of indirection (they perform the function of the AlphaControlSelect registers directly). The bits point directly to the control registers with two more 8-bit ICF registers added to the set. This mode limits the ICF from being any value at any pixel to being one of two values at any pixel. However, the full 8-bits of the ICF are available in the Pixel0ICT ($FsF00320) and Pixel-1ICF ($FsF00321) (described hereinafter) as opposed to the seven most 39 significant bits.

The fifth mode allows pixel by pixel control of capture and shift clocks to the buffers. In this mode, the bit 0 of the bytes in the Alpha buffer individually enable pixels to be captured. Setting this bit to 1 enables capture and setting it to 0 disables capture. Bit 1 of the bytes in the Alpha buffer individually enables or disables the shift clock to the video buffers 56 when capturing. Clearing this bit to 0 allows the clock to increment, resulting in normal image capture. Setting this bit to 1 prevents the buffer clock(s) from incrementing, resulting in a variable horizontal decimation of the captured image.

To use this pixel by pixel mode, the CaptureBankEnables register should be set so that the Alpha buffer is not capturing data.

In the Alpha buffer control mode 011, bit seven of the Alpha buffer determines which of two ICF factors are used in the multiplier array. This allows two levels of mixing throughout the display area, using a minimal amount of memory to control the effect. The two ICF factors are provided by the Pixel0ICF register ($FsF00320) and Pixel1ICF ($FsF00321) registers which are eight bit registers. The Pixel0DisplaySource register ($FsF00322) and Pixel1DisplaySource ($FsF00323) for the Alpha buffer control allows pixel by pixel modification of the display source using four bits as follows:

| Bits | Function |
|------|----------|
| 3-0  | 0000 = Live A/D |
|      | 0001 = Live Digital In |
|      | 0010 = Video Bus 1 |
|      | 0011 = Video Bus 2 |
|      | 0100 = Clut 1 |
|      | 0101 = Clut 2 |
|      | 0110 = Multiplier Output |
|      | 0111 = Default Color 1 |
|      | 1000 = Default Color 2 |
|      | 1001 = Live Digital In (31..24) |
|      | 1010 = Video Bus 2 (31..24) |
|      | 1011 = Multiplier partial sum output (31..16) |
|      | 1100 = reserved |
|      | 1101 = reserved |
|      | 1110 = reserved |
|      | 1111 = reserved |

The priority level for the Alpha buffer control display sources are provided by an Pixel0PriorityLevel register FsF00324) and Pixel1PriorityLevel register ($FsF00325) which are four bit registers. The display sources and priority levels for the Alpha buffer allow pixel by pixel changing of the display source. The display sources can be set to the same source and different priority levels can be used to make another display source appear to intersect the alpha control display source. Alternatively, the display priority levels can be set to the same level and the display sources can be set to two different images. This allows the switching of two images at the same priority level with pixel by pixel control. Of course, both the display sources and priorities can be different at the same time.

The alpha multiplier input sources allow pixel by pixel control of the inputs into the multipliers by means of the following six registers.

These registers use three bits as follows:

| Bits | Function |
|------|----------|
| 2-0  | 000 = Live A/D |
|      | 001 = Live Digital In |
|      | 010 = Video Bus 1 |
|      | 011 = Video Bus 2 |
|      | 100 = Clut 1 |
|      | 101 = Clut 2 |
|      | 110 = Multiplier Default Color |
|      | 111 = Multiplier BW/Noise Generator |

The alpha range thresholder input source allows the pixel by pixel control of the input into the range thresholder by means of the following two registers.
Pixel0RangeThresholderInputSource ($FsF0032C)
Pixel1RangeThresholderInputSource ($FsF0032D)
These registers use three bits as follows:

| Bits | Function |
|------|----------|
| 2-0  | 000 = Live A/D |
|      | 001 = Live Digital In |
|      | 010 = Video Bus 1 |
|      | 011 = Video Bus 2 |
|      | 100 = Clut 1 |
|      | 101 = Clut 2 |
|      | 110 = Multiplier Output |
|      | 111 = reserved |

The PixelDisplaySourceFormat register ($FsF0032E) and PixelDisplaySourceFormat registers ($FsF0032F) allow the pixel by pixel control of the display multiplexer output expansion mode using two bits as follows:

| Bits | Function |
|------|----------|
| 1-0  | 00 = 24-bit color |
|      | 01 = Expand R or Y to 24-bits |
|      | 10 = Expand G or C to 24-bits |
|      | 11 = Expand B or c to 24-bits |

The ICFScaleFactor register ($FsF00340) is used for real-time scaling of fixed alpha buffer mix patterns. Setting this register to 100% ($007F) causes the blend ICF ratios defined by the alpha buffer controls to be used as is (multiplied by 100%). Since this register scales all alpha buffer blend ratios, changing this single register changes all blend ratios defined by the alpha buffer.

Additional multiplier registers and control codes from the line buffer control 178 can change the blending percentages across a scan line. The ten bit BlendRatioInitialValue register ($FsF00720) and the ten bit BlendRatioRateOfChange register ($FsF00390) permit line based blending. The line control blend ratio is used for the MultiplierInputSource1 K-vector (K1, K4, and K7). The two least significant bits provide extra resolution. The BlendRatioRateOfChange register is added or subtracted (depending on line buffer control commands) to the current blend ratio for each pixel along a scan line where the line buffer control enables blending.

The BlendRatioTotal register ($FsF00724) is a ten bit register providing a total blend ratio. The MultiplierInputSource2 K-vector (K2, K5, and K8) is determined by BlendRatioTotal minus the current blend ratio value. Inversely varying the K-vectors allows one source to be faded in as another source fades out. Because the sum of the contribution factors of the images is not always 100%, the BlendRatioTotal defines the upper limit. This register is signed, and should be set to $7F for 100%.

A ConstantsSource register ($FsF00728) defines the source of the constants using three bits as follows:

| Bits | Function |
| --- | --- |
| 2-0 | 000 = Pixel or Line Controlled Blending |
|  | 001 = multiplier noise generator channel |
|  | 010 = red component of video bus 2 |
|  | 011 = alpha component of live digital port |
|  | 100 = reserved |
|  | 101 = reserved |
|  | 110 = reserved |
|  | 111 = multilier K-registers |

The line based mixing functions control the first two K-vectors. The ConstantsSource register defines the source of the first K-vector (K1, K4, and K7), thus allowing for it to use the K-registers, or another source for determining the first blend ratio. If the multipliers are not in blend mode, the ConstantsSource register would normally be set to select the K-registers.

A set of commands created for each line of display can control the source of display and the blend ration of two sources. This could, for example, be used to create an oddshaped window that has a smooth transitional fade from one source to the next. A Display Control Program (DCP)consists of a set of long word commands in the line command buffer 90 ($FsF8000-FsF9F7FF). The line command buffer 90 is 126K and contains sixteen long word commands per scan line for up to 2016 lines of vertical resolution.

The line command memory can be programmed loaded with line commands) at any time because of its dual ported nature. DCP line commands are clocked into a FIFO buffer within the Video system controller 22. This FIFO allows commands to be read in before the beginning of the scan line so that several line setup commands can be executed. Also, it allows commands to queue so that commands can execute at consecutive pixels.

The DCP is enabled and configured through the LineControlMode register ($FsF00380) using two bits as follows:

| Bits | Function |
| --- | --- |
| 0 | Enable line command buffer active scan commands |
| 1 | Enable line command buffer pre-scan commands |

The DCP is also configured through the four bit DCPPriorityLevel register ($FsF00381). When an active scan command selects another display source, it assigns the priority from this register.

Each line command is 32 bits. There are two types of line commands. The first type consists of those commands that affect the line before the active scan begins (pre-scan commands). These commands allow for changing the X & Y offsets on a line-by-line basis, update default display color 1, update the default display source, change multiplier constants, initialize the DYUV decoding, and disable capture. Disabling capture forces the buffer back into a display mode for the current line while disabling capture coupled with a new Y value allows mosaicing a live image in the vertical direction.

The second group consists of those commands that affect display line at a particular X value. This group accommodates switching display sources and smooth blending. Thus a series of image cuts or fades could be accomplished using the line command buffer.

The Pre-Scan Command Format uses the lower 24 bits for command data, the next four bits are assigned respectively to D, C, B, and A bank selects, and the next three bits are used as follows:

| Bits | Function |
| --- | --- |
| 30-28 | 000 = Capture enable (19, change default display source (18..15), new Y-value (14..0) |
|  | 001 = X offset (14..0) |
|  | 010 = Initial DYUV (Y: 23..16, U: 15..8, V: 7..0) |
|  | 011 = Change default color 1 (R: 23..16, G: 15..8, B: 7..0) |
|  | 100 = Load 3 input source multiplier blend constants (K3: 23..16, K6: 15..8, K9: 7..0) |
|  | 101 = Change Decoder Formats (20..16 CLUT mode, 15.88 PixelMode 1, 6..0 PixelMode 2) |
|  | 110 = reserved |
|  | 111 = NOP |

Bit 31 distinguishes between active scan commands and pre-scan commands. This bit must be cleared to 0 for pre-scan commands. Pre-scan commands affect only the current line and any changes revert back to the conventional settings on the next line unless additional pre-scan commands are used. Bits 30 through 28 are a 3-bit operation code. Seven operation codes are currently defined: capture/display commands, set X offset, initialize DYUV, set default color 1, load multiplier constants, change decoder formats, and no operation. Bit 27 when set to 1 enables this pre-scan command to affect bank A. When this bit is cleared to 1, this pre-scan command ignores bank A. Bit 26 when set to 1 enables this pre-scan command to affect bank B. When this bit is cleared to 0, this pre-scan command ignores bank B. Bit 25 when set to 1 enables this pre-scan command to affect bank C. When this bit is cleared to 0, this pre-scan command ignores bank C. Bit 24 when set to 1 enables this pre-scan command to affect bank D. When this bit is cleared to 0, this pre-scan command ignores bank D. Bits 23 through 0 are data for a given operation code. Unused bits should be cleared to 0. For operation code 000 (capture/display), bits 14 through 0 determine the Y value to use for this active horizontal line. Bits 18 through 15 allow the alteration of the default display source on a line by line basis. The allowable values are identical to those shown in the active scan command format for bits 27 through 24. Bit 19 determines whether capture mode is enabled for this horizontal line. Note that the CaptureBankEnables register bits must still be set to allow this operation code to write to the bank selected in bits 27 through 24. For operation code 001 (set X offset), bits 14 through 0 designate an X offset to be applied to the current horizontal row. Bits 23 through 15 are reserved and should be cleared to 0. For operation code 010 (initialize DYUV), bits 23 through 0 describe initial values for DYUV modes. Bits 23 through 16 hold the initial Y value, bits 15 through 8 hold the initial U value, and bits 7 through 0 hold the initial V value. For operation code 011 (set default color 1), bits 23 through 0 describe an absolute color in RGB space to be placed into the DisplayOutputColor1 register. Bits 23 through 16 hold the red component; bits 15 through 8 hold the green component, and bits 7 through 0 hold the blue component. For operation code 100 (load multiplier constants), bits 23 through 0 describe three constant values for the multiplier array. Bits 23 through 16 hold the K3 constant; bits 15 through 8 hold the K6 constant, and bits 7 through 0 hold the K9 constant. For operation code 101 (change decoder formats), bits 20 through 16 are used to override the CLUTModes register, bits 15 through 8 override the PixelModel register, and bits 6 through 0 overridge PixelModel2 register. Note that bit 7 is reserved and should be cleared to 0. Operation code 110 is reserved. Operation code 111 designates no operation; all remaining bits in the command are ignored and should be cleared to 0.

The Active Scan Command Format uses the lowest eleven bits for an x value and uses the rest of the register bits as follows:

| Bits | Function |
| --- | --- |
| 11 | Load Image Contribution Factor (ICF) |
| 13-12 | 00 = Stop changing ICF |
| | 01 = Start incrementing ICF |
| | 10 = Start decrementing ICF |
| | 11 = reserved |
| 23-14 | Image Contribution Factor |
| 27-24 | 0000 = Live A/D |
| | 0001 = Live Digital In |
| | 0010 = Video Bus 1 |
| | 0011 = Video Bus 2 |
| | 0100 = Clut 1 |
| | 0101 = Clut 2 |
| | 0110 = Multiplier Output |
| | 0111 = Default Color 1 |
| | 1000 = Default Color 2 |
| | 1001 = Live Digital In (31..24) |
| | 1010 = Video Bus 2 (31..24) |
| | 1011 = Multiplier partial sum output (31..16) |
| | 1100 = reserved |
| | 1101 = reserved |
| | 1110 = reserved |
| | 1111 = reserved |
| 30-28 | 000 = Live A/D |
| | 001 = Live Digital In |
| | 010 = Video Bus 1 |
| | 011 = Video Bus 2 |
| | 100 = Clut 1 |
| | 101 = Clut 2 |
| | 110 = Multiplier Default Color |
| | 111 = Multiplier BW/Noise Generator |

Bit 31 distinguishes between active scan commands and pre-scan commands. This bit must be set to one for active scan commands and zero for pre-scan commands. Bits 10 through 0 determine the 11 bit X value which is typically less than HorizontalActiveScreenSize because line commands only affect the display output. Bit 11, when set to 1, reloads the ICF register with the 8-bit value in bits 23 through 16. This operation takes precedence over bits 14 and 13. Bits 13 and 12 determine the mode of operation of a programmable linear sequencer. If the mode is 01, the sequencer starts to increase the ICF at the rate specified by the BlendRatioRateOfChange register. If the mode is 10, the sequencer starts to decrease the ICF at this same rate. If the value is 00, the sequencer is halted and the value of the ICF is frozen. Mode 11 is reserved. The initial value for the ICF must be set by an active scan command. Bits 23 through 15 are ignored if bit 11 is cleared to 0. Bits 27 through 24 designate which of the indicated display source should be passed through into the priority resolver as the DCP display source. Bits 30 through 28 determine the first input source for the multiplier array. Note that if DCP active line commands are enabled this value overrides the value specified by the Pixel0MultiplierInputSource and Pixel1MultiplierInputSource registers.

The system module 20 in the illustrated embodiment, uses a Brooktree Bt473 true-color RAMDAC. This part is accessible through eight consecutive memory mapped 8-bit registers. Below is the memory map for the Brooktree DAC:

DACWriteRAMAddress ($FsF40000)
DACColorPaletteRAMs ($FsF40001)
DACPixelReadMaskRegister ($FsF40002)
DACReadRAMAddress ($FsF40003)
DACWriteOverlayAddress ($FsF40004)
DACOverlayRegisters ($FsF40005)
DACCmd ($FsF40006)
DACReadOverlayAddress ($FsF40007)

The Brooktree DAC is typically used in 24-Bit True-Color mode. In this mode, 24-bits of pixel information 8-bits red, 8-bits green, and 8-bits blue are input to the RAMDAC. Each component addresses 256 color palette RAM values which are fed to the D/A. This allows for hardware gamma correction simply by programming the palette RAM. In the 24-Bit TrueColor mode, the DAC remaps each component through its tables, and outputs the remapped values through the D/A. The DAC Command Register uses bits 3-0 to control general purpose output pins. Bits 1-0 are fed back to the mode select lines S1 and S0. These are set to 00 for normal operation (24-Bit True-Color mode). Setting these bits to 01 bypasses the DAC index tables. Therefore, if the DAC was programmed for gamma correction, setting bit 0 of the command register would bypass the gamma tables and display the non gamma corrected components directly. Setting these bits to 10 allows the use of the color look up table function in the DAC. The 8-bit component that the DAC expands to 24 bits is determined by registers internal to the DAC. Bits 3-2 are fed back to overlay select lines OVL0 and OVL1 to allow overlay modes.

The video system controller 22 is so flexible in its timing that it can interface to virtually any monitor. Unfortunately, most monitors are so intolerant of timing variations that it is possible to damage some monitors by driving them with timing parameters just a few percent off their expected values. As a result, the video system controller 22 registers that control absolute timing parameters are protected by a security code system. It is required to write a security 32-bit value ($1F2DCC0A) to the SecurityCode register ($FsF044A4) immediately before each write to any protected register. This protection prevents inadvertent reprogramming of the critical video timing parameters.

The system 10 may be programmed to generate an interrupt on every line, field, or frame. It can also report an interrupt due to a light pen and light pen trigger. These interrupts may be individually masked off as determined by the EnableInterrupts register ($FsF000D4) using three bits as follows:

| Bits | Function |
| --- | --- |
| 0 | 0 = Disable Absolute Time interrupt |
| | 1 = Enable absolute time interrupt |
| 1 | 0 = Disable light pen interrupt |
| | 1 = Enable light pen interrupt |

-continued

| Bits | Function |
|---|---|
| 2 | 0 = Disable pen trigger interrupt<br>1 = Enable pen trigger interrupt |

Bit 0 when set to 1 enables absolute time interrupts. Bits 4 and 3 select the frequency of the interrupts as shown. Bit 1 when set to 1 enables light pen interrupts. Bit 2 when set to 1 enables interrupts based on the light pen trigger switch. Bits 4 and 3 determine how often an absolute time interrupt is to occur. When frame or field interrupts are selected, they occur at the time specified by a HorizontalInterruptPoint and VerticalInterruptPoint register (described hereinafter). When interrupts are enabled on every line, they occur at a point defined by a HorizontalInterruptPoint register (described hereinafter) on every line, even if those lines are in vertical blanking or synchronization.

A ClearInterrupts register ($FsF000D5) uses three bits as follows:

| Bits | Function |
|---|---|
| 0 | 0 = No effect<br>1 = Clear absolute time interrupt |
| 1 | 0 = No effect<br>1 = Clear light pen interrupt |
| 2 | 0 = No effect<br>1 = Clear pen trigger interrupt |

1=Clear pen trigger interrupt

Bit 0 when set to 1 will clear a posted absolute time interrupt. To prevent clearing the interrupt, this bit is cleared to 0. Bit 1 when set to 1 will clear a posted light pen interrupt. To prevent clearing the interrupt, this bit is cleared to 0. Bit 2 when set to 1 will clear a posted light pen trigger interrupt. To prevent clearing the interrupt, this bit is cleared to 0.

A read only InterruptStatus register ($FsF080D8) stores five bits of current interrupt information as follows:

| Bits | Function |
|---|---|
| 0 | 0 = Absolute Time interrupt inactive<br>1 = Absolute time interrupt posted |
| 1 | 0 = Light pen interrupt inactive<br>1 = Light pen interrupt posted |
| 2 | 0 = Pen trigger interrupt inactive<br>1 = Pen trigger interrupt posted |
| 3 | Pen trigger direct status |
| 4 | Light pen direct status |

Bit 0 is an indicator of a posted absolute time interrupt. When this bit is set, an absolute time interrupt has occurred and has not yet been cleared. Bit 1 is an indicator of a posted light pen interrupt. When this bit is set, a light pen interrupt has occurred and has not yet been cleared. Bit 2 is an indicator of a posted light pen trigger interrupt. When this bit is set, a light pen trigger interrupt has occurred and has not yet been cleared. Bit 3 is a real time indicator of the light pen trigger. This direct input allows polling to determine the state of the trigger switch. Note that the polling software must determine adequate time intervals to allow for switch debouncing. Bit 4 is a real time indicator of the light pen sensor. This direct input allows polling to determine the state of the pen sensor.

The HorizontalInterruptPoint register ($FsF000DC) is a twelve bit register which determines the point during the horizontal interval that an absolute time interrupt occurs. When absolute interrupts are set to Line mode, an interrupt is generated every time the HorizontalCounterStatus register reaches this value. When absolute interrupts are set to Field or Frame modes, this determines where on the specified horizontal line the interrupt occurs.

The VerticalInterruptPoint register ($FsF000DE) determines the point during the vertical frame or field that an absolute time interrupt occurs. When absolute interrupts are set to Line mode, this register is ignored. When absolute interrupts are set to Field or Frame modes, this determines the specific horizontal line where the interrupt occurs. Bit 0 of this register is ignored when the absolute interrupt mode is set to field mode. This means that if the absolute interrupt mode is set to Frame while displaying interlaced video, interrupts are generated every other field, and if the mode is set to Field while displaying non-interlaced video, two interrupts will occur in every frame on adjacent lines.

The system 10 through the input module 40 allows the use of a light pen with a sense line and a switch/trigger line through the input module 40. The sense line is asserted when the light pen senses the electron beam traced out on the display screen 42. The system module 20 may be programmed to capture the current values in the HorizontalCounterStatus register and VerticalCounterStatus register at this event. The light pen may also feature a trigger or enable switch. This input may also be programmed to generate an interrupt. Both inputs may be sampled directly by performing polling on the direct status lines for these inputs.

The system 10 can communicate with an input module 40 via a serial communications channel. Because each capture input module is different, a unique identification number is latched in a register on powerup to identify the characteristics of the capture input module. The LiveADConfigurationStatus register ($FsF086C0) is a 24 bit register which latches the capture circuit characteristics on powerup. If there is no capture circuit present, this register reads all zeros. This is a read only register wherein the high 8 bits will always read as zeros. For example, a value of $0000000-1 can indicate an input module with maximum 20 MHz sample rate analog to digital RGB 8-bit per component with light pen and trigger inputs.

A SerialBusControl register ($FsF006E8) allows serial communications with an attached A/D capture input module using four bits as follows:

| Bits | Function |
|---|---|
| 0 | IMD output |
| 1 | IMI output |
| 2 | IMC Output |
| 3 | 0 = Disable IMD output<br>1 = Enable IMD output |

Bits 2 through 0 of SerialBusControl register are outputs to the A/D input module for serial communications. Bit 3 of SerialBusControl register set to 1 enables the IMD output; when cleared to 0 IMD is not driven. The IMD, IMI, and IMC are signals that interconnect from system module 20 to the capture input module. These signals are used for internal and test communications. The IMD signal is useful for bi-directional communications; the IMI and IMC signals are outputs to the capture input module.

The IMDInput register ($FsF086E9) is a single bit read only register. If bit 3 of SerialBusControl is set to 1, this bit will always read the same as bit 0 of SerialBusControl.

Alternate Embodiment

The invention is available in various embodiment configurations, each with different amounts of video memory, ranging from no video memory up to 8 MB of video memory. An invention with no video memory is useful for real time image or video processing. It can perform all the special effects and features described in this embodiment as long as the effects or features use only a video stream, not static or dynamic video.

The embodiments with 2 MB and 4 MB of video memory support all the features of the invention; capturing images, displaying images, and all the special effects. These embodiments differ only in the maximum size of the video memory.

An embodiment with 1 MB of video memory is a special case. It can accomplish most of the same functions of the larger memory embodiments, including capturing and displaying images and a number of special effects, at a lesser cost.

However, the amount of memory imposes some subtle restrictions which will become evident. The primary restriction is the 1 MB version of the invention can only operate in display modes up to 16 bits, not 24 or 32 bits like the larger models. This will become clearer with additional information.

The video memory holds image data. The memory is a full 32-bits wide on the illustrated embodiments of the invention. It is accessible using the address modes of the Motorola MC680×0 processor in the Macintosh II Apple computers, including 8-bit byte, 16-bit word, 32-bit long word, and bit field operations.

The start address for video memory depends on the Macintosh II slot containing the invention. The invention uses slot space addressed in the form $Fsxxxxxx. The invention video memory always starts at an address in the form $Fs000000. The 's' in these addresses represents the number associated with a respective one of the NuBus slots in a Macintosh II computer.

Video memory addresses ascend linearly from this address to the end of installed video memory. The highest address for video memory in the illustrated embodiment is in the form $Fs7FFFFF, where 's' again represents the selected NuBus slots in a Macintosh II computer. This address refers to the last byte in an 8 MB embodiment.

Note that these addresses are full 32-bit addresses. The programmer is responsible for setting and restoring the appropriate MMU mode in the Macintosh II, according to Apple Guidelines.

The embodiments with at least 2 MB of video memory have their memory logically divided into 4 memory banks. Each memory bank may hold an image, multiple images, or portions of an image. Memory banks may be accessed singly or in any combination to process images or portions of an image.

The memory modules generally contain four banks of memory: A, B, C, and D. The invention's memory module in a 1 MB configuration contains only two banks of memory: A and B.

As a result, an embodiment with a 1 MB memory module can only work with those pixel formats that require one or two banks. A 1 MB memory module cannot function with pixel formats that require three or more banks.

The system of the invention can display or process images or portions of images held in these memory banks. The invention permits the use of many different methods to display an image from video memory. In a preferred method the red, green, and blue color components for the display are obtained respectively from three separate memory banks. Other embodiments having equally valid methods include deriving the data from only two memory bank, and deriving the data from just one memory bank.

Apple's 32-bit QuickDraw supports many different formats to specify pixels on the screen. Some of these formats (2, 5, 16, and 256 color modes) are indirect pixel formats, referencing a color from a stored index. The remaining two formats (thousands to millions) are direct formats.

While the illustrated embodiments discuss Apple's Macintosh computer and Apple's 32-bit QuickDraw environment, the present invention is not dependent on any particular host environment, and could work equally well in other environments, such as DEC, IBM, COMPAQ, Appollo, Commodore, and other vendors' computers, and can be utilized with any of numerous commercial microprocessors (e.g. Intel 8080, 8086, 80286, 80386, 80486, Motorola 68000, 68010, 68020, 68030, 68010, National Semiconductor 32000 series, Texas Instruments TMS 9900, 99000, TMS 32010 series and others).

The invention supports all the 32-bit QuickDraw formats, and introduces several new indirect and direct pixel formats.

An indirect pixel format stores color indexes in a color look-up table in video memory, allowing for a more compact representation of the data necessary for an image. This limits the total number of colors that may be represented. The current release of 32-bit QuickDraw supports four indirect pixel formats: 1-bit CLUT, also known as "2 colors", 2-bit CLUT, also known as "4 colors", 4-bit CLUT, also known as "16 colors", 8-bit CLUT, also known as "256 colors".

The invention supports all the current 32-bit QuickDraw indirect pixel formats, and introduces several new indirect pixel formats: 9-bit CLUT, 2-bit CCC, 8-bit DYCc.

Indirect pixel formats use indexes that refer to entries in a table, although the type of table varies between formats. In these formats, an image consists of the data stored in video memory and the associated color look-up tables (CLUT). Only an index to a value is stored in video memory, not the actual value.

Color look-up table values are specified to be 24-bit pixel color values. In the CLUT, each entry uses 8 bits to specify the red component, 8 bits for the green component, and 8 bits for the blue component of the pixel. Thereby the index assigns its referenced pixel or pixels a single color from the range of 16.7 million available colors.

In the four indirect CLUT modes (1-bit, 2-bit, 4-bit, and 8-bit), an index is stored in memory for each pixel.

One of the compressed indirect pixel formats is the 2-bit CCC. In this format, the video memory contains a pair of indexes for a small array of pixels, along with a list linking each pixel to an index. The name "CCC" is derived from the phrase "Color Cell Compression" U.S. Pat. Nos. 4,580,134 and 4,743,959, is an image format technique disclosed in U.S. Pat. No. 4,580,134 and 4,743,959.

In the other compressed format, the DYCc pixel format, indexes are stored in memory for pairs of pixels. These indexes reference difference or "delta" values stored in delta tables". The values in the delta tables manipulate the color of the pixels based on the color of the previous pixel pair. The name DYCc derives from the phrase delta YCc".

Alternative and/or additional formats, compressed and non, can be utilized. The number of bits in the format determines the number of unique indexes. In the 1-bit format, there are only two unique indexes, hence there can be only two distinct colors represented in the image. The 2-bit format allows four unique indexes, the 4-bit format provides sixteen indexes, and the 8-bit format can hold 256 distinct indexes.

Note that indexes are stored in a packed format; in 1 byte there can be 8 indexes (in 1-bit CLUT mode), 4 indexes (in 2-bit CLUT mode), 2 indexes (in 4-bit CLUT mode), 1 index (in 8-bit CLUT mode) or part of an index (in 9-bit CLUT mode).

In the 1-bit color look-up table pixel format, bytes are arranged horizontally in ascending address order from left to right. The 1-bit color look-up table pixel format requires the use of one of the four memory banks A, B, C, or D.

In the 1-bit color look-up table pixel format, a single bit determines which of two colors each specified with 24 bits of color information is chosen for the pixel., In the 1-bit color look-up table pixel format, adjacent bits in the same 8-bit byte represent horizontally adjacent pixels. The most significant bit of an 8-bit byte represents the leftmost pixel. Bytes are arranged horizontally in ascending address order from left to right. The pixels represented by the least significant bit of a byte and the most significant bit of the next byte are adjacent.

In the 1-bit color look-up table pixel format, horizontal lines are arranged in ascending address order from the top to the bottom of the screen. The last byte on a horizontal line may be adjacent to the beginning byte for the next horizontal line.

The last byte on a horizontal line is not always adjacent to the beginning byte on the next lower horizontal line.

There may be fewer pixels displayed on a horizontal line in the 1-bit color look-up table pixel format than the invention is capable of storing. In this event, the extra bytes not displayed still contribute to the adjacent horizontal line offset in a memory bank.

In the 2-bit color look-up table pixel format, bytes are arranged horizontally in ascending address order from left to right. The 2-bit color look-up table pixel format requires the use of one of the four memory banks A, B, C, or D.

In the 2-bit color look-up table pixel format, a pair of bits determines which of four colors each specified with 24 bits of color information is chosen for the pixel.

In the 2-bit color look-up table pixel format, adjacent pairs of bits in the same 8-bit byte represent horizontally adjacent pixels. Pixels are arranged starting with the most significant pair of bits of an 8-bit byte representing the leftmost pixel. Bytes are arranged horizontally in ascending address order from left to right. The least significant pair of bits of a byte represents a pixel adjacent to the next bytes most significant pair of bits.

In the 2-bit color look-up table pixel format, horizontal lines are arranged in ascending address order from the top to the bottom of the screen. The last byte on a horizontal line may be adjacent to the beginning byte for the next horizontal line.

The last byte on a horizontal line is not always adjacent to the beginning byte on the next lower horizontal line.

There may be fewer pixels displayed on a horizontal line in the 2-bit color look-up table pixel format than the invention is capable of storing. Though not displayed, the extra bytes do contribute to the adjacent horizontal line offset in a memory bank.

In the 4-bit color look-up table pixel format, bytes are arranged horizontally in ascending address order from left to right. The 4-bit color look-up table pixel format requires the use of one of the four memory banks A, B, C, or D.

In the 4-bit color look-up table pixel format, a group of four bits determines which of sixteen colors each specified with 24 bits of color information is chosen for the pixel. The dimmed bits represent other pixels.

In the 4-bit color look-up table pixel format, adjacent groups of bits in the same 8-bit byte represent horizontally adjacent pixels. The most significant half of an 8-bit byte represents the leftmost pixel. Bytes are arranged horizontally in ascending address order from left to right. The least significant half of a byte represents a pixel adjacent to that of the most significant half of the next byte.

In the 4-bit color look-up table pixel format, horizontal lines are arranged in ascending address order from the top to the bottom of the screen. The last byte on a horizontal line may be adjacent to the beginning byte for the next horizontal line.

The two shaded bytes would be adjacent in a memory bank, even though they represent different horizontal lines of pixels.

The last byte on a horizontal line is not always adjacent to the beginning byte on the next lower horizontal line.

There may be fewer pixels displayed on a horizontal line in the 4-bit color look-up table pixel format than the invention is capable of storing. In this event, the extra bytes, though not displayed, do contribute to the offset between adjacent horizontal lines in a memory bank.

In the 8-bit color look-up table pixel format, bytes are arranged horizontally in ascending address order from left to right. The 8-bit color look-up table pixel format requires the use of any one of the four memory banks A, B, C, or D.

In the 8-bit color look-up table pixel format, a byte determines which of two hundred fifty-six colors each specified with 24 bits of color information is chosen for the pixel.

In the 8-bit color look-up table pixel format, horizontal lines are arranged in ascending address order from the top to the bottom of the screen. The last byte on a horizontal line may be adjacent to the beginning byte for the next horizontal line.

The last byte on a horizontal line is not always adjacent to the beginning byte on the next lower horizontal line.

There may be fewer pixels displayed on a horizontal line in the 8-bit color look-up table pixel format than the invention is capable of storing. Though not displayed, the extra bytes do contribute to the offset between adjacent horizontal lines in a memory bank.

In the 9-bit color look-up table pixel format, groups of two bytes in different memory banks are used to store the information necessary to describe a single pixel. The memory bank pair AB or the pair CD may be used in 9-bit color lookup table pixel format.

In the 9-bit color look-up table pixel format, memory banks are arranged from front to back. Of the two memory banks in a pair, the "front" memory bank only contributes a single bit of information for the 9-bit color look-up table pixel format.

The least significant bit of the "front" memory bank (bank A or bank C) is concatentated with the bits in the back memory bank (bank B or bank D, respectively). The remaining bits in the "front" memory bank are unused and should always be written as zeros. Adjacent bytes in both memory banks are used to represent adjacent pixels.

The 9-bit color look-up table pixel format is less efficient than the other indirect formats because of the unused bits. The 9-bit color look-up table pixel format allows the use of more colors simultaneously than the 8-bit color look-up table pixel format, and can allow some special effects that would otherwise be impossible to accomplish in real time.

Two options exist within the 9-bit color look-up table. The nine bits may specify one of 512 colors (with some limitations on the colors) or one of 384 colors. The first 256 colors are always specified with 24 bits of precision. The remaining 256 or 128 colors are specified with 16 or 24 bits of color precision, respectively, as the following examples illustrate.

When the nine bits determine which one of up to 512 colors is chosen for the pixel, the colors are specified. The bits representing other pixels are dimmed.

Note that the last 256 colors are specified with only 16 bits of precision.

Note that the last 128 colors are specified with 24 bits of color precision. Pixels whose entry numbers are larger than 383 have undefined colors.

In the 9-bit color look-up table pixel format, horizontal lines are arranged in ascending address order from the top to the bottom of the screen. The last bytes on a horizontal line may be adjacent to the beginning bytes (in their respective memory banks) for the next horizontal line.

The last byte on a horizontal line is not always adjacent to the beginning byte on the next lower horizontal line.

There may be fewer pixels displayed on a horizontal line in the 9-bit indirect pixel format than the invention is capable of storing. In this event, the extra bytes though not displayed do contribute to the offset between adjacent horizontal lines in a memory bank.

CCC pixel formats are unique among the formats used by the invention because they represent small horizontal arrays of pixels (cells) rather than linear rows of single pixels.

In the 2-bit CCC indirect pixel format, rectangular groups of sixteen pixels arranged four pixels wide by four pixels high are represented in a compact format using only 32 bits for the entire group averaging two bits per pixel. The 2-bit CCC indirect pixel format requires the use of one of the four memory banks A, B, C, or D.

In the 2-bit CCC indirect pixel format, adjacent bytes in a memory bank are used for different purposes. Groups of four bytes represent both the color indexes and cell maps for the sixteen pixels in a cell.

The first byte of each group of four bytes is used to store the color index for all the zeros in the cell map. The next byte is used to store the color index for all the ones in the cell map. The next two bytes are used for the cell map itself, one for the top and one for the bottom.

The CCC technique determines which of up to 512 colors is chosen for each of the pixels in the cell. The two color indexes stored for each cell are only a byte each, but both indexes reference their own color look-up table. The index for the zeros references one of 256 colors, each specified with 24 bits of color precision.

The index for the ones may reference one of 256 colors (each specified with 16 bits of color precision) or one of 128 colors (each specified with 24 bits of color precision). Thus the CCC 2-bit technique can be used in two ways. Since there are only two indexes for each group of 16 pixels in a cell each pixel in a cell must be one of two distinct pixel color values.

Each bit in the cell map selects either the first or the second index. The selected index is used to reference the appropriate entry in the appropriate color look-up table which provides a pixel color value. Within each cell, the individual bits of the top half and bottom half of the cell are assigned.

There are eight bits which refer to the pixels in the top half of a cell, and eight bits which refer to the bottom half of a cell. The state of each bit (0 or 1) determines which of the two color indexes stored for that cell is used for the pixel. Since the same two color look-up tables are used for all cells in an image, only 512 or 384 pixel colors (depending on the method of operation) may be used per image. This is regardless of the number of cells.

Horizontally adjacent cells are specified by adjacent groups of four bytes and are mapped. Ascending addresses within a bank refer to horizontally adjacent cells, from left to right.

In 2-bit CCC indirect pixel format, horizontal rows of cells are arranged in ascending address order from the top to the bottom of the screen. The last cell on a horizontal row of cells may be adjacent to the beginning cell for the next horizontal row of cells in the memory bank.

The two sets of four bytes represented by the shaded cells would be adjacent in the memory bank, even though they are used for different horizontal rows of cells.

The last cell on a horizontal row of cells is not always adjacent in the memory bank to the beginning cell on the next lower horizontal row.

There may be fewer cells displayed on a horizontal row in 2-bit CCC indirect pixel format than the invention is capable of storing. In this event, the extra cells are not displayed, but still contribute to the offset between adjacent horizontal lines of cells in the memory bank.

This section describes the data used for the 8-bit DYCc indirect pixel format. The 8-bit DYCc indirect pixel format is unique among the formats used by the invention because it represents pixel color values in relative terms. This relative pixel encoding scheme makes the color value for any specific pair of pixels on the screen dependent upon the last pair of pixels on the screen because the values in video memory describe the difference between the previous pair to the current pair.

The mechanism that initializes the 8-bit DYCc indirect pixel decoding scheme is the line control section of the disclosure. It is discussed in the Line Control section of this disclosure.

In the 8-bit DYCc indirect pixel format a pair of bytes determine four 4-bit delta indexes.

The four indexes reference values stored in two independent delta tables. The four values thus referenced are used to alter the YCc color values of the next two pixels based on the YCc color values of the last two pixels. The 8-bit DYCc indirect pixel format requires the use of any one of the four memory banks A, B, C, or D.

The low order four bits of each byte in the group are used to specify the indexes for the luminance component delta value.

The index from the first byte references an 8-bit relative displacement for the luminance value from the previous pixel to the first pixel in this pair. The index from the second byte references an independent 8-bit relative displacement for the luminance value from the first pixel to the second pixel in this pair. This new luminance value is used as the "previous" luminance value for the next pixel pair.

The high order four bits of each byte in the group are used to specify the indexes for the chrominance components delta value.

The index from the first byte references an 8-bit relative displacement for the chrominance value "C" from the previous pixel pair to the current pair. The index from the second byte references an 8-bit relative displacement for the chrominance value "c" from the previous pixel pair to the current pair. The new chrominance values are used as the "previous" chrominance values for the next pixel pair.

Relative displacements may be used in two ways. The first method simply adds the displacements to the previous chrominance values and uses the sum for both pixels in the pair. The second method adds half the displacements for the "C" and "c" components to the previous values for the first pixel in the pair, and then adds half the displacements again for the second pixel in the pair. This operation essentially interpolates the displacements within the pixel pair.

The number of colors on the screen in 8-bit DYCc indirect pixel format is intricately related to the image. The number of colors that may be represented varies depending upon the image and the relative displacement values used in the index tables.

Changes in the luminance portion of an image are more noticeable than changes in the chrominance portions. The 8-bit DYCc indirect pixel format takes advantage of that fact. The 8-bit DYCc indirect pixel format dedicates more information per pixel to store a more accurate description of the changes in the luminance portion of an image and less information per pixel to store a description of the changes in the chrominance portion of an image.

A direct pixel is a data format where a pixel color is stored directly in the video memory. It allows for a more comprehensive representation of the data necessary for an image. It also consumes more video memory.

The invention supports all the current QuickDraw direct pixel formats, and introduces new direct pixel formats: 16-bit RGB 565, 4-bit CCC, 6-bit CCC, 16-bit YCc.

All direct pixel formats share a common distinguishing factor: they all store the actual values for each pixel in video memory. There are several different ways of encoding the information for the pixels, but the direct formats do not use tables or indexing schemes to store the information. In direct pixel formats an image consists of the data stored in video memory.

In RGB direct pixel formats, all of the information necessary to determine each pixel color value is stored directly in the video memory in component color form. Each pixel has an associated entry for the red, the green and the blue components of the color.

In the YCc direct pixel format, all of the information necessary to determine each pixel color value is stored directly in the video memory using a compact luminance and chrominance encoding scheme. Each pair of pixels share two entries for the chrominance components, and each pixel has its own luminance value.

In CCC direct pixel formats, a pair of 24-bit pixel color values are stored in video memory for a small array of pixels. Video memory also stores a list of which pixels in the small array use the first color of the pair and which ones use the second. CCC is an abbreviation Color Cell Compression, which is a patented image format.

In the 16-bit RGB direct pixel format, groups of two bytes in different memory banks are used to store the information necessary to describe a single pixel. Together each group of two bytes describe the alpha, red, green and blue components of a pixel. The 16-bit RGB direct pixel format requires the use of a pair of memory banks. The memory bank pair AB or the pair CD may be used in 16-bit RGB direct pixel format.

In the 16-bit RGB direct pixel format, memory banks are arranged from front to back. Memory bank A or C is used for the front bank, and memory bank B or D (respectively) is used for the back bank.

The most significant bit of the front memory bank is used as an alpha component. Each of the three color components is defined by five bits. Bits 6 through 2 of the front memory bank supply the five most significant bits of the red color component.

Bits 1 and 0, concatenated with bits 7 through 5 of the rear memory bank, supply the five most significant bits of the green color component. Bits 4 through 0 of the rear memory bank supply the five most significant bits of the blue color component.

Because only the red, green and blue components are used to determine the pixel color, and each component is specified by 15 bits, the 16-bit RGB direct pixel format is sometimes referred to as a 15-bit RGB direct pixel format.

The least significant bits of the red, green and blue color components are programmable. They apply to all pixels displayed in 16-bit RGB pixel formats. With fifteen bits defining the red, green, and blue color components, this 16-bit RGB direct pixel format allows the selection of any one of 32,768 different pixel colors for each pixel on the screen.

In the 16-bit RGB direct pixel format, horizontal lines are arranged in ascending address order from the top to the bottom of the screen. The last bytes on a horizontal line may be adjacent to the beginning bytes (in their respective memory banks) for the next horizontal line.

The two shaded bytes would be adjacent in a memory bank, even though they are used for different horizontal lines of pixels.

The last byte on a horizontal line is not always adjacent to the beginning byte on the next lower horizontal line.

There may be fewer pixels displayed on a horizontal line in 16-bit RGB direct pixel format than the invention is capable of storing. In this event, the extra bytes are not displayed, but still contribute to the offset between adjacent horizontal lines in a memory bank.

In the 16-bit RGB 565 direct pixel format, groups of two bytes in different memory banks are used to store the information necessary to describe a single pixel. Each group of two bytes describe the red, green and blue components of a pixel. The 16-bit RGB 565 direct pixel format uses of a pair of memory banks. The memory bank pair AB or the pair CD may be used in 16-bit RGB 565 direct pixel format.

In the 16-bit RGB 565 direct pixel format, memory banks are arranged from front to back. Memory bank A or C is used for the front bank, and memory bank B or D (respectively) is used for the back bank.

The red and blue color components are defined by five bits each. Bits 6 through 2 of the front memory bank supply the five most significant bits of the red color component. Bits 4 through 0 of the rear memory bank supply the five most significant bits of the blue color component.

The green component is built from bits 1 and 0 in the front memory bank, concatenated with bits 7 through 5 of the rear memory bank, concatenated with the bit 7 of the front memory bank. The green component is defined by six bits in 16-bit RGB 565 format.

The least significant bits of the red, green and blue color components are programmable, but they apply to all pixels displayed in 16-bit RGB pixel formats. With sixteen bits defining the red, green, and blue color components, this 16-bit RGB 565 direct pixel format allows the selection of any one of 65,536 different pixel colors for each pixel on the screen. The alpha bit was added to the green component because the human eye is more sensitive to shades of green than to shades of red and blue.

In the 16-bit RGB 565 direct pixel format, horizontal lines are arranged in ascending address order from the top to the bottom of the screen. The last bytes on a horizontal line may be adjacent to the beginning bytes (in their respective memory banks) for the next horizontal line.

The last byte on a horizontal line is not always adjacent to the beginning byte on the next lower horizontal line.

There may be fewer pixels displayed on a horizontal line in 16-bit RGB 565 direct pixel format than the invention is capable of storing. In this event, the extra bytes are not displayed, but still contribute to the offset between adjacent horizontal lines in a memory bank.

In the 32-bit RGB direct pixel format, groups of four bytes are used to store the information necessary to describe a single pixel. Each group of four bytes describe the alpha, red, green and blue components of a pixel. The 32-bit RGB direct pixel format requires the use of all four memory banks A, B, C, and D.

Each of the four components is defined by a single byte, one from each of the memory banks. Bank A provides the alpha component, bank B provides the red component, bank C provides the green component, and bank D provides the blue component. Although four memory banks contain a single pixel's information, the banks can be logically mapped so the pixel can be accessed as a single long word.

Because only the red, green, and blue components are used to determine the pixel color, and each component is a single byte, the 32-bit RGB direct pixel format is sometimes referred to as a 24-bit RGB direct pixel format.

With twenty four bits defining the red, green, and blue color components, the 32-bit RGB direct pixel format allows the selection of one of 16,777,216 different pixel colors for each pixel on the screen. It also allows the selection of any one of 256 values for the alpha component.

Because the 32-bit RGB direct pixel format can describe a tremendous number of colors, it can display near photographic quality images on the screen. The only practical limitations on the number of colors on the screen are the number of pixels appearing on the screen and the amount of video memory present in the memory module.

In the 32-bit RGB direct pixel format, horizontal lines are arranged in ascending address order from the top to the bottom of the screen. The last bytes on a horizontal line may be adjacent to the beginning bytes (in each of their respective memory banks) for the next horizontal line.

The two shaded bytes would be adjacent in a memory bank, even though they are used for different horizontal lines of pixels.

The last byte on a horizontal line is not always adjacent to the beginning byte on the next lower horizontal line.

There may be fewer pixels displayed on a horizontal line in 32-bit RGB direct pixel format than the invention is capable of storing. In this event, the extra bytes are not displayed, but still contribute to the offset between adjacent horizontal lines in a memory bank.

CCC pixel formats are unique among the formats used by the invention. They represent small horizontal arrays of pixels (cells) rather than linear rows of single pixels.

In the 4-bit CCC direct pixel format, rectangular groups of sixteen pixels arranged four pixels wide by four pixels high are represented in a compact format using only 64 bits for the entire group, and therefore averaging four bits per pixel. The 4-bit CCC direct pixel format uses a pair of memory banks. The memory bank pair AB or the pair CD may be used in 4-bit CCC direct pixel format.

In the 4-bit CCC direct pixel format, adjacent bytes in a memory bank are used for different purposes. Groups of eight bytes represent both the pixel color values and cell maps for the sixteen pixels in a cell.

In the 4-bit CCC direct pixel format, the group of eight bytes is divided up into two larger groups of three bytes each and the two remaining bytes representing a cell map. The two larger groups each represent 24-bit pixel color values.

The first byte in each bank describes the red component, the second byte describes the green component, and the third byte describes the blue component. The remaining two bytes in each group are used to describe the cell map.

Each bit in the cell map is used to select either the first or the second 24-bit pixel color value. Within each cell, the individual bits of the top half and bottom half of the cell are assigned.

There are eight bits which refer to the pixels in the top half of a cell, and eight bits which refer to the bottom half of a cell. The state of each bit (0 or 1) determines which of the two pixel color values stored for that cell is to be used for the pixel. There are only two pixel color values for each group of 16 pixels in a cell so each pixel in a cell must be one of the two distinct pixel color values. However, every cell has its own set of two 24-bit pixel color values, so the total number of colors on the screen in 4-bit CCC direct pixel format is limited only by the number of cells used.

In 4-bit CCC direct pixel format, ascending addresses within a pair of banks refer to horizontally adjacent cells from left to right. Horizontal rows of cells are arranged in ascending address order from the top to the bottom of the screen. The last cell on a horizontal row of cells may be adjacent to the beginning cell for the next horizontal row of cells in the memory banks.

The two sets of eight bytes represented by the shaded cells would be adjacent in their respective memory banks, even though they are used for different horizontal rows of cells.

The last cell on a horizontal row of cells is not always adjacent in its respective memory bank to the beginning cell on the next lower horizontal row.

There may be fewer cells displayed on a horizontal row in 4-bit CCC direct pixel format than the invention is capable of storing. In this event, the extra cells are not displayed, but still contribute to the offset between adjacent horizontal lines of cells in their respective memory banks.

CCC pixel formats are unique among the formats used by the invention. They represent small horizontal arrays of pixels (cells) rather than linear rows of single pixels. The 6-bit CCC direct pixel format is also unique because it uses three specific memory banks to operate.

In the 6-bit CCC direct pixel format rectangular groups of sixteen pixels, arranged four pixels high by four pixels wide, are represented in a compact format using 12 bytes for the entire group averaging six bits per pixel. The 6-bit CCC direct pixel format uses memory banks B, C, and D.

In the 6-bit CCC direct pixel format, the group of 12 bytes is divided into three groups of four bytes each.

The 6-bit CCC direct pixel format is identical to the 2-bit CCC indirect pixel format repeated in the three memory banks B, C, and D. Each memory bank is used for one of the three components; red in memory bank B, green in memory bank C, and blue in memory bank D.

The 2-bit CCC indirect pixel format normally generates an eight bit index for each pixel. In the 6-bit CCC direct pixel format, three sets of these indexes are generated simultaneously. These three bytes are used as three direct color components in 6-bit CCC direct pixel format.

The first byte of each group of four bytes is used to store the color component for all the zeros in the cell map. The next byte is used to store the color component for all the ones in the cell map. The next two bytes are used for the cell map itself, one for the top and one for the bottom.

The CCC technique determines which of the two color components—each specified as eight bits of color component information—is chosen for each of the pixels in the cell. There are two indexes for each component (red, green, and blue) of each group of 16 pixels in a cell, so each pixel in a cell must be one of eight distinct pixel color values.

Each bit in the cell maps are used to select either the first or the second color component. The selected component is concatentated with the other two components to provide a 24-bit pixel color value. Within each cell, the individual bits of the top half and bottom half of the cell are assigned.

Eight bits refer to the pixels in the top half of a cell, and eight bits refer to the bottom half of a cell for each color component. The state of each bit (0 or 1) determines which of the two color component values stored for that cell is used for the pixel. The number of colors possible in a 6-bit CCC image is limited by the number of cells in the image.

Horizontally adjacent cells are specified by adjacent groups of four bytes within their respective memory banks and are mapped out. Ascending addresses within a bank refer to horizontally adjacent cells from left to right.

In 6-bit CCC indirect pixel format, horizontal rows of cells are arranged in ascending address order from the top to the bottom of the screen within their respective banks. The last cell on a horizontal row of cells may be adjacent to the beginning cell for the next horizontal row of cells in its respective memory bank.

The two sets of four bytes represented by the shaded cells would be adjacent in a memory bank, even though they are used for different horizontal rows of cells.

The last cell on a horizontal row of cells is not always adjacent to the beginning cell on the next lower horizontal row in a memory bank.

There may be fewer cells displayed on a horizontal row in 6-bit CCC indirect pixel format than the invention is capable of storing. In this event, the extra cells are not displayed, but still contribute to the offset between adjacent horizontal lines of cells in their respective memory banks.

In the 16-bit YCc direct pixel format, groups of two bytes in different memory banks are used to store the information necessary to describe a pair of pixels. The 16-bit YCc direct pixel format uses of a pair of memory banks. The memory bank pair AB or the pair CD may be used in 16-bit YCc direct pixel format.

In the 16-bit YCc direct pixel format, memory banks are arranged from front to back. Memory bank A or C is used for the front bank, and memory bank B or D (respectively) is used for the back bank.

In the 16-bit YCc direct pixel format, each group of four bytes describe independent "Y" luminance (or brightness) values of each of the two pixels and two "C" and "c" chrominance (or color difference) components used for both pixels. Bytes in the front memory bank is used to describe the luminance portion of pixels.

The luminance is specified as an 8 bit value. There are 256 possible luminance values at each pixel location. The "C" and "c" chrominance components are specified by bytes in the back memory bank. Each pair of horizontally adjacent pixels share the same "C" and "c" chrominance components.

Typically the chrominance components are specified as signed (two's complement) 8 bit values. These two values can represent color difference signals (such as R-Y and B-Y) or orthogonal chrominance coordinates (such as I and Q, or U and V).

The number of colors on the screen in 16-bit YCc direct pixel format is limited by the number of pixels on the screen. The first pixel of a pair may be any one of 16,777,216 pixel color values. Since every pair of pixels shares two of its three components, the second pixel in a pair may be one of 256 pixel color values. The set depends on the chrominance of the first pixel in the pair.

Changes in the luminance portion of an image are more noticeable than changes in the chrominance portions. The 16-bit YCc direct pixel format takes advantage of that fact. The 16-bit YCc direct pixel format therefore dedicates more information per pixel to store a more accurate description of the luminance portion of an image and less information per pixel to store a description of the chrominance portion of an image.

In the 16-bit YCc direct pixel format, horizontal lines are arranged in ascending address order from the top to the bottom of the screen. The last bytes on a horizontal line may be adjacent to the beginning bytes (in their respective memory banks) for the next horizontal line.

The two shaded bytes would be adjacent in a memory bank, even though they are used for different horizontal lines of pixels.

The last byte on a horizontal line is not always adjacent to the beginning byte on the next lower horizontal line.

There may be fewer pixels displayed on a horizontal line in 16-bit YCc direct pixel format than the invention is capable of storing. In this event, the extra bytes are not displayed, but still contribute to the offset between adjacent horizontal lines in a memory bank.

The invention's memory is independent of the Macintosh II (or other host) memory. Information about how to arrange the invention memory banks is provided for programmers needing to address video memory. The video memory configuration section of The invention controls memory bank arrangement as well as programmable masking and offsets.

The invention gives the Macintosh II great flexibility in addressing video memory banks. Memory banks may be arranged to conform to the 32-bit QuickDraw chunky data format as well as the chunky-planar data format.

Memory banks may be: arranged in patterns in two dimensions, concatenated vertically or horizontally, logically merged so that consecutively addressed bytes are in different memory banks, or logically interleaved so that consecutively addressed groups of bytes are in different memory banks.

The video memory configuration section of the invention maintains a programmable offset into the memory banks. This allows the logical location of any byte in the memory banks at any convenient address.

The video memory configuration section contains a write mask. The write mask protects individual video memory bits from alteration by the Macintosh II computer.

The video memory configuration section contains a write mask. The write mask protects individual video memory bits from alteration by the Macintosh II computer.

The video memory on the invention holds image data. The illustrated embodiment contains a full 32-bit wide memory, accessed through any addressing mode of a Macintosh II MC680x0 processor. This includes 8-bit byte, 16-bit word, 32-bit long word and bit field operations.

The start address for video memory is determined by which Macintosh II slot the invention uses. The invention uses a slot space dependent address form of $Fsxxxxxx. Video memory, regardless of the memory size, starts at an address in the form $Fs000000. In these addresses, "s" represents one of the possible NuBus slots in a Macintosh II computer.

Video memory proceeds in a linear ascending fashion from this address to the highest address representing installed video memory on the invention. The highest address used for video memory in the invention is in the form $Fs7FFFFF where "s" represents one of the possible NuBus slots in a Macintosh II computer. This address represents 8-MB of address space.

Note that these addresses are full 32-bit addresses. The programmer is responsible for setting and restoring the appropriate MMU mode in the Macintosh II.

A memory bank is a two dimensional array of bytes. The size of this array depends on how much memory is present on the memory module. A single memory bank array is 1024 bytes wide. The height of the array ranges from 512 rows to 8192 rows of bytes.

Multiple populated memory banks on the same memory module share the same array dimensions. The two memory banks on a 1 MB memory module (A and B) are always 512 rows high.

On the embodiments with at least 2 MB of memory, the four memory banks (A, B, C and D) have the same dimensions depending on the capacity of the memory module. For example, the 2 MB model features four memory banks, each 512 rows high. The 4 MB model features four memory banks, each 1024 rows high. The sizes of the memory banks on a memory module determine the height in rows of a memory bank.

The two memory banks on a 1 MB memory module may be logically arranged in one of four patterns. The memory banks may be concatenated vertically or horizontally. The two banks also may be interleaved or merged.

In all of these logical arrangements, bytes have ascending addresses from left to right with respect to a horizontal line of a video display. Rows of bytes are ordered from top to bottom with respect to the horizontal lines of a video display.

Within two vertically concatenated memory banks, bank A is positioned on top of bank B. In this arrangement the 1 MB memory module is logically configured to be 1024 bytes wide and 1024 rows in the vertical direction.

Ascending addresses first reference locations along the horizontal video lines in bank A, beginning with line 1 and proceeding to the last line in bank A. The next address points to the lines in bank B in the same way (the first line through the last line).

This logical arrangement is the easiest way to address data in any of the 1-bit, 2-bit, 4-bit, or 8-bit per pixel formats requiring up to 1024 pixels on a horizontal line.

The two memory banks may be concatenated horizontally. Bank A is to the left of bank B. In this arrangement the 1 MB memory module is configured to be logically 2048 bytes wide and 512 rows in the vertical direction.

Ascending addresses reference locations alternately between lines in bank A and respective lines in bank B (bank A line 1, bank B line 1, bank A line 2, bank B line 2, etc.).

This logical arrangement is the easiest way to address data in any of the 1-bit, 2-bit, 4-bit, or 8-bit per pixel formats requiring more than 1024 pixels on a horizontal line.

The two memory banks may be merged. When the memory banks are merged consecutive addresses alternate between the two memory banks starting with bank A. The least significant bit of the address is used to select bank A or bank B.

When merged, the two memory banks in the 1 MB memory module are logically configured to be 2048 bytes wide and 512 rows in the vertical direction.

This logical arrangement is the easiest way to address data in any of the 9-bit to 16-bit per pixel formats requiring up to 1024 pixels on a horizontal line.

The invention supports interleaving to support higher bandwidth displays. During interleaving the video memory uses half the information and supplies it twice as often. The video memory configuration section arranges the memory banks in the same display-logical manner. This arrangement allows the programmer to implement interleaving without additional effort.

When interleaving the two memory banks in the 1 MB memory module, consecutive groups of four addresses alternate from one memory bank to the second memory bank. Bank A is used for the first set of four ascending addresses, bank B for the next set of four addresses, bank A for the next set of four addresses, and so on.

When these two memory banks are interleaved, the 1 MB memory module appears to the Macintosh II computer to be 2048 bytes wide and 512 rows in the vertical direction.

This logical arrangement is the easiest way to address data in any of the 1-bit, 2-bit, 4-bit, or 8-bit per pixel formats requiring more than 1024 pixels on a horizontal line in the high bandwidth interleaved format.

An embodiment containing at least 2 Megabytes of memory will have that memory logically divided into four memory banks. These four memory banks may be arranged in one of nine logical patterns. The memory banks may be concatenated vertically and/or horizontally. They also may be interleaved or merged.

In all these logical arrangements, bytes have ascending addresses from left to right within a horizontal line. Rows of bytes are ordered from top to bottom.

The four memory banks may be concatenated vertically; A on B, B on C, and C on D. The memory module will then appear to the Macintosh II computer to be 1024 bytes wide.

Ascending addresses sequentially reference all locations in bank A, then bank B, and so on through banks C and D. The address for each bank's second line follows, and so on.

This logical arrangement is the easiest way to address data in any of the 1-bit, 2-bit, 4-bit, or 8-bit per pixel formats requiring up to 1024 pixels on a horizontal line and greater than 1024 rows of pixels in the vertical direction. This arrangement is also the easiest way to conform to the chunky-planar pixel format for 32-bit pixels.

The four memory banks may be concatenated horizontally: bank A being left of bank B, A and B left of C and bank D on the right. In this arrangement the memory module is configured logically to be 4096 bytes wide.

Ascending addresses reference a line per bank sequentially through the respective banks (line 1 in bank A, B, C and D; then line 2 in bank A, B, C and D; etc.).

This logical arrangement is the easiest way to address data in any of the 1-bit, 2-bit, 4-bit, or 8-bit per pixel formats requiring up to 4096 pixels on a horizontal line.

The four memory banks may be concatenated horizontally and vertically (two in each direction). In this arrangement, bank A is top left, bank B is top right, bank C is bottom left and bank D is bottom right. In this arrangement the memory module appears to the Macintosh II computer to be 2048 bytes wide.

Ascending addresses first reference locations alternately between lines in banks A and B, from the first line in bank A to the last line in bank B. The addresses then point to locations alternately between lines in banks C and D, from the first line in bank C to the last line in bank D.

This logical arrangement is the easiest way to address data in any of the 1, 2, 4, or 8-bit per pixel formats requiring more than 1024 pixels on a horizontal line and more than 512 rows of pixels in the vertical direction.

The four memory banks may be merged in three ways. When the memory banks are merged, consecutive addresses sequence between the memory banks. All four memory banks can be merged simultaneously. When merging pairs of memory banks, the pairs may be concatenated vertically or horizontally.

When the memory banks are vertically concatenated and merged, consecutive addresses alternate between bank A and bank B starting with bank A to the last line in bank B. After the last location in bank B, the next address refers to the first location in bank C. Consecutive addresses then alternate between bank C and bank D.

When the banks pairs are vertically concatenated and merged, the memory module is configured to be logically 2048 bytes wide.

This logical arrangement is the easiest way to address data in any of the 9 to 16-bit per pixel formats requiring up to 1024 pixels on a horizontal line.

When memory banks are concatenated horizontally and merged, consecutive addresses alternate between bank A and bank B starting with bank A. This alternation continues for the first line in each bank. After the last location for the first line in bank B, the next address points to the first location on the first line in bank C. Consecutive addresses then alternate between banks C and D to the end of the first line. The process repeats for all subsequent lines.

When the banks are horizontally concatenated and merged, the memory module is configured to be logically 4096 bytes wide.

This logical arrangement is the easiest way to address data in any of the 9 to 16-bit per pixel formats requiring more than 1024 pixels on a horizontal line.

When all four memory banks are merged simultaneously, consecutive addresses sequence from bank A, to B, to C, to D and back to bank A. This sequence continues throughout the memory banks. The least significant two bits of the address select the appropriate memory bank.

When four banks are merged the memory module appears to the Macintosh II computer to be 4096 bytes wide.

This logical arrangement is the easiest way to address data in the 32-bit per pixel format with up to 1024 pixels on a horizontal line.

The four memory banks may be interleaved in three different ways. When memory banks are interleaved, consecutive groups of addresses alternate from one memory bank to a second memory bank. Four memory banks allow two sets of interleaved banks: AB and CD. These interleaved banks may be vertically or horizontally concatenated or merged.

When two sets of interleaved banks are vertically concatenated, banks A and B are used alternately for sets of four ascending addresses until the last line of bank B. On the next line, bank C is used for the next set of four ascending addresses, bank D for the next set of four addresses, bank C for the next set of four addresses, and so on.

When the memory banks are vertically concatenated and interleaved, the memory module is configured to be logically 2048 bytes wide.

This logical arrangement is the easiest way to address data in any of the 1-bit, 2-bit, 4-bit or 8-bit pixel formats requiring more than 1024 pixels on a horizontal line in the high bandwidth interleaved format.

When the two sets of interleaved banks are horizontally concatenated, banks A and B are used alternately for sets of four ascending addresses until the end of the first line in bank B. On the same line, bank C is used for the next set of four ascending addresses, bank D for the next set of four addresses, bank C for the next set of four addresses, and so on until the end of the line. The next line starts again with bank A.

When the memory banks are horizontally concatenated and interleaved, the memory module is configured to be logically 4096 bytes wide.

This logical arrangement is the easiest way to address data in any of the 1-bit, 2-bit, 4-bit or 8-bit pixel formats requiring more than 2048 pixels on a horizontal line in the high bandwidth interleaved format.

When two sets of interleaved banks are merged consecutive addresses alternate between the two banks in a group. Sets of eight addresses alternate between bank pairs AB and CD. The least significant bit of the address selects the first or the second memory bank in the group. The first location on the first line is in bank A, the next in bank B, A, B, A, B, A, B, C, D, C, D, C, D, C, D, then back to bank A again.

When the memory banks are interleaved and merged the memory module is configured to be logically 2048 16-bit words wide.

This logical arrangement is the easiest way to address data in any of the 9 to 16-bit pixel formats in the high bandwidth interleaved format.

The video memory configuration section of the invention maintains two programmable offsets to the memory banks. A horizontal and a vertical offset are added automatically to any address in a video memory bank.

Address overflow, generated when the offsets are added, is ignored. If the address plus the horizontal offset is greater than the logical width of the memory module, the address wraps around to the beginning of the same line in video memory. If the address plus the vertical offset is greater than the logical height of the memory module, the address wraps around to the top of the video memory.

The offsets may be positive or negative. By carefully selecting the offsets, you may locate a byte in video memory at any address within the video memory address space. This offset capability allows you to use 32-bit QuickDraw to perform drawing operations in different areas of video memory using the same drawing code.

The video memory configuration section contains a bit level write mask. The write mask is a 32-bit value aligned with the lowest video memory address. It is logically repeated every four bytes throughout the video memory. The write mask is not affected by horizontal and vertical offsets.

Bits within the write mask are used to individually protect bit positions from alteration. Clearing the write mask enables all bit positions for modification or alteration. Setting any bit or combination of bits protects that bit position or combination of bit positions. The write mask does not effect read data operations.

This write mask is used only for write data operations initiated by the Macintosh II computer (or other NuBus master) and does not affect write data operations initiated by other sections within the invention. For example, an invention capture to video memory cannot mask bits with the write mask.

The video memory decoder takes data from video memory, the input module and the digital video ports and makes it available to the rest of The invention.

The video memory decoder drives two independent video data channels, Video Bus 1 and Video Bus 2. Video Bus 1 output contains three 8-bit component data buses. All three component buses use the same pixel decoding scheme to obtain any 8-bit component. This 24-bit channel is an internal pixel bus because together the components represent a single pixel.

The second video data channel output consists of four 8-bit component data buses. These four component buses are unrelated. The particular pixel decoding scheme used to obtain any one 8-bit component is independent of those used to generate the other three 8-bit components. This 32-bit channel is an internal component bus because the components on this channel may be completely independent of each other.

The video memory decoder retrieves a byte from each of the four memory banks in parallel. This occurs during the time each pixel is displayed on the screen. The video memory decoder translates these four bytes to video data for Video Bus 1 and Video Bus 2. Memory address models exist to illustrate the methods that software and hardware use to access data from memory. The invention has the capability of using a number of models.

For example, 32-Bit QuickDraw uses a chunky model to address each pixel in a single 32-bit long word. The invention also has this capability. Some image processing applications use a chunky-planar addressing model. The invention also supports chunky-planar memory addressing. This model uses separate planes for the alpha, red, green, and blue components (each plane is a contiguous area of memory). Each individual pixel has components from all four memory planes. Video memory concatenates the planes.

Banks are paired in a specific way for use in the decoder. There are only two valid memory bank pairs: AB and CD. A 16-bit bank of the same width and height as the original two 8-bit banks results when the banks are paired this way. The first named bank (A or C) supplies the most significant byte for the 16-bit pair.

The priority resolver is another novel aspect of the invention. It determines what video channel the invention displays. It makes this determination at every pixel on the screen. Every section of the video system can supply a video data channel (or reference a video data channel) for the priority resolver to use.

Video data channel display is determined as follows. A programmable priority level is assigned to all video channels. The video data channel with the highest priority at that pixel is displayed.

Two or more video channels may be programmed to have the same display priority level for the same pixel. When this happens, in accordance with the present invention, the system displays the video data channel with the highest implicit precedence.

If no video data channel is contending for a given pixel, a mechanism selects a default video data channel to be displayed.

Generally, video data channels are sources of video rate data. As illustrated these, sources include live digital data from the capture module, live digital data from a Digital Video Port, Video Bus 1 and Video Bus 2 from the video memory decoder, the output of either internal color look-up table, the output of the matrix multiplier array, and two independently programmable color constants, which are included as video data channels. These color constants supply the same value for every pixel. They may be used to set the screen or a region of the screen to a solid color.

The mechanisms used in the illustrated embodiments to supply priority levels to the priority resolver include: pixel controls, line controls, rectangle controls, the output of the range thresholder, the alpha bit in RGB555 modes, and hardware cursor selects.

The capture multiplexer stores video data in video RAM for display and computation. This video data can originate from a number of locations: the matrix multiplier array, Video Bus 2, the input module, the digital video port, a location selected by the priority resolver.

The capture multiplexer encodes data in a number of formats. It can pass pixels directly to video RAM, or encode the data in one of two compressed forms: YCc or RGB555. Additionally, the capture multiplexer can take a single component of the video data and store that component in any or all of the memory banks.

When capturing pixels directly to video RAM, the four memory banks in video RAM receive the four components of the selected video data without modification. When the selected video data is the priority resolver output, only the three color components are routed to video RAM. The alpha component is undefined.

In either case, the programmer may individually enable any or all of the memory banks to capture the data presented.

When either the RGB555 or YCc compressed formats are selected, the capture multiplexer encodes the pixel data in the appropriate format and supplies it to both valid memory bank pairs, AB and CD.

The programmer may individually enable any or all of the memory banks to capture this data. Generally, both memory banks in a single pair are enabled to record this information.

The RGB555 compressed format truncates each color component, discarding the least significant parts of the data. The truncated components are concatenated to produce an output value which is roughly two-thirds the size of the original pixel.

In YCc compressed format the luminance information (Y) of an image is likely to change faster than the color information (C and c). The YCc compressed format works in two modes. In both modes the incoming data is assumed to be in a YCc format which the matrix multiplier array generates.

The output is produced differently in the two modes. In the first mode the color does not change quickly. The Y information is recorded for every pixel, and the C and c information are recorded on alternate pixels.

In the second mode, the Y information is still recorded for every pixel. Relative to the first mode however, the color changes at a faster rate. Consequently, the C values and the c values are averaged independently over two pixels and are provided on alternate pixels.

The YCc format compression is comparable with the RGB555 format. The output data is roughly two-thirds the size of the input data.

When a single component is selected, the capture multiplexer makes that component available at all four memory banks. The programmer may individually enable any or all of the memory banks to capture this data. Enabling banks B, C, and D simultaneously has the effect of capturing the single component as if it were a monochrome gray scale image.

The clock control block synthesizes pixel, chroma and internal clocks for use throughout the invention. It can synthesize virtually any clock frequency between 20 MHz and 40 MHz, and spontaneously makes slight adjustments to compensate for irregular external clock inputs.

The pixel, chroma and reference clocks derive from a common voltage controlled oscillator (VCO) circuit. The clock control block has a selection mechanism that chooses the input reference clock. This clock may be the onboard 40 MHz crystal oscillator clock or the external clock input. This flexibility allows the use of an external custom clock frequency.

Additionally, the invention provides for a selection mechanism that chooses between the reference clock and an external horizontal clock input. This mechanism fine tunes the clock phases on a line-by-line basis using a phase locked loop (PLL). The invention uses this selection mechanism to synchronize quickly to a slightly varying video input signal. For example, VTR transport mechanisms create irregularities in tape-to-head speed which cause time-based errors from one horizontal line to the next. The invention can synchronize quickly to these timing errors.

The illustrated reference clock frequency is 40.000 MHz. The video timing circuits in a divider mode uses this clock to lock the pixel clock to a particular frequency.

A VCO circuit has a frequency output range of 20–40 MHz. This clock and the reference clock can be programmed to divide its frequency by some integer factor. The two low frequency pulses are passed optionally through a divide-by-two circuit to present a PLL with two square waves. This PLL, external to the ASICs, locks the two square waves together by fine tuning the VCO frequency. When the video timing is genlocked by the invention the PLL locks to half the incoming horizontal frequency as being derived from a composite sync input.

The absolute timing block generates horizontal and vertical video signals. Horizontal synchronization signals tell the display monitor when to stop drawing a line and begin drawing a new line. Vertical sync signals tell the display monitor when to stop drawing the current frame or field and start drawing the next one.

The absolute timing block allows almost infinite variations for horizontal and vertical video signal timing. With the proper programming the invention uses this block to control a variety of display monitor formats. Output to interlaced and non-interlaced displays of most resolutions can be accomplished under program control.

The absolute timing block also can synchronize with externally generated horizontal and vertical video signals. This capability, known as genlocking, tracks minor variations in video signals fed to the input of the system of the present invention. Genlocking allows the system of present invention to mimic the timing specifications of another video signal without the need to program the precise values into the system of the present invention.

The absolute timing block can generate interrupts to the Macintosh II computer on every frame, field or line. The exact pixel location of the interrupts is under programmable control.

The absolute timing block, along with the capture multiplexer, coordinates video data capturing to the video memory banks. It also can track an optional light pen pointing device and generate an interrupt when the pen senses a portion of the display.

The absolute timing section accepts and generates sync signals for video. Registers control video timing and genlocking. Video timing is generated by a video timing sequencer.

The absolute timing section maintains two internal counters. One counts in pixel times and references locations along a horizontal line. The other counts in half line intervals and references locations within a video frame.

The video timing sequencer has a horizontal section and a vertical section. The VSC ASIC has a small storage block devoted to each section. This storage block holds commands that are executed at specific times during a video line (horizontal) or a video frame (vertical).

Up to two horizontal commands may be executed per pixel time. Up to two vertical commands may be executed per half line interval.

The video timing sequencer maintains two pointers, one into the horizontal command table and one into the vertical command table. These pointers indicate the next command pair to be executed. A counter activation value is associated with each command pair.

The video timing sequencer compares the counter activation value (from the horizontal command table) with the absolute timing horizontal counter for each pixel. When these two values match, the commands (from the horizontal command table) are executed. Then the pointer is advanced to the next command pair in the horizontal command table and the process is repeated. When the final command pair in the table is executed, the pointer is reset to the beginning of the command table.

Similarly, the video timing sequencer compares the counter activation value (from the vertical command table) with the absolute timing vertical counter for each half line. When the two values match, the commands are executed. The pointer increments through each command pair within the vertical command table until the final command pair is executed. Then the pointer is reset to the beginning of the vertical command table.

The horizontal sequencer stores a maximum of 25 command pairs. The vertical sequencer stores a maximum of 21 command pairs. Sequencer storage is accessed through an I/O port mechanism.

Note that changing any commands or activation values in the video timing sequencer temporarily disrupts the display.

The horizontal section also is responsible for generating the appropriate transfer and configuration cycles for the video memory. This includes transfer cycles for display and the line control section.

| Horizontal Sequencer Commands | | |
|---|---|---|
| ID | Command | Class |
| 0 | End Horizontal Blanking | Synchronization |
| 1 | Start Horizontal Sync (Start EqI & SerrI) | Synchronization |
| 2 | Half Line Point (Start EquII & SerrII) | Synchronization |
| 3 | Start Horizontal Blanking | Synchronization |
| 4 | End Horizontal Synchronization | Synchronization |
| 5 | End Horizontal Equalizations I & II | Synchronization |
| 6 | End Horizontal Serrations I & II | Synchronization |
| 7 | Start A/D Reference Clamping | Genlock |
| 8 | End A/D Reference Clamping | Genlock |
| 9 | Transfer Cycle Read | Video RAM Management |
| 10 | Transfer Cycle Write | Video RAM Management |
| 11 | Transfer Cycle Write Setup | Video RAM Management |
| 12 | Start Pre-Scan Commands | Video RAM Management |
| 13 | Start Active Scan Commands | Video RAM Management |
| 14 | Preload Internal Display Pipeline | Video RAM Management |
| 15 | Start Horizontal Lock Window | Genlock |
| 16 | End Horizontal Lock Window | Genlock |
| 17 | Start Horizontal Sync Gate | Genlock |
| 18 | End Horizontal Sync Gate | Genlock |
| 19 | Sample Point I | Genlock |
| 20 | Sample Point II | Genlock |
| 21 | Fill in Missing Horizontal Sync | Genlock |
| 22 | Horizontal Lock Value Pulse | Genlock |
| 23 | Function Counter Reset (look ahead reset) | Synchronization |

| Vertical Sequencer Commands | | | |
|---|---|---|---|
| ID | Command | Field | Class |
| 0 | End Vertical Blanking | Even | Synchronization |
| 1 | End Vertical Blanking | Odd | Synchronization |
| 2 | Start Vertical Synchronization | Even | Synchronization |
| 3 | Start Vertical Synchronization | Odd | Synchronization |
| 4 | Start Vertical Blanking | Both | Synchronization |
| 5 | End Vertical Synchronization | Both | Synchronization |
| 6 | Start Equalization I & II | Both | Synchronization |
| 7 | End Equalization I & II | Both | Synchronization |
| 8 | Start Vertical Lock Window | Both | Genlock |
| 9 | End Vertical Lock Window | Both | Genlock |
| 10 | Start Horizontal Search | Both | Genlock |
| 11 | End Horizontal Search | Both | Genlock |
| 12 | Start Gate Missing Syncs (Fill In) | Both | Genlock |
| 13 | End Gate Missing Syncs | Both | Genlock |

There are three types of video timing sequencer commands: synchronization, genlock and video RAM management. Synchronization commands control the sync state of the invention independently of an external synchronization source. Genlock commands allow the invention to conform, in real time, to a varying input sync signal. Video RAM management commands are overhead by the video timing sequencer that allows other sections of the invention to operate correctly.

Synchronization commands define one of four states for horizontal and vertical timing. Each state has an active period, a blanking period and a synchronization period.

Note that the invention defines the beginning of the currently active video line as the start of the active video line. Usually the beginning of a line is referenced to horizontal sync. The invention defines the beginning of the active video frame as the first active video line. Usually the beginning of a frame is referenced to vertical sync.

Horizontal video signals cycle through a sequence of states: an active video period, a blanking period, a synchronization period, another blanking period, and back to active video. The first blanking period is the front porch. The second blanking period is the back porch. The entire interval is a video line.

In the vertical direction, non-interlaced video signals cycle through a series of states: a period of active video lines (each horizontal line cycles as described above), a blanking period, a sync period, another blanking period, and back to the next set of active lines. In interlaced video one of these intervals is a field, two is a frame. In non-interlaced video a frame and a field are the same interval.

Interlaced video signals in the vertical direction are more complicated than non-interlaced signals. The non-interlaced vertical sequence repeats twice and uses a number of half video lines for each field. The first field contains all the even-numbered video line information and is called the even field. The next field is the odd field and contains all of the information for odd-numbered video lines. Each field requires a separate set of sequencer commands.

Together the two interlaced fields comprise a video frame. Because the number of video lines is a non-integer, a correction signal comprised of equalization and serration pulses is generated during vertical blanking.

Genlock commands allow the invention to synchronize to an external sync source. Distortion is commonplace in many video sources, so the genlock commands allow the invention to genlock to "sloppy" video sync sources.

The system of the present invention achieves horizontal lock in two ways. Sync-lock picks up the incoming sync signal and resets the horizontal counters and horizontal timing section in the video timing sequencer for every line. Sync-lock always horizontally locks even when the input sync frequency has wide variation or excessive noise. VTRs commonly have short term variation in the horizontal frequency.

In the sync-lock mode, the system begins in a search mode for horizontal lock. The leading edge on incoming horizontal sync is a reference edge. This edge resets the absolute timing horizontal counter by loading a horizontal lock value (or starting value) into the counter. The horizontal section of the video timing sequencer is reset to a programmable point at this reference edge.

Note that incoming and outgoing video have a programmable timing relationship because the counter is reloaded rather than cleared at the reference edge.

At this point in time the system is horizontally locked. Once reset, the system automatically follows the programmed horizontal timing sequence until the command for Start Horizontal Lock Window is executed. Then, the system begins to search for the leading edge of horizontal sync. The system loses horizontal lock when the command for End Horizontal Lock Window is executed before the next edge occurs.

The system advances a counter when it loses horizontal lock. When this counter passes a programmable threshold, the invention reverts to search mode regardless of the Start and End Horizontal Lock Window commands. The counter is reset to achieve horizontal lock.

Because equalization and serration pulses can trigger sync-lock, the invention contains a special gate circuit that removes these pulses from the input sync source before it passes into the genlock circuitry. Videos timing sequencer commands turn this gate on and off at programmable points along a horizontal line.

Phase-lock tunes the system clock circuitry to a frequency related to the incoming horizontal sync. Phase-lock produces a higher quality lock to an incoming sync source, however, the source must initially be stable. Phase-lock can also "ride over" missing or late horizontal sync pulses as well as equalization and serration pulses.

Vertical lock samples the sync signal twice within a horizontal line. When the system detects the start of vertical sync it resets the absolute timing vertical counter by loading a vertical lock value (or starting value) into the counter. The system also resets the video timing sequencer vertical section to a programmable point.

If the system loses vertical lock, it advances a counter on each frame that was not synchronized. When this counter passes a programmable threshold, the invention reverts to search mode regardless of the Start and End Vertical Lock Window commands. This counter is reset to achieve vertical lock.

The vertical genlock commands include two commands that initiate horizontal search mode. This compensates for equalization periods in an interlaced signal. This prepares the invention for horizontal sync regardless of its position on a horizontal line.

The A/D reference level is genlocked at each horizontal line. It is set during the horizontal back porch or breezeway of the video signal. This level serves as a reference level for the input module A/D converters.

Video RAM management commands are processing time on every horizontal line. The invention features dual ported video RAM devices. These devices contain a serial queue through which video data is shifted in or out. They also contain a random access port though which the host Macintosh II may access this same data.

To maintain a display the serial queue must be loaded before the active video line begins. The video timing sequencer uses video RAM management commands to perform this function. The serial queue is loaded during horizontal sync. Once the data is placed in the serial queue, a preload command is executed to start the data shifting through the display pipeline.

Similarly, selected operations must be performed at predefined points within a horizontal line to enable image capture. There are additional commands that initialize and start the line control section for each horizontal line.

The relative timing section, a key element within the invention, controls the video memory banks used in generating a display, and coordinates them for capturing video data.

The relative timing section can arrange the four memory banks within the invention in over 20 ways. Memory banks can concatenate horizontally and vertically, and can overlay each other. Overlaying yields an area in display memory the same size as the original memory banks but has two to four times the information per pixel as a single memory bank.

The relative timing section uses a special address translator. Transparent to the programmer, the translator automatically remaps the provided addresses to new addresses.

Note that the relative timing section does not remap addresses provided by the Macintosh II. Such addresses are remapped by the video memory configuration, which is independent of the relative timing section. For more information, see the Video Memory Configuration portion of this disclosure.

The relative timing section processes the absolute timing shift clocks and video memory bank address generation. This allows for panning, zooming, and mosaic functions. This section also coordinates the operation of the invention when capturing live video.

Memory banks A, B, C, and D can be merged and concatenated in various ways. Particular configurations define the zooming, panning, and mosaicing dependencies of the different memory banks.

The configuration EEPROM contains the firmware that must be included on cards that communicate with Macintosh II computers through the NuBus protocol. The firmware is stored on the card referred to as the card's declaration ROM. In the illustrated embodiment, an electrically erasable programmable read only memory (EEPROM) is used in place of a read only memory (ROM).

The firmware on the invention contains software routines to change video modes, set colors and a number of other operations.

The configuration EEPROM works like a ROM. It provides a non-volatile, read only block of memory. This memory allows the Macintosh II computer to read program code and data at system startup time, before any software is loaded from disk.

The present invention's "declaration ROM" is unique because, in conjunction with a novel methodology (or protocol) under special software control, this device may be erased and then reprogrammed. This allows the firmware contained on the invention to be updated to accommodate newer Macintosh computers and protocols, without having to return it to a service depot for the update. Updates from Intelligent Resources will automatically reprogram this EEPROM.

The Macintosh II slot the system's board occupies determines the start address for the configuration EEPROM. The EEPROM addressing starts at an address in the form $FsFF8000, where "s" represents a slot number in the Macintosh II computer.

The EEPROM occupies the address space from this address to $FsFFFFFF, where "s" represents a slot number in the Macintosh II computer. The EEPROM is a full 32-bit wide memory that is accessed using any addressing modes of the MC680×0. These modes include byte, word, long word, and bit field operations.

NuBus, a microcomputer expansion standard, is used in the Macintosh II computers. With NuBus, the system of the present invention communicates with the Macintosh II computer.

The NuBus interface is a subsystem of the present invention that is virtually invisible to the applications programmer. It implements a shadow memory and provides a security code.

The shadow memory uses read/write capabilities on write-only registers within the system of the present invention. The security mechanism protects critical timing registers within the system of the present invention.

Programmers can modify a great number of internal registers in The invention. Because almost all of these registers are internally write-only registers, the programmer cannot read data back from them to find their current values (status registers are the exception). To avoid this problem, the shadow memory maintains a copy of the last data programmed into each register.

The security code mechanism prevents alteration of critical timing registers except under very controlled conditions. There is generally no need for a programmer to even be aware of this security mechanism.

The system of the present invention is so flexible in its timing that it can interface to virtually any display monitor. Unfortunately, most display monitors are much more intolerant of timing variations. In fact, it is possible to physically damage some display monitors by driving them with timing parameters just a few percent off their expected values.

In accordance with another novel aspect of the invention, the system provides for input and output add-on modules. One of the system's connectors accepts input modules. One such module is an analog input module that converts the analog video signals into digital values at a programmable rate. It has a connector that attaches from an external video source cable.

Professional analog video formats frequently contain three components in the video signal. RGB is the most common of the component formats, where each signal represents a primary color; either red, green, or blue. The analog input module provides three input channels; one each for up to three simultaneous video component inputs.

Other professional video formats use one of the three components to represent the luminance (intensity or brightness) of the video. The other two components represent the color of the signal. YIQ and YUV are two examples of such formats.

Regardless of the encoding scheme used, the analog input module samples all three signals and converts each of them into a number. The analog input module also features an input for a light pen. A light pen is a pointing device that locates a position on the monitor. Inputs related to the light pen also support a light pen trigger or switch that the system of the present invention can sense.

The analog input module continuously samples a varying analog signal. At programmable intervals (called sampling points), it outputs numerical values proportional to the analog signal at that instant.

The system of the present invention can communicate with an attached input module. Each input module is identified by a unique number. This number conveys the card type, its maximum sampling rate, the range of the analog to digital converters.

The analog input module is designated by the number $00000001. This indicates a maximum 20 MHz sample rate RGB 8-bit per color component input module with light pen and trigger inputs.

The system of the present invention provides a video bus. It has a connector supporting two bi-directional 32-bit video data streams. The connector couples to two digital video ports for interfacing the system of the present invention hardware to each data stream. Using these ports the system may output data, and accept data from another digital video source or exchange data with another system card.

Each port can function as an independent input or output. A master clock signal syncronizes any number of the system cards connected together by these ports. A resident program causes one system card to generate the master clock signal and all the other the system cards lock to this clock.

The digital video ports can transfer pixel or control data between system cards and can transfer individual pieces of data to other connected devices that can not communicate otherwise.

As discussed above, the system of the present invention also has a connector for an input module. This connector is essentially an input-only digital video port with limited communications capabilities. Its primarily function is to supply data from an analog-to-digital or digital-to-digital converter module attached to the system of the present invention.

The system of the present invention is primarily a digital device. Displaying or recording an image usually requires analog video signals. The system uses the RAMDAC to perform high speed digital-to-analog conversion. The RAMDAC's functions are usually transparent to the programmer.

The RAMDAC performs other functions beyond digital-to-analog conversion. Under program control it can automatically perform gamma correction on the video signal. Gamma correction compensates for some of the non-linear signal responses of display devices.

The programmable RAMDAC can operate as an external color look-up table similar to the internal color look-up tables. However, the RAMDAC cannot perform CLUT operations and gamma correction functions at the same time.

One example of a RAMDAC is a Brooktree Bt473 RAMDAC. This device can simultaneously convert three independent digital channels to analog waveforms. In the invention these channels represent primary color components of a video signal, typically red, green and blue.

In bypass mode, the RAMDAC simply converts the digital bit stream to an analog signal; ignoring the RAMDAC color tables. The color values supplied to the RAMDAC are that output from the final the invention functional block.

Digital-to-analog conversion is the simplest function performed by the RAMDAC and cannot be disabled by software. However, there are aspects of the conversion that are under software control. These aspects regard intricate details of the video signal that are not a concern to most programmers.

The system of the present invention can be programmed to provide a video blanking pedestal or to turn it off. The pedestal is 7.5 IRE. This describes a signal level difference between blanking and black levels.

Output sync signals may be generated on all three color components and are available as a separate TTL output. The TTL output may be composite or horizontal timing.

Pins 3, 4 and 5 of the invention's output connector are respectively, the red, green and blue outputs. Pin 7 is the TTL sync output which may be composite or horizontal sync. Pin 9 is a TTL output for vertical sync. Typically, pin 9 is not used if pin 7 is set to composite sync. Pins 7 and 9 are used for equipment that requires separate sync signals.

Gamma correction solves problems inherent in image display devices with a non-linear signal response. At low signal levels there is very little difference between color values. At higher levels the difference is more pronounced. Gamma correction attempts to correct this problem by slightly amplifying low level signals and attenuating high level signals. Images look more natural with the proper gamma correction; e.g., Dark areas do not look as "muddy".

The invention's RAMDAC can complete gamma correction on each color component individually. A separate table of values remaps each component to a new value. These tables operate similarly to three color look-up tables. How to use these tables for color look-up is described hereinafter.

Other of the invention color look-up tables can use more video channels as indexes into the tables than can the RAMDAC. Consequently, the RAMDAC typically uses the tables in the gamma correction mode.

Note that the RAMDAC cannot operate in gamma correction and color look-up modes at the same time, because both modes use the same tables. However, the RAMDAC can be operated in CLUT mode with pre-computed gamma corrected CLUTs.

Each of the three components provides an index into its own table. The digital-to-analog converters use this value to access components separately. Using this technique, the RAMDAC can color-correct or apply transformation effects to each color component of any display generated by the invention.

The color look-up operation uses each color component as an index into three different color tables simultaneously. The values from the three tables specify the color to be passed to the digital-to-analog converters.

The RAMDAC accepts three color components from the system of the present invention. A selection mechanism determines which color component is used as the index into all three tables. The RAMDAC ignores the other two color components when using its tables.

Note that the RAMDAC cannot operate in gamma correction and color look-up modes at the same time because both modes use the same tables. However, the RAMDAC can be operated in CLUT mode with pre-computed gamma corrected CLUTs.

The RAMDAC color look-up tables as illustrated, currently support 8-bit color components. However, in accordance with the present invention the color components may be specified with more or less precision. Programs that assume the tables have 8-bit components will not run if the components are changed to another configuration. For example, a program that assumes the tables have an 8-bit component will not run when the components are changed to a 10-bit component.

Other color look-up tables of the system can use more video channels as indexes into the tables than can the RAMDAC. Consequently, the RAMDAC typically uses the tables in the gamma correction mode.

The RAMDAC supports a mode of operation known as cover overlay. A small number of dedicated color registers may be preset to an arbitrary color. The programmer may select one of these registers to act as a source to the digital to analog converters. This results in the color in from the specified register being used throughout the display, effectively covering or overlaying any other display.

This mode bypasses the color tables altogether; it is most useful for a simple blanking or graying the screen without disturbing any other programmed video effects.

The system of the present invention features high speed multipliers. These multipliers are arranged in different patterns to accomplish different tasks. As illustrated, each multiplier is a signed 9 by 9 multiplier array. Individually, the multipliers are designed to multiply two numbers together very quickly. One number usually represents a blending or mixing constant and the other number usually represents a component of live or stored video information.

Multiplication is accomplished many times faster in the invention multipliers than in the Macintosh II computer. The invention multipliers perform a multiplication in the time it takes a single pixel to be shown on the screen, sometimes even faster.

The matrix multiplier array performs one of four major tasks at a time: it can accomplish a programmable blend of up to two or three video channels, it can perform a matrix transformation on video data, it can execute a spatial filtering operation on stored video data, it can perform frame averaging (temporal filtering) on an incoming static video signal.

Under certain circumstances it can accomplish a blend operation and a transform operation, in either order, in the time it takes a single pixel to be shown on the screen.

When the system of the present invention performs a programmable blend, it is taking two or three different video channels and mixing them together. Because this blending is accomplished inside the system of the present invention, it is a precise digital blend, rather than an imprecise analog mix.

When the system of the present invention is performing a matrix transformation, it dissects the color components of a video channel and uses them and the math capability of the multipliers to derive new color components. These new components are linearly related to the original components. This allows the system of the present invention to perform a conversion between multiple color systems or signal systems.

The system of the present invention uses the multiplier array to accomplish a spatial filtering operation on video information. Spatial filtering establishes a new color and intensity for each pixel on the screen based on its original color and intensity, and the color and intensity of the pixels in reasonably close proximity to the original pixel. The time required to filter an image is directly related to the area that is defined as being in "close proximity".

The system of the present invention accomplishes temporal filtering or frame averaging as a variant of the spatial filtering operation. Frame averaging establishes a new color and intensity for each pixel on the screen. This is based on the average of the original color and intensity and the color and intensity of a pixel located in the same position on the next video frame. Filtering techniques limit or reduce the amount of signal noise in a video image.

The matrix multiplier block blends multiple video channels under programmable control. Up to three different video data channels may be supplied to the matrix multipliers. A programmable amount of each signal is summed together with the other signals. The result is output from the matrix multiplier for use throughout the system of the present invention.

The inputs and outputs of the multiplier array within the multiplier block are commonly named for the type of pixel component for which they are used. When the video channels are supplying red, green, and blue components the multipliers blend in RGB color space (see the Pixel Formats in Video Memory portion of this disclosure for more information on RGB). The three inputs and outputs of the multipliers are the red, green and blue inputs and outputs. When the video channels are supplying YCc components the multipliers blend in YCc color space with the three inputs being Y, C, and c. The outputs are blended Y, C, and c outputs.

The multiplier array accomplishes the blending on a component-by-component basis for each of the three input video channels. The following discussion of programmable blending uses the RGB color space as an example:

The R component output is the sum of the first video input channel's red component multiplied by a blend constant, the second video input channel's red component multiplied by another blend constant, and the third video input channel's red component multiplied by a third blend constant.

The G component output is the sum of the first video input channel's green component multiplied by a fourth blend constant, the second video input channel's green component multiplied by its blend constant, and the third video input channel's green component multiplied by its blend constant.

The B component output is the sum of the first video input channel's blue component multiplied by its blend constant, the second video input channel's blue component multiplied by its blend constant, and the third video input channel's blue component multiplied by its blend constant.

If the first video input channel's red, green and blue blend constants are programmed to the same value, all the components of the first channel input to the matrix multipliers are blended by the same amount. The three blend constants for each video channel are typically set to the same value. This accomplishes a linear blend of up to three video channels.

This is not a limitation of the matrix multiplier array. All three blending constants for each video channel may be set to different values. The result is a blend of three video channels, although the three color components will have different mixing ratios. The red components will have a mixing ratio independent of the green and blue mixing ratios.

Users may select blend constants so that they add up to 100% for all three video channels for that component. For example, if the first red blend constant is 50% and the second is 20%, the third red blend constant is programmed to 30%. The same rule applies to the green and blue blend constants. The same considerations apply when only two video channels are blended. The blend constants for the third video channel are set to 0%.

The blend constants may be selected so that they do not have to add up to 100% for any or all components. For example, if one video channel is a very dark image, the blend constants for that channel are made larger to increase the brightness value and, therefore, increase the contribution of that channel for blending. The result is a blend constant's sum greater than 100%.

Note that if the blend constants are set too high, it is possible for the matrix multipliers to achieve numerical overflow. To avoid this overflow, be sure that the blend constants add up to 100% or less. The visual result of overflow is undefined but generally appears as unusual colors. In a preferred embodiment, an overflow-and-underflow protection subsystem is additionally provided, to substitute predefined limit values for overflow and underflow (as is described elsewhere within the disclosure).

Similarly, to blend a very bright image with a darker image to produce a dark image, reduce the blend constants for the bright image. In this case, the sum of the blend constants is less than 100%. In this way, a single video channel can be amplified or attenuated by setting its three blend constants appropriately and setting the remaining unused blend constants to 0%.

Blend "constants" are typically programmable values within the matrix multiplier array. However, they may originate from within the pixel or line control sections.

This capability allows programmable blending of multiple sources on a line-by-line or pixel-by-pixel basis.

The equations for programmable blending are indicated in the table below.

Transformation and blending modes use and order coefficients differently.

Overflow will again occur when the sum of any set of video multiple components is greater than 100% (e.g. $|K1+K2+K3| \leq 1$, $|K4+K5+K6| \leq 1$, and $|K7+K8+K9| \leq 1$) The overflow and underflow protection subsystem provides a safety guard against overflow in the event that the user exceeds limits.

The matrix multiplier array has two sets of constants registers. In blending mode, the first set is used for even-numbered pixels and the second set is used for odd-numbered pixels. The multiplier constants for both sets should be set to the same values for normal operation.

This example shows a blend in RGB color space. The multipliers can blend in any color space. Simply replace the R, G, and B components with the components in your color space (for example, y, C and c).

Fading is a subset function of blending, where the blending constants are a function of time. If one constant increases with time while the other decreases, the first video channel will fade in while the second video channel dissolves away.

This capability is used for fading between two or even three video channels. Examples include fading a ghost image over another or imposing subliminal messages onto a video signal. Fading is not directly handled by the invention hardware; an application must periodically change the blending constants in the matrix multiplier array to produce the fading effect.

The matrix multiplier block accomplishes a $3\times 3$ matrix transform on one video pixel vector to produce another. In matrix transformation mode, all three multiplier inputs are set to the same input channel.

The inputs and outputs to the multiplier array are 8-bit pixel components. They are referred to by the kind of values they typically carry. In a transformation from RGB to YCc the three input video channels are named the red, green and blue inputs. The three output video channels are named the Y, C and c outputs. In a YCc to RGB transformation, the inputs are called the Y, C, and c inputs and the outputs are called the red, green and blue outputs.

The following discussion of the matrix transformation mode uses the conversion from RGB to YCc color space as an example.

Because all three multiplier inputs are typically set to the same video channel in matrix transformation mode, the outputs of the multiplier array are usually derived as follows:

The Y component output is the sum of the input's red component multiplied by a blend constant, the input's green component multiplied by another blend constant, and the input's blue component multiplied by a third blend constant.

The C component output is the sum of the input's red component multiplied by a fourth blend constant, the input's green component multiplied by its blend constant, and the input's blue component multiplied by its blend constant.

The c component output is the sum of the input's red component multiplied by its blend constant, the input's green component multiplied by its blend constant, and the input's blue component multiplied by its blend constant.

When the three video channel inputs to the matrix multiplier array are not set to the same video channel, the transformation mode becomes a blending mode. The difference between transformation mode and blending mode is the order in which the constants are used.

Matrix transformations are used to: convert a YCc image to an RGB image, convert RGB input to YCc, and rotate the color axis of the RGB or YCc vector to RGB, or YCc' vector.

Transforming YCc to RGB allows the system of the present invention card to be used with a component video system input whose native signal format is YCc (for example, YIQ or YUV). Once converted to RGB, any additional video signal processing inside the system of the present invention is done in RGB color space. The results may be displayed on a standard RGB monitor.

For example, NTSC (National Television Standards Committee) color television specifies colors in the YIQ color space. Y corresponds to the luminance or brightness. It is the Y component which is displayed on a black-and-white television. The I and Q coordinates determine the hue and saturation. The invention's multiplier array performs a transformation from YIQ to RGB in real time for each pixel. Clearly, the nine multipliers for each pixel requires a significant amount of processor time if an image is converted from YIQ to RGB in software.

Transforming RGB to YCc is required for a series of special effects including keying on the luminance or chrominance components of a video signal. Once the signal is converted to a luminance (Y) and chrominance (Cc) format, the thresholders of the system of the present invention can be used to select specific color ranges to replace or key.

For example, an effect where the entire display is black and white except for some uniquely colored object can be accomplished in real time. To do this the input display components are transformed into YCc format and the thresholders select between the transformed video components and the original components based on the values of the transformed video components. The effects that could only be produced using a blue background, the invention can accomplish using any color background that does not occur in the foreground object(s).

Rotating a YCc vector around the color axis produces a tint change throughout an image. This capability of the multipliers allows for color correction of a video signal.

Note that if the blend constants are set too high, it is possible for the matrix multipliers to achieve numerical overflow. To avoid this overflow, the blend constants should add up to 100% or less. The visual result of overflow is undefined but generally appears as unusual colors.

This is not a true transformation. It is a blend between three video channels. Overflow can occur unless $|K1+K2+K3| \leq 1$, $|K4+K5+K6| \leq 1$, and $|K7+K8+K9| \leq 1$ to prevent the possibility of overflow. Note that the ordering of the coefficients is different than the ordering used in the normal blending mode.

The matrix multiplier array has two sets of constants registers. In transformation mode, the first set is used for even-numbered pixels and the second set is used for odd-numbered pixels. The multiplier constants for both sets should be set to the same values for normal operation.

Frame averaging is a multiple filtering operation that uses live video as the input to the filtering operation and stores the results in RAM banks.

Frame averaging can be used to reduce noise in an image. It takes the average value at a pixel location over a series of sequential frames and produces an average pixel value for that location.

In 16-bit frame averaging mode, a series of 8-bit external input images are summed on a pixel-by-pixel basis into a 16-bit memory bank pair. Under normal operation, this mode is enabled for 256 frames only because the 16-bit memory bank pair cannot detect numeric overflow.

This mode requires the use of four memory banks simultaneously. Two memory banks hold the previous sum input. The second two banks are the destination for the new sum output. Memory bank pairs AB and CD are used. Since all four memory banks are used for sum values in this mode, the invention must collect data from an externally generated channel. This data can originate from Live A/D or one of the digital video ports.

To perform frame averaging, the three multiplier inputs should be set to the same channel or source, and constants are loaded into the multiplier array just like a transformation. Typically one loads the constants to convert from RGB to YCc.

In frame averaging mode, the upper output component of the multipliers (the Y component in YCc) is used in subsequent computation; the other two output components are discarded.

This upper (Y) component is then summed with the partial sum input from a memory bank pair; the sum is then output from the multipliers and is typically written to memory using the capture multiplexer mechanism. This partial sum output is then used as the partial sum input for the next pass. 64 frames later the partial sum output memory banks hold a 16-bit value per pixel; the most significant byte (in memory bank A or C) holds the frame averaged value for the pixel.

The least significant byte (in memory bank B or D) holds a value where the upper seven bits of this byte represent the least significant portion of the repeated sums from the averaging operation, and the least-significant bit is zero.

Actually, one can perform a number of different frame averaging operations, varying the number of frames. The coefficients normally used for transformations produce results correct for 64 frames. The values typically used for coefficients for the RGB to YCc transformation are {0.299, 0.587, 0.114}. Multiplying these values by 6.4 yields {1.914, 3.757, 0.730}.

The result of using these coefficients is to produce multiplier outputs 6.4 times as big as originally, yielding a frame averaging time of 64 frames/6.4 = 10 frames. Similarly, scaling the constants down by some ratio allows for a longer frame averaging time.

There is a practical limit to the largest number of frames that can be frame averaged. Beyond 100 to 128 frames, the individual contribution of a single frame starts to have its data truncated, causing a loss of information. The useable range is about 10 to 100 frames.

Filtering computes a new value for each pixel based on its old value and the values of pixels around it. Filtering requires that all three inputs to the multipliers be set to the same channel, typically Video Bus 1 or Video Bus 2. Filtering is typically a non-real-time, multiple frame operation.

Usually a live video channel is not selected for filtering because filtering can take several frames to complete. However, you can produce interesting results by using a live video channel for filtering.

Filtering is done by multiplying the values of a linear array of pixels in a horizontal direction by the constants stored in the matrix multiplier array, one constant per pixel respectively. The results are summed along with a "partial sum input". The sum is output from the matrix multiplier block. This output is typically used as the partial sum input for the next filtering pass.

There are 8-bit and 16-bit filter modes. In 8-bit filter mode the matrix multipliers require an 8-bit partial sum input and an 8-bit data value, and produce an 8-bit output value. In 16-bit filter mode the matrix multipliers require a 16-bit partial sum input, an 8-bit data value, and produce a 16-bit output. The partial sum input values always come directly from the memory banks.

In both 8 and 16-bit filter modes, the value to be filtered is always 8-bit data.

The 8-bit data to be filtered is specified as the red, green or blue component of the video channel that is selected to be the first input to the matrix multiplier array. Alternatively, it may be the alpha component of the video channel on Video Bus 2.

The matrix multiplier array has two sets of constants registers. In filtering mode, the first set is used for even numbered pixels and the second set is used for odd numbered pixels. The multiplier constants for both sets should be set to the same values for normal operation.

Filtering operations occur over the entire displayed screen. To filter a smaller section of the screen or an area larger than the screen you must: disable output video, alter video timing to fit the area to filter, accomplish the filtering operation, restore video timing back to the original, and finally enable the video again.

As an alternative, commercial software packages can accomplish the filtering operation but these software packages will run slower than the invention matrix multiplier block.

Filtering starts at the left edge of the screen image. The first pixel value on a line is multiplied by the K1 constant, summed with the partial sum input for that pixel and output from the multiplier array.

During the second pixel time, the second pixel value is multiplied by the K1 constant, the first pixel value is multiplied by the K2 constant, and the sum of these two plus the partial sum input for the second pixel is output from the multiplier array.

During the 9th and subsequent pixel times, the previous eight pixels on the line are multiplied by their respective constants K9 through K2, the current pixel is multiplied by the K1 constant, and all these values are summed with the partial sum input.

This sum is output from the array as the output for the 9th pixel time.

The first eight pixels on a line do not use all the constants. Consequently, the results for the first eight pixels on a line may be incorrect for a specific set of constants.

The pixel values in a horizontal line enter a FIFO queue which is nine entries in length. In this way the pixels along a horizontal line are used to generate new values for pixels. This process repeats for all the lines on the display in one frame time. This accomplishes up to a 9×1 filter operation on the data.

To filter vertically requires multiple passes on the data. Each pass generates an output which is used as the partial sum input (which should be all 0s for the first pass) for the next pass. To filter the lines above and below the current line requires that the video data is filtered and the partial sum input values (both contained in their respective memory banks) are offset using the memory bank offsets. This allows for 9×n filtering. By zeroing one or more coefficients, m×n filtering is possible, where m is less than or equal to nine.

18-tap filtering is accomplished when the invention pixel clock divider is nonzero. This allows the halves in the multiplier array, which normally operates on even and odd pixels in parallel, to be "unrolled" and used as a larger single array. In this mode, the matrix multiplier array accomplishes an 18×1 filter operation in one frame time or an 18×N filter operation in N frame times.

Filtering starts at the left edge of the screen image. The first pixel value on a line is multiplied by the even K1 constant, summed with the partial sum input for that pixel, and output from the multiplier array.

During the second pixel time, the second pixel value is multiplied by the even K1 constant, the first pixel value is multiplied by the even K2 constant, and the sum of these two plus the partial sum input for the second pixel is output from the multiplier array.

During the ninth pixel time, the previous eight pixels on the line are multiplied by their respective even constants K9 through K2. The current pixel is multiplied by the even K1 constant and all of these values are summed with the partial sum input. This sum is written from the array as the output for the ninth pixel time.

During the tenth pixel time, the first pixel is multiplied by the odd K1 constant, the previous eight pixels are multiplied by the even K9 through K2 constants. The current pixel is multiplied by the even K1 constant. The value output is the sum of all of these plus the partial sum input. During the 18th and subsequent pixel times, all the even and all the odd constants are used.

The pixel values in a horizontal line enter a FIFO queue (18 entries in length) first with the even K1 through K9 constants and second through the odd K1 through K9 constants.

Since the first seventeen pixels on a line do not use all the constants, the results for the first seventeen pixels may not be correct for a specific set of constants.

In this way the pixels along a horizontal line generate new values for pixels. This process repeats for all the lines on the display in one frame time. This accomplishes up to a 18×1 filter operation on the data.

To filter in the vertical direction requires multiple passes on the data to be filtered. Each pass generates an output which is used as the partial sum input (which should be all 0s for the first pass) for the next pass. To filter the lines above and below the current line requires that the video data is filtered and the partial sum input values (both contained in their respective memory banks) are offset using the memory bank offsets.

Two memory banks are used in 8-bit filtering mode (one for partial sum inputs, one for outputs). The invention can only filter up to two 8-bit memory banks of a 24-bit color image at a time. The third memory bank's data is swapped out of the invention while the first two memory banks are filtered (taking N frames for each). Then one of the memory banks holding filtered data is swapped out while the third memory bank is swapped back in for its N frames of filtering.

For a 24-bit image, the invention requires 3N plus some processor time to accomplish up to a 18×N filter. An application must enable capture data into the memory bank used for sum output. The partial sum input should be set to the appropriate memory bank for the next pass.

16-bit filtering mode requires that the four memory banks are used simultaneously. Two memory banks hold the partial sum input. The second two memory banks are the destination for the partial sum output. Memory bank pairs AB and CD can be used.

Since all four memory banks are used for partial sum values, the invention only filters data from an externally generated channel in this mode. This data is commonly a still image from Live A/D (the capture module) or one of the the digital video ports. Software must enable capture data into the memory bank pair used for partial sum output. The partial sum input is set to memory bank A or C as appropriate.

When the PixelClockDivider is not set to 0 the pixel clock run slow enough to "unroll" the multiplier array and use it twice for each pixel. A transformation and a blend is accomplished in a single pixel time period by multiplying the use of the halves of the multiplier array. The output of the first operation is implicitly the input to the multiplier array for the second operation.

For example, the transform-blend mode can be used to transform YCc images to RGB and then blend that image with another RGB image. The YCc image is transformed to the RGB color space by the first operation, and then is automatically used as video channel input number 1 for the blend operation. Video channel inputs 2 and 3 work normally during the blend operation.

The blend-transform mode can also blend two YCc images and then transform them to RGB. Up to three YCc images from the three input video channels are blended component-by-component. The result may be transformed into the RGB color space.

The filtering operation shows that the filtering operation produces pixels based on the values in the previous n pixels on the same line, illustrated where n is 9 or 18. Most people expect filtering operations to be performed centered on a particular pixel and including some number of pixels around it.

To facilitate this interpretation, the system can use the memory bank offset registers to shift the data in the partial sum input and partial sum output memory banks. Shifting data vertically is accomplished by putting identical values into the memory bank Y offset registers for the partial sum input and output memory banks.

Horizontally it is a little more complicated, and it depends on the number of non-zero filter coefficients in the multiplier array and whether the output is passed to the color look up tables. Remember that filtering can occur using as many as 18 filtering constants in the horizontal direction. Also note that filtering operations are the only operation within the invention that are not internally "pipeline compensated"; normally one can select paths within the invention and you do not have to compensate for the time the data spends moving between and through functional blocks, but you are required to compensate for filtering operations only.

There are formulas that determine the correct offsets to apply to the partial sum input and output horizontal offsets depending on the number of non-zero coefficients "n" and whether the output of the multipliers is used by the color look up tables:

Partial Sum Input Horizontal Offset = $-(((n-1)/2)+2)$
Partial Sum Output Horizontal Offset = $-(((n-1)/2)+1)$ no CLUT
Partial Sum Output Horizontal Offset = $-(((n-1)/2))$ to CLUT For example, a 3×3 filtering operation where the multiplier output did not go to the CLUTs would use the following offsets, performing a 3×3 filter in 3 frames or passes:

| Pass | Inupt X, Y | Output X, Y |
|------|------------|-------------|
| 1    | -3, -1     | -2, -1      |
| 2    | -3, 0      | -2, 0       |
| 3    | -3, 1      | -2, 1       |

A 5×5 filtering operation where the multiplier output did go to the CLUTs would use the following offsets, performing a 5×5 filter in 5 frames or passes:

| Pass | Input X, Y | Output X, Y |
|------|------------|-------------|
| 1    | -4, -2     | -2, -2      |
| 2    | -4, -1     | -2, -1      |
| 3    | -4, 0      | -2, 0       |
| 4    | -4, 1      | -2, 1       |
| 5    | -4, 2      | -2, 2       |

The way the invention deals with 16-bit intermediate results when filtering also is more detailed now, and requires an overview of how the multipliers actually work.

The color look-up block consists of two color look-up sections. Each section can operate independently in one of two modes: color look-up or hardware cursor.

One section of the color look-up block can work in a gamma correction mode.

Color look-up mode allows the invention to select output pixel components based on a single input value. Indexing of multiple component tables occurs simultaneously using this value (which commonly comes from the video memory decoder). The multiple values referenced by the index determine the color components of the pixels. The pixels comprise the color look-up table block output. The size of the index is variable depending upon the display mode.

The system of the present invention can join both parts of the color look-up block to produce a larger color look-up table.

Gamma correction mode allows the invention to compensate for non-linear characteristics of video sources at different signal levels. In gamma correction mode, each of the three components provides an index into its own component table. The values referenced by these indexes determine the new color components for the output of the color look-up block. In this way, a video source can have its color components individually corrected or remapped.

In hardware cursor mode, the system of the present invention uses the color look-up tables to control a small square region of pixels at a programmable, continually variable location. The color look-up tables contain the image displayed within this region.

CLUT is an abbreviation for Color Look-up Table. In color look-up tables each pixel does not directly represent a color but instead is an index into a table of direct colors. The invention supports several CLUT pixel formats including Color QuickDraw 1, 2, 4, and 8-bit per pixel modes and a new 9-bit per pixel mode.

Eight-bit CLUT pixels can represent up to 256 different colors. Four-bit pixels can represent up to 16 different colors. Two-bit pixels can represent up to 4 different colors, and 1 bit pixels can represent 2 colors (normally white and black in a Macintosh). CLUT pixel images are represented in a compact format that uses less memory. However, using less memory means fewer colors in a display.

In one embodiment, the invention has two separate, nonidentical, color look-up tables.

The range thresholder examines the data in a video data channel one pixel at a time. It compares this data to programmable reference values within the range thresholder. Based on the comparisons, it instructs the priority resolver to display one of several channels.

In the invention, the programmable reference values are three pairs of upper and lower limits. These limits define a range for each color component of a pixel. To be contained within a range a components color value must equal one of the two range limits or fall between those limits.

The range thresholder independently determines each color components range status. There are eight states for the output of the range thresholder. Each state references its display channel and priority. When the range thresholder output changes from one state to another it supplies a transition source and priority level.

The range thresholder can describe three ranges of one component or one range each of three components.

The range thresholder can operate on a non-displayed image or data, such as pixel control commands in memory bank A. A variety of special effects, such as reveals, is possible with the range thresholder.

Each of the three comparators inside the range thresholder produces an inside or outside range determination. The thresholder look-up table contains eight values. Each value refers to a single combination of comparator states as shown:

| Red Comp. | Green Comp. | Blue Comp. | Entry Number |
|-----------|-------------|------------|--------------|
| outside   | outside     | outside    | 0            |
| outside   | outside     | inside     | 1            |
| outside   | inside      | outside    | 2            |
| outside   | inside      | inside     | 3            |
| inside    | outside     | outside    | 4            |
| inside    | outside     | inside     | 5            |
| inside    | inside      | outside    | 6            |
| inside    | inside      | inside     | 7            |

Each state has a display channel and priority stored in the thresholder look-up table.

The range thresholder transition handling is flexible. For example, the input to the thresholders could be a stream of pixels.

This sequence consists of four white pixels, followed by five black pixels, then five more white pixels. Within the thresholders, the upper range could be set to a medium gray, and the lower range to black.

The look-up table states with a priority of zeo are the "outside" states for all pixel transitions. Priorities of non-zero are "inside" states In this monochrome input example, the thresholder could detect the range status as "outside" when the input pixels were white, and as "inside" when the input pixels were black. The thresholder can also resolve multiple ranges over a single color component or one range each over multiple color components.

The thresholder output can also be saved as the alpha bit in RGB555 modes. The saved output is the determination of inside or outside states, as explained earlier in this chapter.

Using the thresholders to matte one foreground channel on top of another, the transition pixel time often blends the two channels together using the multiplier array. This creates a soft transition. The choice of inside or outside affects the quality of a matte. An inside transition shrinks the foreground object, and will cause fine edge detail to be blended in with the background. An outside transition expands the object slightly, and will emphasize or thicken small edge details and noise around the foreground object.

In this example the pixel transition feature is inactivated. The output of the range thresholder specifies one display channel and priority for each pixel time labeled "a" (corresponding to the "outside" range). For each pixel time labeled "c" (corresponding to the "inside" range) the range thresholder could output a different display channel and priority than specified by "a".

The output of the range thresholder specifies one display channel and priority for each pixel time labeled "a" (corresponding to the "outside" range). For each pixel time labeled "c" (corresponding to the "inside" range) the range thresholder could be programmed to output a different display channel and priority than specified by "a". For each pixel time labeled "b", a third display channel and priority would be specified. This is the pixel transition channel and priority.

Using the same input to the thresholders and the same range

The output of the range thresholder would specify one display channel and priority for each pixel time labeled "a" (corresponding to the "outside" range). For each pixel time labeled "c" (corresponding to the "inside" range) the range thresholder could output a different display channel and priority than specified by "a". For each pixel time labeled "b" a third display channel and priority would be specified.

There are three comparators which can perform 3-axis range thresholding or three data range comparisons.

Using the thresholders involves layers of indirection. First, two registers in the pixel control section are used to select which display source goes into the thresholders. Remember, these two registers are set to different values to allow the pixel control section to change the input to the thresholders on a pixel by pixel basis, and they are set to the same values to force the input to the thresholders to a fixed source.

The selected display source or channel is then routed on a component by component basis to the thresholder comparators. Each component is compared independently to its own upper and lower limits to determine if that component is inside its respective bounds. There are three components, so there are eight possible combinations. Note the thresholder can only be in one of these eight states at any given time, but the state can change on a pixel by pixel basis.

The eight states each have a priority and display channel associated with them. These thresholder outputs are determined by the values stored for the currently active state. The thresholder has an additional output called the thresholder bit. This bit is used in two places; it can be captured via the capture multiplexer as the alpha bit in RGB555 capturing operations, and it determines the inside/outside characteristics of the thresholder transition timing.

For example, the thresholder can be used to perform blue screen effects as follows. A live video image of a person in front of a blue screen is supplied to the input module. The Pixel0ThresholderInputSource and Pixel1ThresholderInputSource registers are set to select Live A/D. The range thresholder high and low registers are set up so that the upper limit for both red and green are fairly small values, and the lower limit is zero. The upper blue limit is set to the maximum, and the lower limit is zero.

Because the blue range includes all values, the blue comparator will always report in range. Whenever the video is showing the person, the red and green comparators will be out of range (corresponding to state 1); whenever the video is showing the background, all three comparators will be in range (corresponding to state 7). The display priority for state 1 would be set to some non-zero value. The display priority for state 7 would then be set to zero; the other states are essentially don,t cares, and typically are set to match state 1.

Thus, whenever the live video is on the blue background the display priority output of the range thresholder drops to zero. Whenever the live video is on the person, the display priority output of the range thresholder rises to a non-zero value. When the display priority output of the range thresholder is greater than zero, the video is considered to be inside the thresholded region. When the display priority of the range thresholder is zero, the video is in a region outside the thresholded region. In this example, the area the person takes up on the screen would be considered the inside region.

This thresholder inside/outside flag can be used to generate a transition pixel as described in the manual. This flag may be recorded as the alpha bit when capturing RGB555 images, if the appropriate ABRGB555Mode or CDRGB555Mode register is set to mode 10.

The invention maintains several rectangle controls. These rectangles are hardware boundaries for special effects. They are similar to rectangles used by QuickDraw.

The invention has two types of rectangles: effects and capture. There are four effects rectangles and one capture rectangle.

Effects rectangles control the changing of video channel priorities. As the scan line intersects the rectangle's boundaries, the video channel switches priorities. For example, the original screen display could remain outside the boundaries while an effect is inside them.

The invention supports up to four effects rectangles, which may overlap or coincide unlimitedly.

The capture rectangle spatially clips an incoming video signal, thereby masking a live video source. A small portion of the live video frame is captured and stored within the invention. Unlike the effects rectangles, the capture rectangle cannot be enabled outside its boundaries.

As with 32-bit Color QuickDraw, a rectangle in the invention is defined by its four boundaries. To establish the current position, the invention keeps counter-values for the absolute X and absolute Y position of the screen as it generates the display. These values, when compared with the boundaries of the rectangle, determine whether the current raster position is inside or outside the rectangle.

However, the effects rectangles use information other than boundaries to establish the current position. For each rectangle, there is a set of flags that specifies the inside and outside of the rectangle, in each axis and overall. Therefore the current position can be independently reversed in the horizontal and vertical directions. If the directions are reversed, the current position may be defined as reversed; inside means outside and vice versa.

Line commands dynamically change the invention display characteristics. Line control consists of the line memory and the line control section. Line memory stores line commands. The line control section interprets line commands and uses them to dynamically change the invention display. Line commands can: select an input for the matrix multiplier array, control some of the blending constants used in the matrix multiplier array, change the default display source in the priority resolver, select the line control display source for the priority resolver, enable or disable the capturing of video data for each image memory bank, alter the video memory decoder operation, change a default color register, initialize delta color encoding modes, shift image data left and right on a displayed scan line, reorder the display scan lines vertically.

In active scan commands, line commands override the current settings for only a single scan line in each of the above areas. After a line command overrides the current display scan line, the scan line reverts back to its original value. Consequently, to produce the same special effect on multiple scan lines requires an individual line command for each line.

Pre-scan commands stay the same all the way down the frame and onto the next one unless another line command specifically sets another operation.

The invention models feature 126K of line memory regardless of the amount of video memory. Line memory is a buffer for sets of 16 commands corresponding to each consecutive display scan line. For example, the first 16 commands correspond to the first scan line, the second 16 commands correspond to the second scan line, and so on.

The Macintosh II slots the invention occupies determines the start address for line memory. Macintosh II slot spaces use the address form of $Fsxxxxxx. Line memory starts at an address in the form $FsF80000. In these addresses, "s" represents one of the possible NuBus slots in the Macintosh II.

Line memory proceeds in a linear ascending fashion from this address. The memory is a full 32-bit wide memory, accessed using any MC680x0 addressing mode. This includes byte, word, long word and bit field operations. Each line command is a 32-bit word The highest address used for line memory in the invention is in the form $FsF9F7FF, where "s" represents one NuBus slot in the Macintosh II. This address refers to the last byte in the line memory and corresponds to the last line command for display line 2016.

The true high end of the line memory is used as a shadow memory for the invention registers. The range from $FsF9F800 to $FsF9FFFF is reserved for this use. Data in this range is not used for line commands. Writing to this range prevents the programmer from reading the invention registers.

The line control section reads data from the line memory on each display scan line. It interprets this data to alter the operation of the invention display. There are active scan commands and pre-scan commands Active scan commands affect the display at programmable points along a scan line. Pre-scan commands affect the entire display scan line.

A pre-scan command affects the current display scan line before the display operation begins and continues to affect it throughout the displayed scan line. These commands can: apply an X offset to the data for the current display scan line, initialize the DYUV registers, set the color used for the first default color register, load values into the matrix multiplier constants K3, K6 and K9, change the data formats for Video Bus 1 and Video Bus 2 selected by the video, memory decoder, change the internal color look up table modes, display an arbitrary scan line instead of the current display scan line, change the default display source, enable or disable capture mode.

An active scan command affects the current display scan line at programmable positions during the current display scan line. It continues to affect it until the end of the display scan line or until another command overrides it. An active scan command can: control line based blending, alter the display source associated with the line control, override an input source into the matrix multipliers.

Active scan commands may be programmed to occur at most locations along a display scan line. There are two programming restrictions: the line commands must be present in the line control in ascending position order (from left to right) and only one command may be executed at each position.

Line control directs a special class of blending operations called line based blending. The line control maintains an internal 10-bit blending value. Line commands alter this value by: increasing the value by a programmable amount every pixel, decreasing the value by a programmable amount every pixel, freezing the current value, replacing the value with a programmable constant.

The matrix multiplier section uses the blending value maintained by the line control to blend up to three sources of video data. This blending value overrides the blending constants K1, K4 and K7 for the first multiplier input source.

An inversely varying value is generated by subtracting the blend constant from a programmable reference value. The inversely varying value is used as the blending constants K2, K5 and K8 for the second multiplier input source.

The third set of multiplier blending constants (K3, K6, and K9) may be modified by line commands on a line-by-line basis and are used by the multiplier array for all blend operations on that line.

The line memory has a dual port architecture. This architecture allows the Macintosh II and the invention to access the line memory independently and simultaneously. Software programs can run at full speed on the Macintosh II, reading and writing to line memory, without prohibiting the execution of current commands.

The primary port on the line memory provides the Macintosh II direct access to any location in the line control. The primary port also refreshes the line memory.

The second port on the line memory is optimized for command interpretation. Line commands require a stream of output data that represents consecutive commands and parameters. The second port supplies this stream of data from consecutive memory locations.

The primary random access port on the line memory is directly controlled by the line control section of the invention. Refresh cycles, necessary to retain data within any dynamic memory, are supplied by the same section. The line control section also supplies data from the Macintosh II computer.

The relative timing section controls the secondary port. This section works with the absolute timing section to initiate line control transfer cycle requests. These requests are unique to video memories. In addition, the relative timing section controls how often commands are written to the line memory secondary port.

The line control buffer block accepts absolute X and Y coordinate values from the absolute timing section. This block continuously reads data from the line control.

The primary port on the line memory supplies requested data to the video memory configuration section of the invention. The NuBus interface supplies this data to the Macintosh II computer.

The secondary port on the line memory supplies line commands and data to the line control section.

The line control buffer block affects operation in: the priority resolver and display selector, the matrix multiplier section, and the relative timing section. It also provides capture enable output to the absolute timing section.

Line commands enable windowing features and line mapping functions. A set of commands, created for each display line, controls the display source and the blend ratio of two sources. For example, this is used to create an odd-shaped window that has a smooth transitional fade from one source to the next.

Each line command is 32 bits. There are two kinds of line commands. The first kind of command affects the line before the active scan begins. These commands: change the X & Y offsets on a line-by-line basis, update default display color 1, update the default display source, change multiplier constants, initialize the DYUV decoding, and enable or disable capture. Disabling capture forces the buffer back into a display mode for the current scan line. Disabling capture, coupled with a new Y value, allows mosaicing a live image in the vertical direction.

The second kind of command affects the active display line at a particular X value. This group accommodates display source switching and smooth blending. The line control is used to produce a series of image cuts or fades.

Multiplier registers and control codes from the line control change the blending percentages across a scan line. The multiplier registers used for line based blending are listed below. Programming Line Commands are discussed elsewhere herein.

The line control section supplies the matrix multiplier array with blending constants on a line-by-line basis. A counter may be set up within a line to provide a continuously changing blending value along a line An active scan command establishes an initial blending value. The BlendRatioRateOfChange controls the alteration of the blending value.

The blending values at each pixel are 2's complement 10-bit values available to the matrix multiplier array. The ConstantsSource selects line control (or pixel control) blending constants that override the built-in multiplier constants K1, K2, K4, K5, K7 and K8.

The line control blend ratios override the blend ratios from the pixel control section when active scan commands are enabled.

The 10-bit blending values are scaled by multiplication with the ICFScaleFactor. The results are used for constants K1, K4 and K7. The result is simultaneously subtracted from the BlendRatioTotal and used for the multiplier constants K2, K5 and K8.

When pre-scan line commands are enabled constants K3, K6 and K9 can be overridden independently of the ConstantsSource.

Memory bank A is a memory bank in video memory. It can hold image data or a portion of an image, and is used by the video memory decoder to generate a display. However, it is different from the other memory banks in that the invention can use it as a source for commands which alter the display pixel by pixel.

There are a number of different interpretations that may be applied to the data in memory bank A. Bank A may be used to control on a pixel by pixel basis: a blending value for the matrix multiplier array, the three inputs to the matrix multiplier array, the input to the range thresholder, several values in the priority resolver, selection of a display channel and display priority level for the pixel control section, capturing live video with optional horizontal decimation of the image.

Using the thresholders involves layers of indirection. First, two registers in the pixel control section are used to select which display source goes into the thresholders. Remember, these two registers are set to different values to allow the pixel control section to change the input to the thresholders on a pixel by pixel basis, and they are set to the same values to force the input to the thresholders to a fixed source.

The selected display source or channel is then routed on a component by component basis to the thresholder comparators. Each component is compared independently to its own upper and lower limits to determine if that component is inside its respective bounds. There are three components, so there are eight possible combinations. Note the thresholder can only be in one of these eight states at any given time, but the state can change on a pixel by pixel basis.

The eight states each have a priority and display channel associated with them. These thresholder outputs are determined by the values stored for the currently active state. The thresholder has an additional output called the thresholder bit. This bit is used in two places; it can be captured via the capture multiplexer as the alpha bit in RGB555 capturing operations, and it determines the inside/outside characteristics of the thresholder transition timing.

For example, the thresholder can be used to perform blue screen effects as follows. A live video image of a person in front of a blue screen is supplied to the input module. The Pixel0ThresholderInputSource and Pixel1ThresholderInputSource registers are set to select Live A/D. The range thresholder high and low registers are set up so that the upper limit for both red and green are fairly small values, and the lower limit is zero. The upper blue limit is set to the maximum, and the lower limit is zero.

Because the blue range includes all values, the blue comparator will always report in range. Whenever the video is showing the person, the red and green comparators will be out of range (corresponding to state 1); whenever the video is showing the background, all three comparators will be in range (corresponding to state 7). The display priority for state 1 would be set to some non-zero value. The display priority for state 7 would then be set to zero; the other states are essentially don't cares, and typically are set to match state 1.

Thus, whenever the live video is on the blue background the display priority output of the range thresholder drops to zero. Whenever the live video is on the person, the display priority output of the range thresholder rises to a non-zero value. When the display priority output of the range thresholder is greater than zero, the video is considered to be inside the threshold region. When the display priority of the range thresholder is zero, the video is in a region outside the thresholded region. In this example, the area the person takes up on the screen would be considered the inside region.

This thresholder inside/outside flag can be used to generate a transition pixel as described in the manual. This flag may be recorded as the alpha bit when capturing RGB555 images, if the appropriate ABRGB555Mode or CDRGB555Mode register is set to mode 10.

It should now be apparent that the invention as described can perform real time video effects including but not limited to: fades, wipes in any direction, dissolves in any pattern, blends, mixes of any complexity; freeze video frame; digital video effects; anti alias text and graphics over video sources; key on a variety of signals effecting such operations as chrominance and luminance keys; digital color effects such as color transformations, colorization, false-coloring, and hue adjustments; and zoom, pan, and mosiac effects. The invention is capable of performing these effects in a plurality of video, imaging, and film formats and resolutions, including many worldwide standards as well as custom, programmable formats and resolutions.

Further facilitating these operations is the invention's capability to accept different input modules supporting the different signal types associated with different video, imaging, and film formats; the capability to perform gamma and other output signal level corrections supporting a video, imaging, or film format dissimilar to the input format; the flexibility to allow object code in both driver and application software levels to be upgraded transparently to and without requiring intervention by the user; the capability to synchronize to an external video, image, or film source; the capability to reassert and correct deficiencies in synchronization, blanking, and signal reference levels and durations; and the capability to link multiple instances of the invention together with other compatible devices through the digital video bus, thus allowing more sophisticated effects including but not limited to: multiple layered effects, multiple keys and mattes; and image data conversion.

Specific embodiments of the novel digital video image processor according to the invention have been described for the purpose illustrating the manner in which the invention may be made and used. It should be understood that implementation of other variations and modifications of the invention in its various aspects will be apparent to those skilled in the art and that the invention is not limited by the specific embodiment described. It is further contemplated to cover the present invention any and all modifications, variations, or equivalents that fall within the spirit and scope of the underlying principles disclosed and claimed herein.

What is claimed is:

1. A digital video processor for processing video source components from a plurality of video sources, comprising: input means for receiving a plurality of video sources;
   source selection means coupled to the input means, for programmably selecting a plurality of video source components from the plurality of video sources to provide a plurality of selected video source components;
   blend input means for input of a blend value;
   pre-scale multiplier means, coupled to the blend input means, for multiplying the input blend value by a programmable pre-scale constant to provide a pre-scaled blend constant source;
   constant selection means, coupled to the pre-scale multiplier means, for programmably selecting a plurality of constants from among a plurality of constant sources including the pre-scaled blend constant source to provide a plurality of selected constants;
   multiplier means, coupled to the source selection means and constant selection means, for multiplying each selected source component by a respective selected constant to provide a plurality of multiplier outputs;
   summing means, coupled to the multiplier means, for summing the plurality of outputs to provide at least one summed multiplier output.

2. The digital video processor of claim 1 wherein at least one summed multiplier output is coupled back to the source selection means as one of the plurality of video sources.

3. The digital video processor of claim 1 wherein the multiplier means comprises a multiplier array which is comprised of a plurality of multipliers at least one of which is adapted to perform at least two multiplications within a pixel time period.

4. The digital video processor of claim 1 wherein the multiplier means comprises a plurality of multipliers each of which is adapted to perform a plurality of multiplications within a pixel time period.

5. The digital video processor of claim 3 wherein the multiplier array is comprised of a plurality of multiplier arrays each having inputs and outputs, wherein the output of at least one of said plurality of multiplier arrays is coupled to the input of at least one other of said plurality of multiplier arrays.

6. The digital video processor of claim 3 wherein the pre-scale multiplier means and the multiplier means produce fading effects.

7. The digital video processor of claim 3 wherein the pre-scale multiplier means and the multiplier means produce dissolving effects.

8. The digital video processor of claim 1 wherein each video source comprises signals representative of a plurality of pixels, and wherein the blend input means comprises means for input on a pixel by pixel basis of a unique blend value for each pixel.

9. The digital video processor of claim 1 wherein the multiplier means comprises an array of multipliers.

10. The digital video processor of claim 1 wherein the multiplier means comprises a three by three array of multipliers adapted to multiply each of three components of up to three selected video sources by a set of up to nine selected constants to produce up to nine products.

11. The digital video processor of claim 10 wherein the summing means comprises three summing circuits each adapted to sum three products to produce three summed multiplier components, and means for combining the summed multiplier components to form a summed multiplier output.

12. The digital video processor of claim 11 wherein the summing means further comprises means for providing a total sum of the three summed multiplier components and for selecting predetermined most significant bits of the total sum to provide a partial sum multiplier output.

13. The digital video processor of claim 1 wherein the multiplier means comprises a four by four array of multipliers adapted to multiply each of up to four components of up to four selected video sources by a set of up to sixteen selected constants to produce up to sixteen products.

14. The digital video processor of claim 1 wherein the multiplier means comprises an n by m array of multipliers, where n and m are both positive integers, adapted to multiply each of n components of up to m selected video sources by a set of up to nxm selected constants to produce up to nxm products.

15. The digital video processor of claim 14 wherein n equals m.

16. The digital video processor of claim 14 wherein n does not equal m.

17. The digital video processor of claim 14 wherein the summing means comprises n summing circuits each adapted to sum m products to produce n summed multiplier components, and means for combining the summed multiplier components to form a summed multiplier output.

18. The digital video processor of claim 17 wherein the summing means further comprises means for providing a total sum of the m summed multiplier components and for selecting a subset of predetermined most significant bits of the total sum to provide a partial sum multiplier output.

19. The digital video processor of claim 14 wherein the array of multipliers can be configured to perform blending.

20. The digital video processor of claim 14, wherein at least one video source is comprised of multiple video components, and wherein the array of multipliers can be configured to perform matrix transformations using all components of one video source.

21. The digital video processor of claim 20 wherein said video components are comprised of R, G, and B components.

22. The digital video processor of claim 20 wherein said video components are comprised of Y, U, and V components.

23. The digital video processor of claim 20 wherein said video components are comprised of Y, I, and Q components.

24. The digital video processor of claim 14 wherein the array of multipliers is selectively configurable to perform frame averaging.

25. The digital video processor of claim 9 wherein the array of multipliers is selectively configurable to perform filtering using one of said video components of said video source.

26. The digital video processor of claim 25 wherein said filtering is comprised of image processing, comprised of at least one of softening, sharpening, focusing, blurring, edge detecting, and highlighting.

27. The digital video processor of claim 9 wherein the array of multipliers is selectively configurable to perform simultaneous blending and matrix transformations.

28. The digital video processor of claim 9 wherein the array of multipliers is selectively configurable to perform color transformations.

29. The digital video processor of claim 3 wherein at least one video source is comprised of multiple video components, and each of the pixels has associated therewith data for said multiple video components.

30. The digital video processor of claim 29 wherein said multiple video components is comprised of a control component.

31. The digital video processor of claim 30 wherein the control component is used to control the blend input means on a pixel by pixel basis.

32. The digital video processor of claim 30 wherein the control component is used to control the pre-scale multiplier means on a pixel by pixel basis.

33. The digital video processor of claim 30 wherein the control component is used to control the constant selection means on a pixel by pixel basis.

34. The digital video processor of claim 30 wherein the control component is used to control the multiplier means on a pixel by pixel basis.

35. The digital video processor of claim 30 wherein the control component is used to control the summing means on a pixel by pixel basis.

36. The digital video processor of claim 30 wherein the control component is used to control at least one of the tint, contrast, hue, and brightness of the individual pixels.

37. The digital video processor of claim 30 wherein the control component is used to control the expansion of the individual pixels from a single video component other than the control component to all of the multiple video components.

38. The digital video processor of claim 30 wherein the control component controls video processing effects on a pixel by pixel basis.

39. The digital video processor of claim 30 wherein said control component is further comprised of multiple subcomponents.

40. The digital video processor of claim 30 wherein said control component is comprised of control information and non-control data.

41. The digital video processor of claim 1 wherein the blend input means is responsive to a constant generator.

42. The digital video processor of claim 41 wherein the constant generator is comprised of a plurality of constant generators.

43. The digital video processor of claim 41 wherein said constant generator is a pseudo-random generator.

44. The digital video processor of claim 43 wherein the pseudo-random sequence generator produces a linear pseudorandom sequence.

45. The digital video processor of claim 43 wherein the pseudo-random sequence generator produces a gaussian pseudorandom sequence.

46. The digital video processor of claim 41 wherein said constant generator is an external noise source.

47. The digital video processor claim 41 wherein said constant generator provides an output, wherein said output can be used as one of a blend value, a prescale value, and a video source.

48. The digital video processor of claim 1 wherein the multiplier means include overflow and underflow prevention means for substituting predefined limits responsive to detecting a sum outside a range of predefined overflow and underflow conditions.

49. The digital video processor of claim 1 wherein the multiplier means comprises a plurality of multipliers each adapted to perform multiplications at least at a real-time video rate.

50. The digital video processor of claim 1 further comprising: designation means for assigning a priority designation to each of the plurality of sources including the summed multiplier output; and resolver means, coupled to the designation means, for generating a source selection signal in response to the priority designations.

51. The digital video processor of claim 50 wherein the designation is selectively configurable to perform mixing effects.

52. The digital video processor of claim 50 further comprising a threshold means, coupled to the multiplier means, input means and resolver means, for comparing a programmably selected video source including the summed multiplier output to a plurality of programmable threshold ranges, and generating a priority designation for an associated source in response thereto.

53. The digital video processor of claim 52 wherein the threshold means can be programmed to perform wipe effects.

54. The digital video processor of claim 52 further comprising means for allowing a user to modify the programmably selected video sources.

55. The digital video processor of claim 52 further comprising means for allowing a user to modify the programmable threshold ranges.

56. The digital video processor of claim 52 further comprising output means, coupled to the resolver means, input means and the multiplier means, for selecting and coupling one of the video sources to an output in response to the source selection signal.

57. The digital video processor of claim 56 further comprising window means, coupled to the resolver means, for generating a plurality of window source and window priority designations.

58. The digital video processor of claim 57 wherein the resolver means is responsive to the window source and window priority designations for selecting and coupling selected ones of the video sources for output by the output means.

59. The digital video processor of claim 56 further comprising: a color look up table means, responsive to the input means, for providing a video signal output coupled to the output means as a video source, and for providing an associated priority designation coupled to the resolver means.

60. The digital video processor of claim 59 wherein the source selection signal generated by the resolver means provides for selection of one of the following sources for output to the output means: the input means, the multiplier means, or the color look up table means.

61. The digital video processor of claim 60 wherein the source selection signal generated by the resolver means can select between any of a plurality of input sources.

62. The digital video processor of claim 59 wherein the color look up table also includes a control component for providing a priority designation coupled to the resolver means.

63. The digital video processor of claim 59 wherein the color look up table means can be configured to perform colorization (also known as false coloring, or pseudo-coloring).

64. The digital video processor of claim 56 wherein each video source is comprised of a plurality of horizontal lines of pixels, and further comprising a programmable line control means for providing a plurality of control signals associated with each horizontal line for programmably altering source selections and multiplier constant selections.

65. The digital video processor of claim 64 further comprising pixel control means for providing, on a pixel by pixel basis, a blend constant value, and control signals for altering threshold ranges, output source selections and programmable threshold ranges.

66. The digital video processor of claim 65 wherein each video source comprises signals representative of a plurality of pixels and at least one associated control component, and wherein the designation means for assigning a priority designation is responsive to the threshold means, line control means, input means, pixel control means, and the control component.

67. The digital video processor of claim 65 wherein the designation means in conjunction with the threshold means and the pixel control means, selectively produces chrominance key effects on a pixel by pixel basis.

68. The digital video processor of claim 65 wherein the designation means in conjunction with the threshold means and the pixel control means selectively produces luminance key effects on a pixel by pixel basis.

69. The digital video processor of claim 56 further comprising frame control means for providing, on a frame by frame basis, a blend constant value, and control signals for altering threshold ranges, output source selections and programmable threshold ranges.

70. The digital video processor of claim 59 wherein the color look up table means is further comprised of multiple color look up table means, each of which is independently and selectively configurable for different video sources, outputs, modes, and priorities.

71. The digital video processor of claim 70 wherein the multiple color look up table is further comprised of a programmable means to select modes.

72. The digital video processor of claim 52 wherein each video source comprises a plurality of pixels and further comprising means for providing control signals for altering threshold modes, selected video sources for output, and programmable threshold ranges on a pixel by pixel basis.

73. The digital video processor of claim 52 wherein the designation means can be used in conjunction with the threshold means to selectively produce at least one of luminance and chrominance key effects.

74. The digital video processor of claim 59 wherein the color look up table means provides for selectively remapping of individual video components responsive to the input video source.

75. The digital video processor of claim 1 further comprising memory means for storing selected video source signals in the form of digital data.

76. The digital video processor of claim 1 wherein the pre-scale multiplier means can perform anti-aliasing of computer text and graphics over a plurality of video sources.

77. A video processing system comprising:
input means for receiving signals from a plurality of video sources;
multiplier the signals from means coupled to the input means, for multiplying at least one programmably selected video source with programmably selected constants to generate a multiplier video source;

designation means for assigning a priority designation to each of of the video sources;

resolver means, coupled to the designation means, for generating a source selection signal in response to the priority designation;

output control means, coupled to the resolver means, input means and multiplier means, for coupling of a selected one of the video sources to an output in response to the source selection signal.

78. The video processing system of claim 77 further comprising threshold means for comparing a programmably selected video source to a plurality of programmable ranges and for generating a priority designation for an associated source in response thereto.

79. The video processing system of claim 78 further comprising window means for generating a plurality of window priority designations and designation of respective associated video sources.

80. The video processing system of claim 78 wherein each video source comprises a plurality of pixels and further comprising means for providing control signals for altering threshold range modes, selected video sources for output, and programmable threshold ranges on a pixel by pixel basis.

81. The video processing system of claim 78 further comprising of a functional look up table means for controlling the designation means, resolver means, and output control means, and responsive to the threshold means.

82. The video processing system of claim 77 further comprising a video bus, wherein a plurality of video processing systems can be connected together via the video bus.

83. The video processing system of claim 82 wherein the video bus is comprised of two, independent bi-directional channels.

84. The video processing system of claim 83 wherein each channel is comprised of four video components.

85. The video processing system of claim 84 wherein the bi-directionality is independent for each component of each channel.

86. The video processing system of claim 82 wherein a plurality of video processing systems are connected to the video bus wherein a first video processing system provides output to the next video processing system responsive to the input means, wherein, thereafter, each next video processing system provides output to its respective output means responsive to the input means and the output from the previous video processing system.

87. The video processing system of claim 82 wherein the video bus is comprised of a plurality of independent bi-directional channels.

88. The video processing system of claim 87 wherein each channel is comprised of a plurality of video components.

89. The video processing system of claim 77 further comprising threshold means for comparing one of a programmably selected video source, portion of a video source, and a control source, to a plurality of programmable ranges and for generating a priority designation in response thereto.

90. The video processing system of claim 77 further comprising color look up table means for providing a video source, and a priority designation for an associated source in response to input of a video source.

91. The video processing system of claim 90 wherein the color look up table means is further comprised of multiple color look up tables, each of which is selectively configurable independently for different video sources.

92. The video processing system of claim 91 wherein the multiple color look up tables are further comprised of a programmable means to reconfigure the multiple tables.

93. The video processing system of claim 92 wherein the multiple reconfigurable color look up tables can be combined into a larger color look up table.

94. The video processing system of claim 77 further comprising capture means for digitizing an analog video source to provide a digital video source and for coupling the digital video source to the input means to provide one of the video sources.

95. The video processing system of claim 94 further comprising memory means for storing selected video source signals in the form of digital data.

96. The video processing system of claim 95 wherein the memory means is capable of storing data representations of the control components associated with the video source signals.

97. The video processing system of claim 95 wherein the memory means can be coupled to the output means to perform zoom effects.

98. The video processing system of claim 95 wherein the memory means can be coupled to the output means to perform panning effects.

99. The video processing system of claim 95 wherein the memory means can be coupled to the output means to perform mosacing effects.

100. The video processing system of claim 77, further comprising memory means comprised of a plurality of memory banks, each of which can be programmably configured to store video source signals from any of a plurality of video sources.

101. The video processing system of claim 100 wherein the plurality of memory banks can be programmably combined to form a plurality of larger memory banks, each consisting of a plurality of memory banks.

102. The video processing system of claim 77 wherein each video source comprises signals representative of a plurality of pixels, and further comprising a blend input means for the input on a pixel by pixel basis of a unique blend value for each pixel.

103. The video processing system of claim 77 wherein video input means include at least one video source is in a 24 frames-per-second film format.

104. The video processing system of claim 77 wherein the input means can receive a plurality of video sources, each in different video formats.

105. The video processing system of claim 77 wherein the input means can receive a plurality of video sources, at least one of which is in an interlaced format.

106. The video processing system of claim 77 wherein the input means can receive a plurality of video sources, at least one of which is in a non-interlaced format.

107. The video processing system of claim 77 wherein at least one video source is responsive to a pseudo-random sequence generator.

108. A method for processing video source components from a plurality of video sources comprising the steps of:

programmably selecting a plurality of video source components from the plurality of video sources to provide a plurality of selected video source components;

providing an input blend value;

multiplying the input blend value by a programmable pre-scale ratio to provide a pre-scaled blend source;

programmably selecting a plurality of constants from among a plurality of constant sources including the prescaled blend source to provide a plurality of selected constants;

multiplying each selected source component by a respective selected constant to provide a plurality of multiplier outputs;

summing the plurality of outputs to provide at least one summed multiplier output.

109. The method of claim 108 further comprising the step of coupling at least one summed multiplier output back as one of the plurality of video sources for selection of selected video source components.

110. The method of claim 108 further comprising the steps of assigning a priority designation to each of the plurality of sources including the summed multiplier output and generating a source selection signal in response to the priority designation.

111. The method of claim 110 further comprising the steps of comparing programmably selected video sources including the summed multiplier output to a plurality of programmable ranges and generating a priority designation for an associated source in response thereto.

112. The method of claim 111 further comprising the step of selecting and coupling one of the video sources to an output in response to the source selection signal.

113. The method of claim 112 further comprising the step of displaying the output.

114. The method of claim 112 further comprising the step of generating a plurality of window priority designations each associated with a window source.

115. A video processing system comprising:
input means for receiving signals from a plurality of video sources;

multiplier means for multiplying signals from at least one selected video source with selected constants to generate a multiplied video source;

clock means for providing programmable frequency timing signals for the input means and multiplier means comprising means for dividing the frequency of a reference clock signal by a first programmable number to provide a divided reference signal;

means for dividing the frequency of a selected signal by a second programmable number to provide a divided signal;

means for comparing the divided reference signal with the divided signal to generate a control signal dependent upon the difference between the frequencies of divided signals;

voltage controlled oscillator for generating a VCO signal having a frequency controlled by the control signal;

means for selecting the VCO signal as the selected signal and wherein the selected signal is utilized as a timing signal.

116. The system of claim 115 further comprising a chroma divider means for dividing the frequency of the selected signal by a third programmable number to provide a chroma clock signal, and a pixel divider means for dividing the frequency of the selected signal by a fourth programmable number to provide a pixel clock signal.

117. The system of claim 116 wherein the means for selecting further comprises means for programmably selecting between the VCO signal and at least one external clock signal to provide the selected signal.

118. The system of claim 115 further comprising means for providing a variable rate pixel clock which allows variable screen resolutions on a continuously variable range.

119. The video processing system of claim 115 further comprising output gamma correction means as a means for correcting for non-linear response of the video monitor systems.

120. The video processing system to claim 115 wherein the output means can produce a video signal in a plurality of different video formats.

121. The video processing system of claim 115 wherein the output means can produce a video signal in a plurality of different video formats, at least one of which is in an interlaced format.

122. The video processing system of claim 115 wherein the output means can produce a video signal in a plurality of different video formats, at least one of which is in a non-interlaced format.

123. The video processing system of claim 115 wherein the output means can product a signal in a plurality of different screen resolutions.

124. The video processing system of claim 115, further comprised of clock timing circuitry comprising system registers, and which selectively provides for modification of the system registers responsive to a security code key.

* * * * *